United States Patent
Pai et al.

(10) Patent No.: US 8,059,546 B2
(45) Date of Patent: Nov. 15, 2011

(54) TRAFFIC FLOW SCHEDULING TECHNIQUES IMPLEMENTED ON BONDED CHANNELS OF A SHARED ACCESS CABLE NETWORK

(75) Inventors: Prashant Pai, San Jose, CA (US); Anna Charny, Sudbury, MA (US); Alon Bernstein, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 12/404,224

(22) Filed: Mar. 13, 2009

(65) Prior Publication Data

US 2010/0061235 A1   Mar. 11, 2010

Related U.S. Application Data

(60) Provisional application No. 61/191,026, filed on Sep. 5, 2008.

(51) Int. Cl.
*H04L 12/26* (2006.01)
(52) U.S. Cl. ....................................... 370/236
(58) Field of Classification Search ............... 370/236, 370/350; 455/434, 553.1
See application file for complete search history.

(56) References Cited

U.S. PATENT DOCUMENTS

| | | | |
|---|---|---|---|
| 6,614,799 B1 | 9/2003 | Gummalla et al. | |
| 6,693,878 B1 | 2/2004 | Daruwalla et al. | |
| 6,950,399 B1 * | 9/2005 | Bushmitch et al. | 370/236 |
| 7,110,419 B1 | 9/2006 | Linander | |
| 7,583,704 B1 | 9/2009 | Walker et al. | |
| 7,602,820 B2 | 10/2009 | Helms et al. | |
| 7,782,832 B2 | 8/2010 | Beser | |
| 7,801,040 B1 | 9/2010 | Singh et al. | |
| 2004/0208120 A1 | 10/2004 | Shenoi | |
| 2004/0221032 A1 | 11/2004 | Bernstein et al. | |
| 2006/0130113 A1 | 6/2006 | Carlucci et al. | |
| 2010/0061234 A1 | 3/2010 | Pai et al. | |

OTHER PUBLICATIONS

Pai et al., "QOS and Scheduling Techniques for Bonded Channels in Cable Networks," U.S. Appl. No. 61/191,026 filed Sep. 5, 2008.
Data-Over-Cable Service Interface Specifications ("DOCSIS") 2.0, Radio Frequency Interface Specification, CM-SP-RFIv2.0-I11-060602, Copyright 1999-2006 Cable Television, Inc., 533 pages.

(Continued)

*Primary Examiner* — Ricky Ngo
*Assistant Examiner* — Chandrahas Patel
(74) *Attorney, Agent, or Firm* — Weaver Austin Villeneuve and Sampson LLP

(57) ABSTRACT

Various techniques are disclosed for managing traffic flow for transport over a plurality of communication channels of a shared access cable network. According to various embodiments, one or more devices of the cable network (such as, for example, a Cable Modem Termination System (CMTS)), may be operable to implement at least a portion of the traffic flow management techniques. In at least one embodiment, one or more aspects of the traffic flow management techniques disclosed herein may be used for performing real-time shaping of traffic flows across multiple different channels of a DOCSIS channel bonding group. In some embodiments, various different traffic shaping and/or traffic scheduling techniques may be employed (e.g., in DOCSIS 3.0 compatible cable networks) to reduce and/or mitigate issues which, for example, may arise as a result of an inability to represent traffic schedulers as tree-based hierarchies. Other aspects are disclosed for implementing quality of service (QoS) procedures on shared access network(s), such as for example hybrid fiber/coaxial (HFC) cable networks.

17 Claims, 21 Drawing Sheets

OTHER PUBLICATIONS

Data-Over-Cable Service Interface Specifications ("DOCSIS") 3.0, Radio Frequency Interface Specification, CM-SP-MULPIv3.0-I05-070803, Copyright 2006-2007 Cable Television, Inc., 743 pages.

Data-Over-Cable Service Interface Specification ("DOCSIS") 3.0, MAC and Upper Layer Protocols Interface Specification, CM-SP-MULPIv3.0-I02-061222, Copyright 2006 Cable Television, Inc. 734 pages.

PCT Search Report dated Oct. 15, 2009 issued in Application No. PCT/US2009/042411.

PCT Written Opinion dated Oct. 15, 2009 issued in Application No. PCT/US2009/042411.

Notice of Allowance and Allowed Claims dated May 19, 2010 issued in U.S. Appl. No. 11/865,520.

Office Action dated Sep. 28, 2010 issued in U.S. Appl. No. 12/404,219.

Final Office Action dated Feb. 24, 2011 issued in U.S. Appl. No. 12/404,219.

* cited by examiner

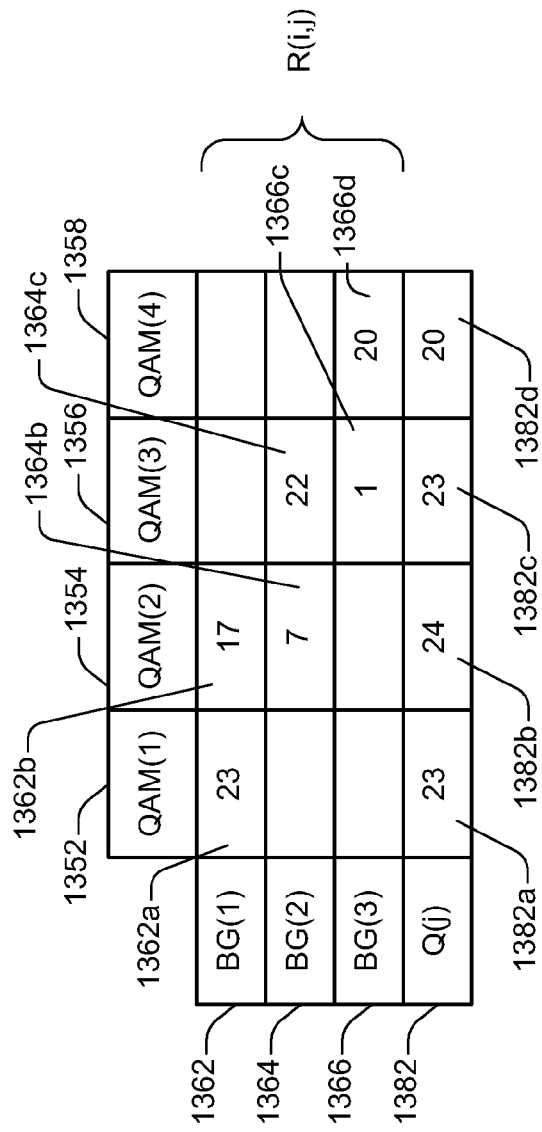

Fig. 13E

| | QAM(1) | QAM(2) | QAM(3) | QAM(4) | Traffic Load | BW Allocated to BG |
|---|---|---|---|---|---|---|
| BG(1) | 23 | 17 | | | 40 | |
| BG(2) | | 7 | 23 | | 30 | |
| BG(3) | | | 0 | 20 | 20 | |
| BWQ(j) | 40 | 40 | 40 | 40 | | |
| Q(j) | 23 | 24 | 23 | 20 | | |
| E(j) | | 40−24=16 | | | | |

Fig. 13F

| | QAM(1) | QAM(2) | QAM(3) | QAM(4) | Traffic Load | BW Allocated to BG |
|---|---|---|---|---|---|---|
| BG(1) | 23 | 17+8=25 | | | 40 | |
| BG(2) | | 7+8=15 | 23 | | 30 | |
| BG(3) | | | 0 | 20 | 20 | |
| BWQ(j) | 40 | 40 | 40 | 40 | | |
| Q(j) | 23 | 24 | 23 | 20 | | |
| E(j) | | 16 | | | | |

Fig. 13G

| | QAM(1) | QAM(2) | QAM(3) | QAM(4) | Traffic Load | BW Allocated to BG |
|---|---|---|---|---|---|---|
| BG(1) | 40 | 25 | | | 40 | |
| BG(2) | | 15 | 40 | | 30 | |
| BG(3) | | | 0 | 40 | 20 | |
| BWQ(j) | 40 | 40 | 40 | 40 | | |
| Q(j) | 23 | 24 | 24 | 20 | | |
| E(j) | 17 | 16 | 16 | 20 | | |

Fig. 13H

| | QAM(1) | QAM(2) | QAM(3) | QAM(4) | Traffic Load | BW Allocated to BG |
|---|---|---|---|---|---|---|
| BG(1) | 40 | 25 | | | 40 | 40+25 =65 |
| BG(2) | | 15 | 40 | | 30 | 15+40 =55 |
| BG(3) | | | 0 | 40 | 20 | 0+40 =40 |
| BWQ(j) | 40 | 40 | 40 | 40 | | |
| Q(j) | 23 | 24 | 24 | 20 | | |
| E(j) | 17 | 16 | 16 | 20 | | |

|      | QAM(1) | QAM(2) | QAM(3) |
|------|--------|--------|--------|
| BG(1) | X      |        |        |
| BG(2) |        | X      | X      |

Fig. 14

TRAFFIC FLOW SCHEDULING TECHNIQUES IMPLEMENTED ON BONDED CHANNELS OF A SHARED ACCESS CABLE NETWORK

CROSS-REFERENCE TO RELATED APPLICATIONS

This application claims priority to U.S. Provisional Application No. 61/191,026, titled "QOS AND SCHEDULING TECHNIQUES FOR BONDED CHANNELS IN CABLE NETWORKS" by Pai et al., and filed on Sep. 5, 2008, which is hereby incorporated by reference in its entirety for all purposes.

BACKGROUND

1. Technical Field

The present disclosure relates generally to communications in shared access networks, and more specifically to communications in cable networks.

2. Description of the Related Art

In a shared access network, one or more shared access communication channels are used to transmit information between a network hub and a plurality of network nodes. One type of shared access network is a cable network. In a cable network, a plurality of cable modems ("CMs") may communicate with one or more network components associated with the head end of a cable network via one or more shared access channels. Various embodiments of cable networks may be configured according to one or more Data-Over-Cable Service Interface Specification ("DOCSIS") standards, such as, for example, the Data-Over-Cable Service Interface Specification CM-SP-MULPIv3.0-I02-061222 (herein referenced as "DOCSIS 3.0"), available from CableLabs.com (Cable Television Laboratories, Inc. in Louisville, Colo.), hereby incorporated by reference in its entirety for all purposes.

Additional details relating to various aspects of cable network technology are described in U.S. patent application Ser. No. 12/167,168, by Pawel, et al., entitled "MAP MESSAGE EXPEDIENCY MONITORING AND AUTOMATIC DELAY ADJUSTMENTS IN M-CMTS", filed 2 Jul. 2008, the entirety of which is incorporated herein by reference for all purposes.

Recent advances in RF technology have enabled Cable Modems to receive and send data on multiple RF channels. The new generation of cable modems hence can receive data at rates up to 200 Mbps. DOCSIS 3.0 standardized multichannel data transmission with a concept of "Bonding Group". A single data stream for a cable modem (herein referred to as CM) could be sent on a single Bonding Group (herein referred to as BG), spanning multiple RF channels. At the same time a single RF channel may be shared by multiple Bonding Groups. Such associations of Bonding Groups and/or RF channels makes packet scheduling with Quality of Service assurances very complex.

BRIEF DESCRIPTION OF THE DRAWINGS

References are made to the accompanying drawings, which form a part of the description and in which are shown, by way of illustration, particular embodiments:

FIG. 14 illustrates a specific example embodiment of a configuration of a portion of a cable network.

DESCRIPTION OF EXAMPLE EMBODIMENTS

Overview

Figure 1:
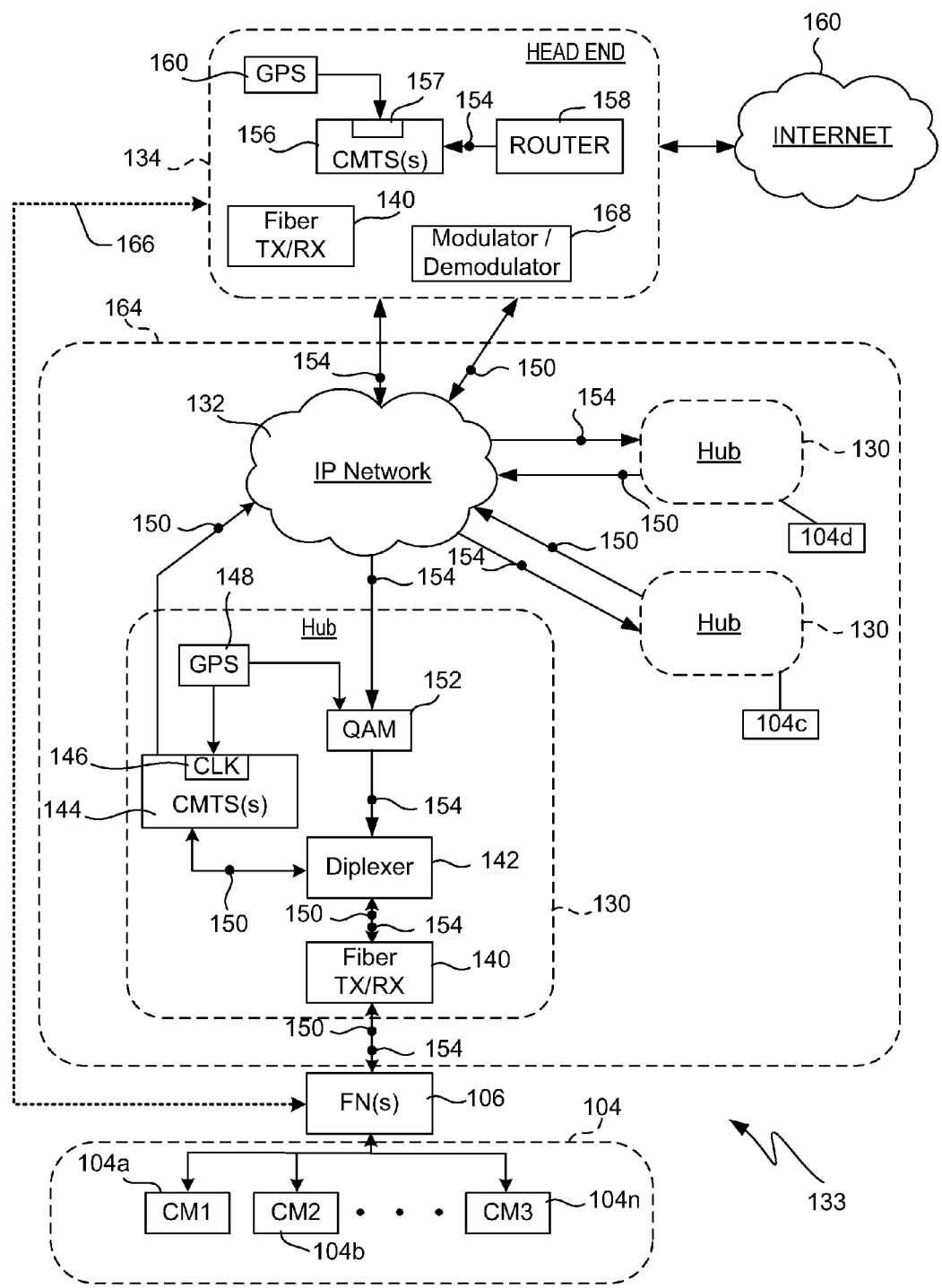
FIG. 1 illustrates a specific example embodiment of a network.

Various aspects described or referenced herein are directed to different methods, systems, and computer program products for managing traffic flow for transport over a plurality of communication channels on a shared access cable network. According to various embodiments, one or more devices of the cable network (such as, for example, a Cable Modem Termination System (CMTS)), may be operable to implement at least a portion of the traffic flow management techniques described herein such as, for example, one or more of the following: receiving a first packet, the first packet having associated therewith a first set of characteristics, the first set of characteristics comprising a first service flow identifier representing a first service flow associated with the first packet, the first packet having a first packed size value associated therewith, the first packet size value representing a size of the first packet or of a first portion thereof; identifying, using at least a portion of the first set of characteristics, a first channel group associated with the first service flow, the first channel group comprising a plurality of communication channels which have been allocated for use in transporting data traffic associated with the first service flow; and/or managing traffic flow associated with the first channel group. In at least one embodiment, the managing of the traffic flow associated with the first channel group may include, for example: determining first packet size value data; selecting, using a first set of selection criteria, a first selected channel of the first channel group; and/or updating, using at least a portion of the first packet size value data, a first selected channel traffic usage value representing an amount of total traffic allocated for transport over the first selected channel during a first time interval.

In at least one embodiment, the first selected channel has associated therewith a first channel bandwidth capacity value representing a maximum amount of traffic that the first selected channel is operable to transport in a given time period T, wherein each of the communication channels of the first channel group has associated therewith a respective channel group traffic usage value, wherein a channel group traffic usage value for a particular communication channel represents an amount of first channel group traffic allocated for transport over the particular communication channel. In at least one embodiment, the various traffic flow management techniques described may include, for example, one or more of the following: identifying a first set of channel groups, wherein each channel group of the first set of channel groups includes the first selected channel; determining, for the first selected channel, a first channel traffic delta value representing a difference between the first channel bandwidth capacity value and the first selected channel traffic usage value; determining, using the first channel traffic delta value, a first channel group delta value representing an amount of excess or available bandwidth of the first selected channel to be allocated for use in transporting traffic flows associated with the first set of channel groups; updating, using the first channel group delta value, a first channel group traffic usage value representing an amount of first channel group traffic allocated for transport over the first selected channel, wherein the first channel group traffic includes traffic that is associated with communication channels of the first channel group; and/or determining, using the first channel group traffic usage value, first channel group traffic shaping rate data representing an amount of bandwidth allocated for transport of packets associated with service flows associated with the first channel group; and/or wherein the determining of the first channel group traffic shaping rate data includes calculating a summation of channel group traffic usage values associated with the first channel group.

Other aspects are directed to different methods, systems, and computer program products for managing traffic flow for transport over a plurality of communication channels on a shared access cable network. In at least one embodiment, the various traffic flow management techniques described may include, for example, one or more of the following: performing at least one traffic shaping operation for shaping a plurality of different traffic flows to be transported over the plurality of different communication channels of the shared access cable network, wherein the plurality of communication channels includes a first communication channel, a second communication channel, and a third communication channel, wherein the first communication channel and the second communication channel are associated with a first channel group, wherein the second communication channel and the third communication channel are associated with a second channel group; wherein the first channel group has associated therewith a first plurality of queues including a first queue and a second queue; and/or wherein the second channel group has associated therewith a second plurality of queues including a third queue and a fourth queue. In at least one embodiment, the shaping of the plurality of different traffic flows may include, for example, one or more of the following: determining whether a first traffic condition associated with the first queue has exceeded first threshold criteria, wherein the first queue is associated with the first channel group and associated with the first communication channel; determining whether a second traffic condition associated with the second queue has exceeded second threshold criteria, wherein the second queue is associated with the first channel group and associated with the second communication channel; initiating at least one operation for suspending or disabling, during a first time interval, traffic flow associated with the first channel group in response to detecting that at least one of the queues associated with the first channel group has exceeded its associated threshold criteria; determining whether a third traffic condition associated with the third queue has exceeded third threshold criteria, wherein the third queue is associated with the second channel group and associated with the second communication channel; determining whether a fourth traffic condition associated with the fourth queue has exceeded fourth threshold criteria, wherein the fourth queue is associated with the second channel group and associated with the third communication channel; and/or initiating at least one operation for suspending or disabling, during a second time interval, traffic flow associated with the second channel group in response to detecting that at least one of the queues associated with the second channel group has exceeded its associated threshold criteria.

In at least one embodiment, the various traffic flow management techniques described may include, for example, one or more of the following: determining whether traffic flow associated with the first channel group is suspended or disabled; initiating at least one operation for enabling or resuming traffic flow associated with the first channel group in response to a determination that respective threshold criteria associated with each of the first plurality of queues is satisfied; determining whether traffic flow associated with the second channel group is suspended or disabled; and/or initiating at least one operation for enabling or resuming traffic flow associated with the second channel group in response to a determination that respective threshold criteria associated with each of the second plurality of queues is satisfied.

Other aspects are directed to different methods, systems, and computer program products for managing traffic flow for transport over a plurality of communication channels on a shared access cable network. In at least one embodiment, the various traffic flow management techniques described may include, for example, one or more of the following: receiving a first packet, the first packet having associated therewith a first set of characteristics, the first set of characteristics comprising a first service flow identifier representing a first service flow associated with the first packet; identifying, using at least a portion of the first set of characteristics, a first channel group associated with the first service flow, the first channel group comprising a plurality of communication channels which have been allocated for use in transporting data traffic associated with the first service flow, wherein the first channel group has associated therewith a first plurality of queues, wherein each of the plurality of communication channels has associated therewith at least one respective queue of the first plurality of queues, wherein each of the first plurality of queues has associated therewith a respective available queue capacity value representing an amount of total memory which is available for use by a given queue of the first plurality of queues; and/or managing traffic flow associated with the first channel group. In at least one embodiment, the managing of the traffic flow associated with the first channel group may include, for example, one or more of the following: determining whether each of the queues associated with the first channel group and associated with the first communication channel has exceeded, during a first time interval, threshold criteria associated with its respective queue; and/or initiating at least one operation for suspending or disabling, during a second time interval, traffic flow associated with the first channel group in response to detecting that each of the queues associated with the first channel group has exceeded its associated threshold criteria. In at least one embodiment, at least one operation for suspending or disabling traffic flow associated with the first channel group may include prohibiting at least one packet from being enqueued in any of the first plurality of queues during the second time interval.

Other aspects are directed to different methods, systems, and computer program products for managing traffic flow for transport over a plurality of communication channels on a shared access cable network. In at least one embodiment, the various traffic flow management techniques described may include, for example, one or more of the following: detecting a first packet dequeue event relating to a dequeuing of a first packet from a first queue associated with a first channel group, the first channel group comprising a plurality of communication channels allocated for use in transporting data traffic associated with a first service flow, wherein the first channel group has associated therewith a first plurality of queues including the first queue, wherein each of the plurality of communication channels has associated therewith at least one respective queue of the first plurality of queues; identifying, using information associated with the first queue, the first channel group which is associated with the first queue; determining whether traffic flow control is asserted for the first channel group, wherein the assertion of traffic flow control for the first channel group is characterized by a suspension of traffic flow on the first plurality of communication channels of the first channel group; and/or performing at least one operation for deasserting traffic flow control at the first channel group in response to a determination that traffic flow control is asserted for the first channel group and in response to detecting the dequeuing of the first packet from the first queue, wherein the deassertion of traffic flow control for the first channel group is characterized by a resumption of traffic flow on the first plurality of communication channels of the first channel group. In at least one embodiment, at least one operation for deasserting traffic flow control at the first channel group may include, for example, enabling at least one packet to be enqueued in at least one of the first plurality of queues.

In at least one embodiment, the shared access cable network may be configured as a Hybrid Fiber Coax (HFC) cable network that is compatible with a Data-Over-Cable Service Interface Specification (DOCSIS) communication protocol. In at least one embodiment, at least a portion of the traffic flow management techniques described herein may be implemented at a Cable Modem Termination System (CMTS) of the shared access cable network. In at least one embodiment, the first channel group may correspond to a DOCSIS channel bonding group in accordance with the DOCSIS communication protocol.

Additional objects, features and advantages of the various aspects described or referenced herein will become apparent from the following description of its preferred embodiments, which description should be taken in conjunction with the accompanying drawings.

Specific Example Embodiments

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Various techniques are disclosed herein for implementing quality of service (QoS) procedures on shared access network(s), such as for example hybrid fiber/coaxial (HFC) cable networks. For purposes of illustration and explanation, details relating to many of the various techniques and aspects disclosed herein are described and illustrated by way of example with respect to example cable network embodiments. However, it will be appreciated that many of the various techniques and aspects disclosed herein may also be applied to and/or implemented at other types of access networks (such as, for example, satellite networks, cellular networks, wireless networks, etc.) which, for example, may use one or more shared access communication channels for enabling communications between the network nodes (e.g., cable modems) and the head end of the access network. Additionally, it will be appreciated that one or more techniques described herein may be implemented to shape traffic associated with various types of data parcels (e.g., packets, datagrams, frames, etc.) for transporting data over a shared access network. However, for purposes of explanation, and/or in order to avoid confusion, one or more techniques described herein may be described by way of example with respect to traffic shaping of packets.

Typically, a cable network may include a head end comprising one or more cable modem termination system(s) (CMTS(s)), a plurality of cable modems (CMs), and a plurality of shared access upstream and/or downstream channels for use in facilitating communications between the cable modems and head end. In some embodiments, a cable network may also include one or more of the following (or combinations thereof): hubs (sometime referred to as "subhead ends"), fiber nodes, etc.

FIG. 1 illustrates a specific example embodiment of a cable network portion 133 which may be used for implementing various aspects described herein. As illustrated in the specific example embodiment of FIG. 1, cable network portion 133 includes a head end 134, a plurality of cable modems (e.g., 104) which may be arranged into one or more different subscriber groups, and one or more fiber nodes 106. Additionally, in some embodiments (as illustrated, for example, in FIG. 1), cable network portion 133 may also include one or more hubs (e.g., 130) which may be communicatively coupled between the head end 134 and cable modems 104.

In at least one embodiment, one or more CMTS(s) 156 of the head end 134 may be configured or designed to access and/or acquire data from one or more external sources (such as, for example, Internet 160), and may be further configured or designed to acquire content (e.g., text data, image data, video data, audio data, etc.) from the external source(s), and to modify selected portions of the content for distribution to the cable modems via one or more downstream channels. Additionally, one or more CMTS(s) 156 may also be configured or designed to receive upstream communications from one or more cable modems of the cable network.

According to at least one embodiment, different CMTS(s) (e.g., 156) may each be configured or designed to include upstream channel and/or downstream channel functionalities. For example, in one embodiment, a first CMTS at the head end may be configured as a downstream CMTS and operable to handle various aspects relating to downstream channel communications to the CMs, and a second CMTS at the head end may be configured as an upstream CMTS and operable to handle various aspects relating to upstream channel communications from the CMs. In some embodiments, one or more CMTS(s) may operable to handle various aspects relating to downstream channel and upstream channel communications.

As illustrated in the specific example embodiment of FIG. 1, the head end may include one or more modulator/demodulator device(s) 168. In one or more embodiments, modulator/demodulator 168 may be operable to modulate one or more RF signals for transmission on one or more RF channels and/or may be operable to demodulate one or more RF signals transmitted on one or more RF channels. According to different embodiments, various types of modulation techniques may be used for modulation/demodulation of signals, such as, for example, one or more of the following (or combinations thereof):

Quadrature Amplitude Modulation (QAM)
Quadrature Phase Shift Keying (QPSK)
Etc.

For example, in one embodiment, head end 168 may be connected via one or more optical fiber channels to one or more fiber nodes (e.g., 106). In at least one embodiment, one or more fiber nodes may be connected via coaxial cable to one or more two-way amplifiers and/or duplex filters which permit certain frequencies to go in one direction and other frequencies to go in the opposite direction. In some embodiments, one or more fiber nodes may be operable to service different cable modem subscriber groups. As illustrated in the specific example embodiment of FIG. 1, head end 134 may include one or more fiber transmitters/receivers 140. In one or more embodiments, a fiber transmitter and/or receiver 140 may be operable to transmit and/or receive information via one or more optical fiber channels. In some embodiments, a fiber transmitter/receiver 140 may transmit and/or receive an RF modulated signal via one or more optical fiber channels. In at least one embodiment, as illustrated in FIG. 1, at least a portion of the communications between head end 134 and cable modems 140 may implemented via RF channels 166, which, for example, may include at least one upstream channel and at least one downstream channel. In at least one embodiment, at least a portion of the RF channels 166 may be configured or designed as shared access channels which, for example, may be configured or designed to utilize one or more different types of shared access protocols, such as, for example, Time Division Multiple Access (TDMA)
Code Division Multiple Access (CDMA)
Etc.

In at least one embodiment, cable network portion 133 may also include one or more hubs (e.g., 130) which may be communicatively coupled between the head end 134 and cable modems 104. In one or more embodiment (as illustrated, for example, in FIG. 1), one or more hub(s) 130 may be communicatively coupled with head end 134 via IP Network 132. In one or more embodiments, IP Network 132 may support, for example, Gigabit Ethernet traffic. In some embodiments, IP Network 132 may support a different type of packet switched IP-based traffic protocol. In different embodiments (not shown), one or more hub(s) 130 may be communicatively coupled with head end 134 via one or more different types of networks (e.g., a different type of IP network, an optical fiber network, a satellite network, cellular network, wireless network, etc.).

In the specific example embodiment of cable network portion 133, hub 130 includes one or more CMTS(s) 144. In at least one embodiment, one or more CMTS(s) 144 of the hub 130 may be configured or designed to schedule the transmission of upstream communications between one or more cable modems (e.g., 104) and head end 134. One or more CMTS(s) 144 of the hub 130 may be further configured or designed to receive upstream communications from one or more cable modems, and to modify selected portions of the communications for transmission to one or more device(s) included in head end 134.

According to at least one embodiment, different CMTS(s) (e.g., 144) may each be configured or designed to include upstream channel and/or downstream channel functionalities. For example, in one embodiment, a first CMTS at the head end may be configured as a downstream CMTS and operable to handle various aspects relating to downstream channel communications to the CMs, and a second CMTS at the head end may be configured as an upstream CMTS and operable to handle various aspects relating to upstream channel communications from the CMs. In some embodiments, one or more CMTS(s) may operable to handle various aspects relating to downstream channel and upstream channel communications.

As illustrated in the specific example embodiment of FIG. 1, the hub 130 may include one or more modulator device(s) 152. In one or more embodiments, modulator device(s) 152 may be operable to receive downstream communications for distribution to one or more CM(s). Additionally, modulator device(s) 152 may be operable to modulate one or more RF signals for transmission on one or more RF channels. According to different embodiments, various types of modulation techniques may be used for modulation of signals, such as, for example, one or more of the following (or combinations thereof):

Quadrature Amplitude Modulation (QAM)
Quadrature Phase Shift Keying (QPSK)
Etc.

In different embodiments (not shown), hub 130 may include one or more demodulator device(s) operable to demodulate one or more RF signals transmitted on one or more RF channels.

As illustrated in the specific example embodiment of FIG. 1, the head end may include one or more Diplexer device(s) 142. One or more Diplexer device(s) 142 may be configured or designed to perform one or more operations relating to upstream and/or downstream frequency domain multiplexing and/or demultiplexing. In some embodiments, one or more diplexer device(s) may be configured or designed to multiplex a plurality of upstream and/or downstream signals for transmission on one or more upstream and/or downstream channels. Additionally, one or more diplexer device(s) may be configured or designed to demultiplex one or more signals transmitted via one or more upstream and/or downstream channels into a plurality of upstream and/or downstream signals. For example, in the specific example embodiment of FIG. 1, diplexer device(s) 142 may be configured or designed to diplex two RF QAM signals for downstream transmission to one or more fiber node(s) 106 and/or CM(s) 104. Additionally, diplexer device(s) 142 may be configured or designed to undiplex one or more signals transmitted via one or more upstream channels from one or more fiber node(s) 106 and/or CM(s) 104.

In at least one embodiment, one or more devices in a cable network, and/or clock circuitry associated with one or more devices in a cable network, may be synchronized via the use of one or more external timing devices such as, for example, a Stratum 1 clock source. One or more techniques for synchronizing components of a cable network are described in U.S. patent application Ser. No. 10/459,136, titled "Synchronizing Separated Upstream And Downstream Channels Of Cable Modem Termination Systems" by Walker, et al, and filed on Jun. 10, 2003, which is hereby incorporated by reference in its entirety for all purposes. In the specific example embodiment of cable network portion 133, network traffic may be synchronized by reference to time and/or frequency data from one or more Global Positioning System ("GPS") device(s) (e.g., 148 and 160). GPS device(s) 160 may provide time information and/or clocking signals to one or more device(s) in head end 134 (e.g., CMTS(s) 156). GPS device(s) 148 may provide time information and/or clocking signals to one or more device(s) in hub 130 (e.g., CMTS(s) 144 and/or modulator device(s) 152). The time information and/or clocking signals provided to one or more device(s) may include, for example, frequency data that are used as described in one or more DOCSIS specifications.

As illustrated in the specific example embodiment of FIG. 1, cable network portion 133 may include one or more fiber node(s) 106. In some embodiments (for example as illustrated in FIG. 1), one or more fiber node(s) may be configured or designed to receive communications sent via one or more optical fibers from one or more CMTS(s) in head end 134 and/or one or more hub(s) 130, and modify selected portions of the communications for distribution to the CMs (e.g., 104) via one or more coaxial cables. Additionally, one or more fiber node(s) may be configured or designed to receive communications from one or more CMs (e.g., CMs 104) via one or more communication channels (e.g., coaxial cables), and modify selected portions of the communications for transmission to one or more device(s) in head end 134 and/or one or more hub(s) 130.

As illustrated in the specific example embodiment of FIG. 1, cable network portion 133 may include one or more network node(s) (e.g., CM(s) 104). In some embodiments, one or more different devices may be operable to communicate with a head end via a first network node. For example, a first cable modem may provide one or more data communication functions to one or more devices which may include, but are not limited to: personal computer(s), television(s), digital video recorder (DVR) device(s), telephone(s), appliance(s), networking device(s), etc. (or some combination thereof). Thus, in some embodiments communications received by a first network node (e.g., a CM) in a shared access network may be associated with one or more different devices associated with the first network node.

In some embodiments, a first network node (e.g., a CM) may be associated with one or more service flows for scheduling upstream or downstream communication between the first network node and a different network component (e.g., a CMTS). According to various embodiments, a service flow may be any upstream and/or downstream data stream for communication between one or more network node(s) and a different network component. In at least one embodiment, a service flow may be defined as a Media Access Control (herein referred to as "MAC") layer transport service which may provide unidirectional transport of packets from the upper layer service entity to the RF and may shape, police, and/or prioritize traffic according to one or more QoS traffic parameters defined for the service flow.

In various embodiments, various types of data traffic may be transmitted between one or more network nodes and the head end of a shared access network. For example, different types of data traffic may include, but are not limited to, internet traffic, video on demand ("VOD") traffic, voice over IP ("VOIP") traffic, etc. In some embodiments, a first service flow may be associated with a specific type of network traffic. For example, in a specific example embodiment, a cable modem in a cable network may be associated with a first service flow for the communication of downstream internet traffic, a second service flow for the communication of downstream VOD traffic, a third service flow for the communication of downstream VOIP traffic, etc. In different embodiments, one or more different types of data traffic may be associated with one or more different service flows.

In various embodiments, one or more service flows may be associated with one or more instances of various types of QoS traffic parameters. In some embodiments, one or more QoS traffic parameters may be shared by one or more service flows. Various types of QoS traffic parameters may include, but are not limited to, one or more of the following (or combinations thereof):

- Traffic rate parameters (e.g., minimum sustained traffic rate parameters, maximum sustained traffic rate parameters, etc.).
- Traffic priority parameters.
- Traffic burst parameters (e.g., maximum traffic burst parameters, maximum concatenated burst parameters, etc.).
- Reserved traffic rate parameters (e.g., minimum reserved traffic rate parameters, assumed minimum reserved rate packet size parameters, etc.).
- Timeout parameters (e.g., timeout for active QoS parameters, timeout for admitted QoS parameters, etc.).
- Traffic scheduling parameters (e.g., service flow scheduling type parameters, etc.).
- Etc.

The techniques described herein may be applied to any association of network nodes, service flows, and/or QoS parameters in a shared access network. For example, in a specific example embodiment of a cable network, a first cable modem may be associated with a first service flow relating to the communication of downstream traffic, and the first service flow may be associated with, for example, QoS parameters to provide internet traffic in excess of a minimum reserved traffic rate. In this specific example embodiment, the first cable modem may also be associated with a second service flow relating to the communication of downstream VOD traffic, and the second service flow may be associated with QoS parameters to provide VOD traffic at less than a maximum traffic burst rate. In at least one embodiment, the first cable modem may further be associated with a third service flow relating to the communication of VOIP traffic, and the third service flow may be associated with QoS parameters to provide VOIP traffic that is designated as having a high traffic priority level. In different embodiments, one or more different QoS parameters may be associated with one or more different service flows.

In one or more embodiments, one or more QoS parameters may be defined and/or determined at one or more components (e.g., a CMTS) included in a network head end and/or hub. In various embodiments, one or more QoS parameters may be defined and/or determined manually, automatically, dynamically, statically, or some combination thereof. According to some embodiments, one or more QoS parameters may be defined and/or determined in accordance with an agreement between a service provider and a customer. For example, a service level agreement (herein referred to as "SLA") with a first customer in a cable network may define one or more QoS parameters which may be associated with one or more types of data traffic flows. In some embodiments, one or more different customers may pay different amounts of money in exchange for different types and/or levels of service. For example, a first customer may pay more money than a second customer in exchange for a higher minimum bandwidth rate for internet traffic and/or a higher CBR for VOIP traffic.

In some embodiments, each (or selected) service flow(s) may have associated therewith a respective Service Flow Identifier (herein referred to as "SFI"). In at least one embodiment, a Service Flow Identifier may be used to uniquely identify a specific service flow of the access network. Each (or selected) bonding group(s) may have associated therewith a respective Bonding Group Identifier (herein referred to as "BGI"). Each (or selected) RF channel(s) may have associated therewith a respective Channel Number. According to various embodiments, various types information relating to one or more SFI(s), BGI(s), and/or Channel Number(s) may be used to identify various parameters and/or components, which may include, but are not limited to, one or more of the following (or combinations thereof):

- Service flow(s)
- Classes of service flow(s)
- Cable modem(s)
- QoS parameter(s)
- Bonding group(s)
- Channel(s)
- Etc.

According to various embodiments, a shared access network may be configured so that a plurality of network nodes may share one or more shared access channels for sending and/or receiving data. For example, a plurality of cable modems in a cable network may share one or more channels for sending and/or receiving data. The transmission of information on a shared access channel may require different types of scheduling techniques to ensure efficient traffic flow. [For example, transmission of packets between a CMTS and one or more cable modems on a cable network may be scheduled according to different scheduling techniques (e.g., weighted fair queuing ("WFQ"), etc.).

As mentioned previously, recent advances in RF technology have enabled cable modems to receive and send data on multiple RF channels. The new generation of cable modems hence can receive data at rates up to 200 Mbps. The latest DOCSIS standard, Data-Over-Cable Service Interface Specification CM-SP-MULPIv3.0-I02-061222 (herein referenced as "DOCSIS 3.0") standardized multi-channel data transmission with a concept of "Bonding Group". In at least one embodiment, a "Bonding Group" may refer to an identified set of upstream or downstream channels among which a stream of packets (e.g., from a service flow) may be distributed. For example, in one embodiment, a Bonding Group may refer to an identified set of upstream or downstream channels among which packets associated with one or more service flows may be distributed. In some embodiments, a Bonding Group may refer to only a subset of active and/or available channels (e.g., only the identified set of channels). In some embodiments, a "Bonding Group" may refer to a list of channels providing a means to identify the specific channels bonded together. It will be appreciated that one or more techniques described herein may be applied to various groups of channels associated with various types of shared access networks. However, for purposes of explanation, and/or in order to avoid confusion, one or more techniques may be described herein with respect to shaping traffic associated with one or more Bonding Groups.

In at least one embodiment, various cable network and QOS related concepts/terms described herein may be defined and/or interpreted in a manner which is compatible with DOCSIS 3.0. Examples of at least some of such concepts/terms may include, but are not limited to, one or more of the following (or combinations thereof):

- Service flow: In at least one embodiment, a service flow may be characterized as a MAC-layer transport service that provides unidirectional transport of packets between the Cable Modem and the CMTS. A service flow may be characterized by a set of classifiers and/or several QOS attributes such as, for example, one or more of the following (and/or combinations thereof): latency, jitter, throughput assurances, etc.

QAM (Quadrature Amplitude Modulation): In at least one embodiment, Quadrature Amplitude Modulation may be utilized as a modulation format which may be used to encode digital data over RF channels used in Cable network technology. A single RF channel may be, for example, 6 to 8 MHz wide (e.g., depending on the country), and/or may achieve data rates from 40 to 50 Mbps, for example. In at least one embodiment, QAM may be indicative of RF channel carrying data.

Bonding Group: In at least one embodiment, a Bonding Group may be characterized as a set of one or more channels (e.g., QAMs) which may be used for transporting data traffic (e.g., packets) associated with a given service flow. In one embodiment, a Bonding Group may be viewed as a forwarding interface. For example, in one embodiment, when a CMTS receives packets classified (or associated) with a specific service flow, the CMTS may identify the Bonding Group associated with the service flow of the received packets, may identify the QAM(s) associated with the identified Bonding Group, and/or may utilize one or more of the identified QAMs for transporting packets associated with the identified service flow to a given cable modem (and/or to multiple cable modems).

Min-Rate (Minimum Reserved Rate): In at least one embodiment, the Min-Rate may be characterized as one of the QOS attributes associated with a service flow. The Min-Rate (or Minimum Reserved Rate) may also be referred to as the Committed Information Rate or CIR. In one embodiment, the Min-Rate may be representative of a traffic rate which the CMTS should reserve for a given service flow. In at least one embodiment, different service flows may have different Min-Rates associated therewith.

Max-Rate: In at least one embodiment, the Max-Rate may be characterized as another one of the QOS attributes associated with a service flow. In one embodiment, the Max-Rate may be representative of a traffic rate which should not be exceeded for a given service flow. In at least one embodiment, different service flows may have different Max-Rates associated therewith.

Bonding Group Min-Rate: In at least one embodiment, a Bonding Group Min-Rate may be representative of an aggregate or summation of the Min-Rates of all of (or selected ones of) the data traffic service flows being transported (and/or scheduled for transport) over a given Bonding Group.

According to various embodiments, various traffic shaping techniques and/or aspects described herein may be applied to different types of upstream and/or downstream channel communications in shared access networks, such as for example cable networks. For purposes of explanation, and/or in order to avoid confusion, various traffic shaping techniques described herein are described with respect to cable networks wherein it is assumed that downstream traffic is being shaped. Further, it is assumed that the channels (herein referred to as QAMs) are modulated according to one or more quadrature amplitude modulation schemes. As discussed above, communications between a CMTS and a specific CMs may be organized into one or more service flows. In the embodiments described herein, it is assumed that a Bonding Group refers to a selected group of QAMs over which a CMTS is operable to schedule the transmission of data associated with one or more service flows. In some embodiments, one or more shared access networks may be configured with overlapping associations of Bonding Groups and channels. For example, in at least one embodiment, communications with a first cable modem may be sent on a first Bonding Group, spanning multiple channels. At the same time, a first channel may be shared by multiple Bonding Groups.

Such associations of Bonding Groups and/or channels make packet scheduling with QoS assurances very complex. As will be appreciated, this overlapping association of Bonding Groups and channels makes traffic shaping very difficult. One aspect of the present disclosure relates to various issues relating to QoS scheduling for Bonding Groups, and/or various techniques for addressing and/or resolving such issues. In one or more embodiments, packet scheduling with QoS assurances for shared access networks with complex network configurations may involve, for example, one or more linear programming techniques. However, one drawback of such embodiments may be that linear programming techniques may require relatively large amounts of computing resources, and thus may be impractical to use for dynamically shaping network traffic in real time.

In addition, it will be appreciated that existing techniques for implementing traffic shaping in cable networks may not be compatible for use with (and/or may not be easily adapted for use with) QoS scheduling techniques implemented in DOCSIS 3.0 compatible cable networks since, for example, traditionally cable modems have typically been configured or designed to receive and transmit data over a single channel at any given time. Prior to DOCSIS 3.0, there existed no need to implement load balancing for traffic flows spanning multiple upstream and/or downstream channels.

Additionally, existing techniques for traffic scheduling are not compatible for providing for QoS assurances when scheduling traffic for channels associated with overlapping Bonding Groups since, for example, existing traffic scheduling techniques may be based on the assumption that a given CM may be utilizing at most a single upstream channel and a single downstream channel at any given time. For example, traffic scheduling techniques in networks configured in accordance with prior DOCSIS versions may be implemented using pre-configured and/or static processors where it is assumed that a feasible allocation of input traffic to output channels exist. However, under DOCSIS 3.0 in some embodiments a plurality of channels may be operable to transport communications associated with a plurality of data traffic flows, where the association between data traffic flows and channels are overlapping and communications resources are more freely configurable than in the past. Thus, existing traffic scheduling techniques (e.g., weighted fair queuing, round robin, etc.) may fail to schedule traffic transported via channels associated with overlapping Bonding Groups.

For example, it may be difficult to determine whether a feasible allocation of input traffic to output channels associated with a given network processor or other device exists. Thus, for example, under one or more existing traffic scheduling techniques, packets may be dropped or QoS provisions may be violated when scheduling traffic associated with data traffic flows on a cable network configured with overlapping Bonding Groups. In some embodiments, one or more techniques described herein may be implemented prior to one or more existing traffic scheduling techniques (e.g., WQF). In various embodiments, one or more techniques described herein may provide network traffic flow that is feasible to schedule using one or more traditional traffic scheduling techniques.

Various techniques for load balancing may be implemented in addition to the various embodiments of traffic shaping techniques described herein. However, various techniques for load balancing used alone are insufficient for solving problems related to QoS scheduling for channels associated with overlapping Bonding Groups since, for example, load balancing techniques may relate to changing the selected channels over which one or more CMs are configured to transmit and/or receive information rather than allocating bandwidth associated with the selected channels on a per packet basis given a particular network configuration.

In at least one embodiment, at least some CMTS platforms (such as those available, for example, from Cisco Systems, Inc. of San Jose, Calif.) may utilize an ASIC (e.g., a "JIB") which has been configured or designed to perform DOCSIS MAC controller functionality. In one embodiment, a MAC-layer processor may be configured or designed to receive packets destined for transport via a specified Bonding Group, and/or may be configured or designed to schedule and/or forward one or more of these packets for transmission over one or more of the QAMs associated with the specified Bonding Group. In at least one embodiment, in order to forward packets to the appropriate QAM, the MAC-layer processor may be configured or designed to utilize a simplified scheduling algorithm such as, for example, the "Shortest Queue First" (SQF) scheduling algorithm (which may be implemented in, for example, a hierarchical queuing framework ("HQF")).

However, although multiple different Bonding Groups may contribute traffic on a single QAM, in at least one embodiment, the scheduling algorithm should preferably be configured or designed to ensure that the QAMs associated with a given Bonding Group are equally (or substantially equally) loaded, to the extend possible. Accordingly, in at least one embodiment, the scheduling algorithm may be considered to be effective only if the Bonding Groups are assigned (or scheduled) with "feasible bandwidth allocation" such that the total bandwidth of data traffic transmitted on each of the Bonding Group's QAMs does not exceed the QAM capacity. Thus, for example, in one embodiment, each of (or selected ones of) the Bonding Groups may be shaped with a respective bandwidth that may be consistent with the QAMs associated with each respective Bonding Group.

In at least one embodiment, packets may be classified into a service flow, and/or forwarded to a specific Bonding Group (associated with that service flow) for transport over a set of QAM(s) associated with that specific Bonding Group. In at least one embodiment, QOS policies such as, for example, Min-Rate and/or Max-Rate may be applied per service flow. As such, the Bonding Group may be treated as a forwarding interface from the CMTS perspective. Hence, according to one embodiment, in the context of the HIST scheduling architecture (e.g., HQF Implementation based on Sorting Trees) it may be convenient to model the Bonding Group as a single schedule (e.g., Bandwidth Limited Tunnel or BLT) aggregating all (or selected ones of) the service flows under it. In at least one embodiment, a single Bonding Group may be used to transport packets on multiple QAMs. In some embodiments, a single QAM may receive packets from multiple Bonding Groups.

In some embodiments, the input traffic of a Bonding Group may vary with time. Accordingly, in at least one embodiment, a dynamic sharing of the QAM bandwidth among contending Bonding Groups may be desirable. For example, for simple associations of Bonding Groups and/or QAMs, multiple Bonding Groups may be aggregated into a larger group, for example, such that the max shaping bandwidth is substantially equal to the sum of QAM bandwidth corresponding to all (or selected ones of) the QAMs associated with the multiple Bonding Groups. However, it is contemplated that, at least in some embodiments, this approach may not be suitably extended for arbitrary configurations. Accordingly, as described in greater detail below, implementation of more sophisticated traffic shaping and/or traffic scheduling techniques may be desirable.

According to one embodiment, one such technique may involve statically allocating bandwidth from a QAM to each of the Bonding Group(s) it is associated with. For example, in one embodiment, the QAM may contribute a fraction of its bandwidth to each of its associated Bonding Groups. The Bonding Group shaping bandwidth may be calculated by adding up contributions from all of (or selected ones of) the QAMs it may be member of.

One drawback of such a static bandwidth allocation technique may be that it does not allow the bandwidth to be shared efficiently. For example, if there is a surge in traffic on one Bonding Group, and if the other Bonding Groups sharing QAMs with that Bonding Group are lightly loaded at the same time, a large portion of the QAM bandwidth may be underutilized even though the QAM may be accessible to the Bonding Group with heavy traffic.

In considering the Bonding Group architecture, and/or the QOS requirements of individual service flows, it may be desirable to provide at least one mechanism for shaping and/or scheduling transmission of packets over Downstream Cable channels. In one embodiment, such mechanisms may preferably meet various specified QOS requirements of the individual service flows, while, at the same time, enabling the overall QAM(s) bandwidth(s) to be utilized efficiently. In one embodiment, a least a portion of such traffic shaping/scheduling mechanisms may be implemented using the HQF infrastructure employed by a CMTS processor such as, for example, the Cisco Packet Processor (CPP), available from Cisco Systems, Inc. of San Jose, Calif.

According to various embodiments, all of (or selected ones of) the following QOS requirements may preferably be met or satisfied for a given service flow:

1) Minimum Reserved Traffic Rate: In one embodiment, this parameter specifies the minimum rate, (e.g., in bits/sec), reserved for a given service flow. In one embodiment, the CMTS may preferably be able to satisfy bandwidth requests for a given service flow up to its Minimum Reserved Traffic Rate. If the requested bandwidth for a given service flow is less bandwidth than its Minimum Reserved Traffic Rate, the CMTS may reallocate the excess reserved bandwidth for other purposes.

2) Maximum Sustained Rate: In one embodiment, this parameter specifies the maximum sustained rate (e.g., in bits/sec) reserved for a given service flow. In one embodiment, the amount of traffic forwarded (e.g., in bytes) may be limited during any given time interval (T) by Max(T), as described by the following expression:

$$\text{Max}(T) = T^*(R/8) + B, \quad (1)$$

where the parameter B represents the Maximum Traffic Burst Configuration Setting (e.g., expressed in bytes). In at least one embodiment, for a downstream Service Flow, this parameter may be applicable only at the CMTS. In one embodiment, the CMTS may enforce the above expression (1) on all (or selected) downstream data transmissions. In some embodiments, the CMTS may be configured or designed to not forward (and/or to drop and/or to ignore) downstream packets which violate the expression (1) during a given time interval T. In one embodiment, the CMTS may be operable to "rate shape" the downstream traffic, for example, by enqueuing packets arriving in excess of the expression (1), and/or by delaying the forwarding of such packets during a least a portion of time when the conditions set forth by the expression (1) are not satisfied.

3) Traffic Priority: In one embodiment, this parameter refers to the priority of the service flow. For example, in one embodiment, there may be 8 levels of priority. According to one embodiment, the higher priority flows may preferably be given more preferential treatment (e.g., better service) than lower priority flows. In at least one embodiment, a CMTS may be configured or designed to use the traffic priority parameter as a weight in calculating the excess rate fraction.

In consideration of various new and modified features and/or protocols introduced by the DOCSIS 3.0 specification, it is contemplated (and/or anticipated) herein that traffic scheduler implementations in DOCSIS 3.0 environments may no longer be able to be represented as a simple tree-based hierarchy. Accordingly, as described herein, various different traffic shaping and/or traffic scheduling techniques may be employed (e.g., in DOCSIS 3.0 compatible cable networks) which may help to avoid and/or mitigate issues which may arise as a result of an inability for traffic scheduler implementations to be represented as a tree-based hierarchy. Examples of such traffic shaping and/or traffic scheduling techniques (as described herein, for example) may include, but are not limited to, one or more of the following (or combinations thereof): Push architecture, Pull architecture and/or Hybrid architecture.

In at least one embodiment, a least a portion of underlying concepts associated with the Push architecture relate to the computing of (static and/or dynamic) allocation(s) of the QAM bandwidth between the Bonding Groups, and/or relate to the traffic shaping each Bonding Group to a rate substantially equal to the sum of the bandwidth allocations of each QAM for a given Bonding Group. This solution may be conceptually attractive in that the scheduling at the QAM level (which, for example, may be done in hardware) becomes relatively straightforward, as shaping ensures (on the average) feasibility of the load onto the QAMs, thus allowing simple scheduling (e.g. shortest queue first, SQF), and/or FIFO queuing at the QAM level.

One drawback of this solution, however, may be that unless the bandwidth allocation is able to be calculated or determined efficiently and/or at a sufficiently small time scale, shaping of the Bonding Groups may result in potential underutilization of available bandwidth. Therefore, it may be preferable to design the Push architecture using efficient algorithms for the computation of the shaping rates. Such algorithms may be efficient, and/or may maintain reasonable fairness of the allocation of available bandwidth of the Bonding Groups, as well as maintain the QoS guarantees with respect to the minimum and/or maximum sharing rates. Mathematical algorithms to solve linear equations may be used to compute optimal QAM bandwidth allocation to the Bonding Groups. However they may be more compute intensive and/or not very practical in an environment where the allocations may be updated frequently reacting to the changes in the offered load conditions.

Similar to the Push architecture, the Pull architecture may also need to somehow compute the shares of each QAM allocated to each Bonding Group. Once the shares have been calculated or determined, a scheduling hierarchy (tree) with the root at each QAM may be built, where the children of the QAM node may be all (or selected ones of) the BGs which can send packets to this QAM. Note that since one BG may be able to send packets to multiple QAMs, a BG may be simultaneously in multiple QAM trees. Since all (or selected ones of) the QAMs "pull" packets from its own scheduling tree independently of other QAMs, a possibility exists that two or more QAMs may simultaneously try to get packets from a single BG. This may result in an underutilization since just pulling multiple packets from the same BG in one scheduling epoch may not be possible without implementing some speedup. Further, in the case, when the BG has just one packet in its queue, even speed-up may not help the fact that a scheduling opportunity may be lost for all but one of the QAMs demanding packets from this BG, if all of them end up trying to get this single packet. Hence, the Pull architecture model also may be vulnerable to underutilization, although its cause may be different than that of the Push model.

In at least one embodiment, Hybrid architecture models may be configured or designed to address some of the above-described problems of the Push and/or Pull architecture models.

In at least one embodiment, for each (or selected ones) of these architectures, it may be assumed that the actual flows (e.g., service flows) that may be combined in a Bonding Group may be represented as a scheduling hierarchy rooted at the Bonding Group. For example, in one embodiment, when a Bonding Group may need to select a packet, it may use a conventional WFQ-based scheduler (e.g. HQF) to select an individual flow.

In another approach using HQF, a QAM may be represented as a parent node with Bonding Groups as its children. Individual service flows may be then represented as children of a Bonding Group.

Another implementation may be based on an HQF-based model, wherein, for example, an HQF implementation may be configured or designed to utilize the "Pull Model", where each QAM may be pulling packets from multiple Bonding Groups. The QAM channel may be configured such that every Bonding Group has a (static) weight associated with it. For example, in a simple case where a QAM channel shares two different Bonding Groups, then both Bonding Groups can possibly have the same weight and/or so they may share the bandwidth for the QAM during congestion.

In one embodiment, the HQF-based model may be modified so that packet from a child may be pulled by multiple parents due to many-to-many association between child to parent. This modification may be desirable for bonded group scheduling since, for example, currently existing implementations of HQF do not provide any mechanism for pulling packets in a structure that may not be strictly a hierarchal tree. In some embodiments, the tree like parent-child relationship (e.g., supported in HQF) may be sufficient or adequate, for example, with regard to the level of scheduling DOCSIS flows to Bonding Groups.

However, it is specifically contemplated that there may be various issues with HQF implementations which may provide a motivation for considering other options. Examples of at least some of such issues may include, but are not limited to, one or more of the following (or combinations thereof):

Static sharing of QAM bandwidth between may be limiting.

The issue of multiple parents pulling the same packet when that child only has one packet (as discussed previously) may need to be addressed.

One of the platforms where the overlapping Bonding Group scheduling implementation may be implemented using a hardware-base scheduler which, for example, may not be readily configured or designed to support non-tree scheduling hierarchies and/or which may not be readily modified to support non-tree scheduling hierarchies without expensive HW modifications.

Other techniques described herein may also be used for solving various problems/issues described herein, with at least one consideration relating to that of addressing the utilization/min rate guarantee tradeoff that may be inherent for the solution presented herein, at the cost of additional complexity.

Figure 2:
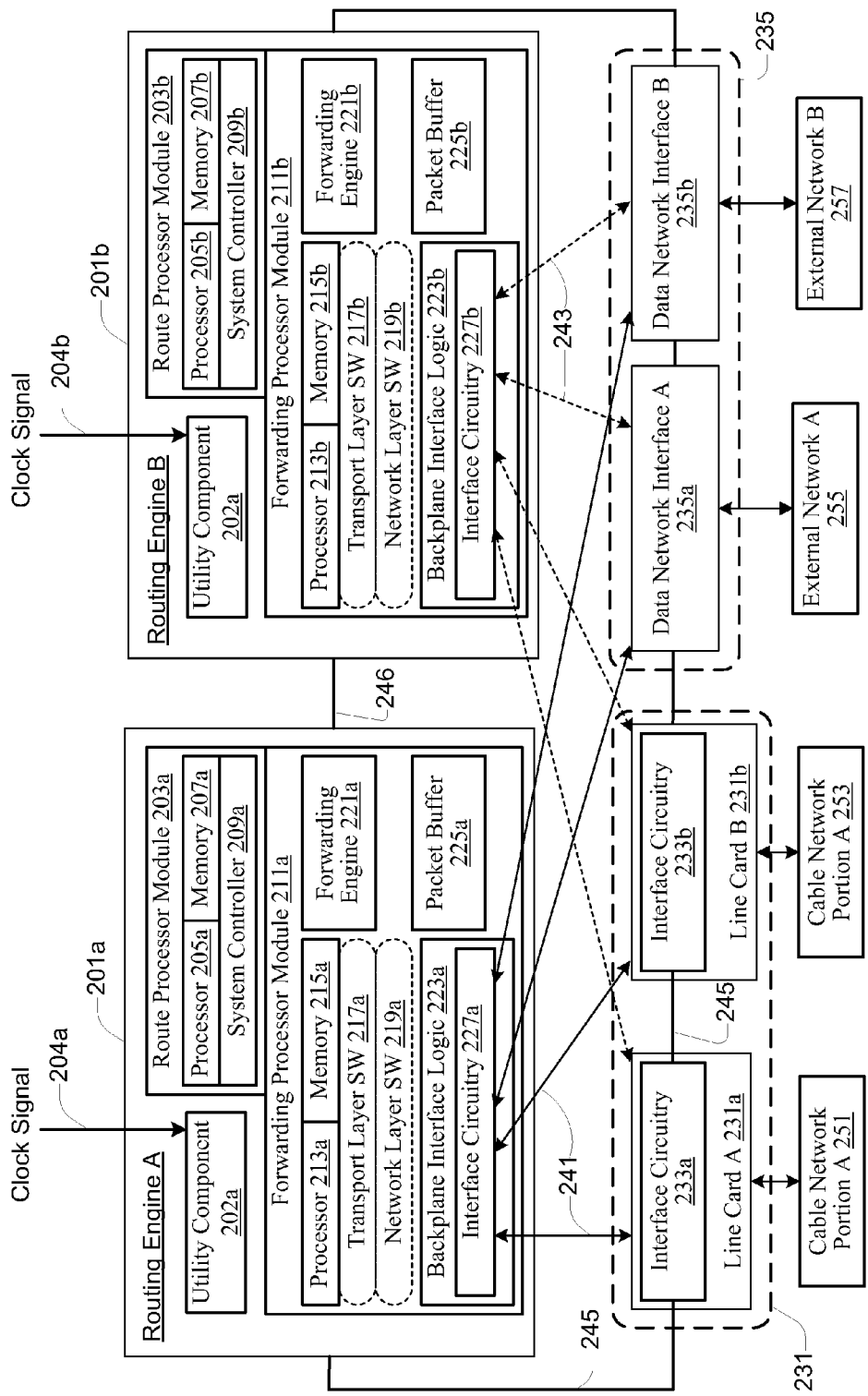
FIG. 2 illustrates a specific example embodiment of a cable modem termination system.

FIG. 2 shows a block diagram of CMTS 200. CMTS 200 combines upstream and downstream functions in the same CMTS. In different embodiments one or more CMTSs may include only downstream or upstream functionality.

In some embodiments, Routing Engine A may be configured or designed to include a plurality of functionally different modules or components, including, for example, a Forwarding Processor (FP) Module 211*a* adapted to provide packet forwarding functionality; a Route Processor (RP) Module 203*a* adapted to implement routing or forwarding operations; and a utility component 202*a* adapted to provide system clock and timestamp functionality. The routing engine components may be configured to provide layer one, layer two, layer three and layer four functionality as well as quality of service (QoS) functionality.

It should be noted that components have been described in singular form for clarity. Multiple processors, a variety of memory formats, or multiple system controllers, for example, can be used in this context as well as in other contexts according to different embodiments. The memory 207*a* may comprise synchronous dynamic random access memory (SDRAM) storage locations addressable by the processor 205*a* for storing software programs and data structures accessed by the components. A network routing operating system, portions of which may reside in memory and executed by the route processor, functionally organizes the router by invoking network operations in support of software processes executing on the router.

The plurality of line cards may include different types of line cards that have been specifically configured to perform specific functions. For example, line cards 231 may correspond to radio-frequency (RF) line cards that have been configured or designed for use in a cable network. Additionally, line cards 235 may correspond to network interface cards that have been configured or designed to interface with different types of external networks (e.g. WANs and/or LANs) utilizing different types of communication protocols (e.g. Ethernet, Frame Relay, ATM, TCP/IP, etc).

For example, the data network interface 235*a* may function as an interface component between external data sources and the cable system. The external data sources may transmit data to the data network interface 235*a* via, for example, optical fiber, microwave link, satellite link, or through various media. A data network interface may include hardware and/or hardware and software for interfacing to various networks. According to various embodiments, a data network interface may be implemented on a line card as part of a conventional router for a packet-switched network. Using this type of configuration, the CMTS may be able to send and/or receive IP packets to and/or from the data network interface using, for example, network layer software 219*a*.

As shown in the specific example embodiment of FIG. 2, at least a portion of the line cards includes interface circuitry for providing an appropriate interface between the host line card, other line cards, and/or the routing engine(s). For example, interface circuitry 233*a* may include interconnect ports coupled to one or more of the point-to-point links 241, 243. According to a specific implementation, the interface circuitry functions as a translator that converts conventional formats of data received at the line cards to a suitable protocol format for transmission from the line card to the appropriate routing engine.

Point-to-point links 241, 243 may be configured as clock forwarded links such that each point-to-point link comprises at least one data wire for transporting data signals and at least one clock wire for carrying clock signals. In some embodiments one or more clock forwarding technique(s) may be scaled to accommodate other clock forwarding arrangements such as, for example, connections comprising a plurality or data signals and/or clock signals. Additionally, each line card may be configured to provide at least one communication interface between the routing engines (201*a* and 201*b*) and at least a portion of the cable network. The data network interface 235*a* may couple the routing engine 201*a* to an external data network 255 such as, for example, the Internet.

Figure 3:
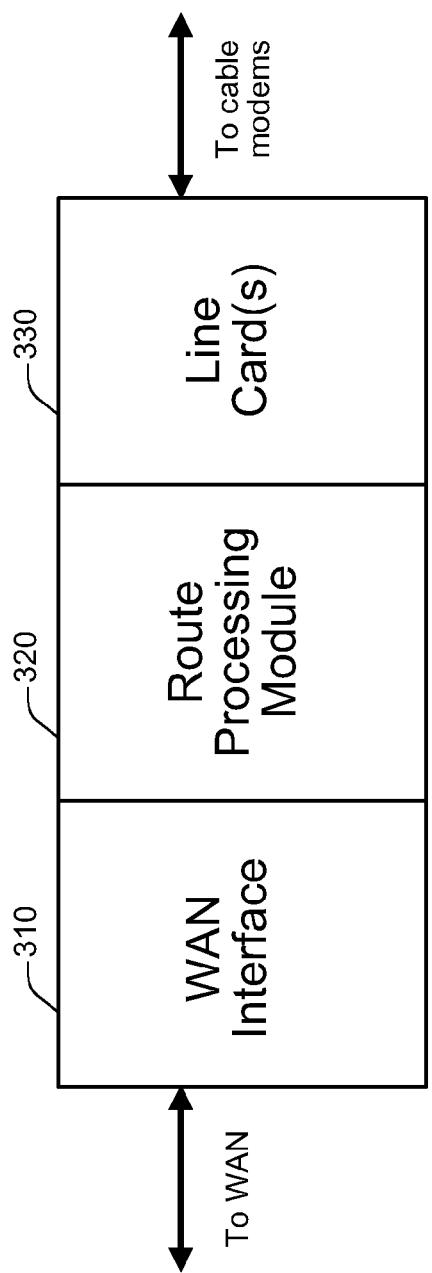
FIG. 3 illustrates a specific example embodiment of a cable modem termination system.

FIG. 3 shows a block diagram of a specific example embodiment of a CMTS 300. The block diagram of a CMTS shown in FIG. 3 illustrates only certain features of a specific example embodiment of a CMTS for illustrative purposes and is not intended be limiting in any way. As illustrated in the specific example embodiment of FIG. 3, CMTS 300 includes one or more WAN Interface(s) 310, one or more Route Processing Module(s) 320, and/or one or more Line Card(s) 330. In some embodiments, CMTS 300 may be configured or designed to perform one or more functions related to upstream and/or downstream communications in a cable network.

In at least one embodiment, one or more CMTS(s) 300 may be included in a head end of a cable network. In various embodiments, one or more CMTS(s) may be configured or designed to access and/or acquire data from one or more external sources (such as, for example, Internet 160), and may be further configured or designed to acquire content (e.g., text data, image data, video data, audio data, etc.) from the external source(s), and to modify selected portions of the content for distribution to the cable modems via one or more downstream channels. Additionally, one or more CMTS(s) 300 may also be configured or designed to receive upstream communications from one or more cable modems of the cable network.

According to at least one embodiment, different CMTS(s) may each be configured or designed to include upstream channel and/or downstream channel functionalities. For example, in one embodiment, a first CMTS at the head end may be configured as a downstream CMTS and operable to handle various aspects relating to downstream channel communications to the CMs, and a second CMTS at the head end may be configured as an upstream CMTS and operable to handle various aspects relating to upstream channel communications from the CMs. In some embodiments, one or more CMTS(s) may operable to handle various aspects relating to downstream channel and upstream channel communications.

At 310, a WAN Interface 310 is illustrated. According to different embodiments, WAN Interface 310 may be configured with the necessary software and/or hardware to perform one or more functions relating to communication with one or more WANs. For example, in at least one embodiment, WAN Interface 310 may be configured to receive packets sent via one or more WANs and transmit the received packets to Route Processing Module 320 for distribution to one or more CMs. According to different embodiments, WAN Interface 310 may be configured to transmit via one or more WANs packets received at the CMTS from one or more CMs connected to the cable network.

At 320, Route Processing Module 320 is illustrated. According to different embodiments, Route Processing Module 320 may be configured with appropriate hardware and/or hardware and software to implement one or more operations relating to route processing which may include, but are not limited to, one or more of the following (or combinations thereof):

- Quality of service (QoS) operations (e.g., hierarchical queueing framework (HQF) operations, packet classification operations, etc.).
- Packet processing and/or routing operations.
- Traffic shaping operations (e.g., as illustrated in FIGS. 9-16).
- Routing and/or forwarding operations.
- Packet classification operations
- Etc.

At 330, one or more line cards are illustrated. In some embodiments, the line cards 330 may include different types of line cards that have been specifically configured to perform specific functions. For example, line card(s) 330 may include one or more radio-frequency (RF) line cards that have been configured or designed for use in a cable network. According to different embodiments, line card(s) 330 may include one or more network interface cards that have been configured or designed to interface with different types of external networks (e.g. WANs and/or LANs) utilizing different types of communication protocols (e.g. Ethernet, Frame Relay, ATM, TCP/IP, etc).

Figure 4:
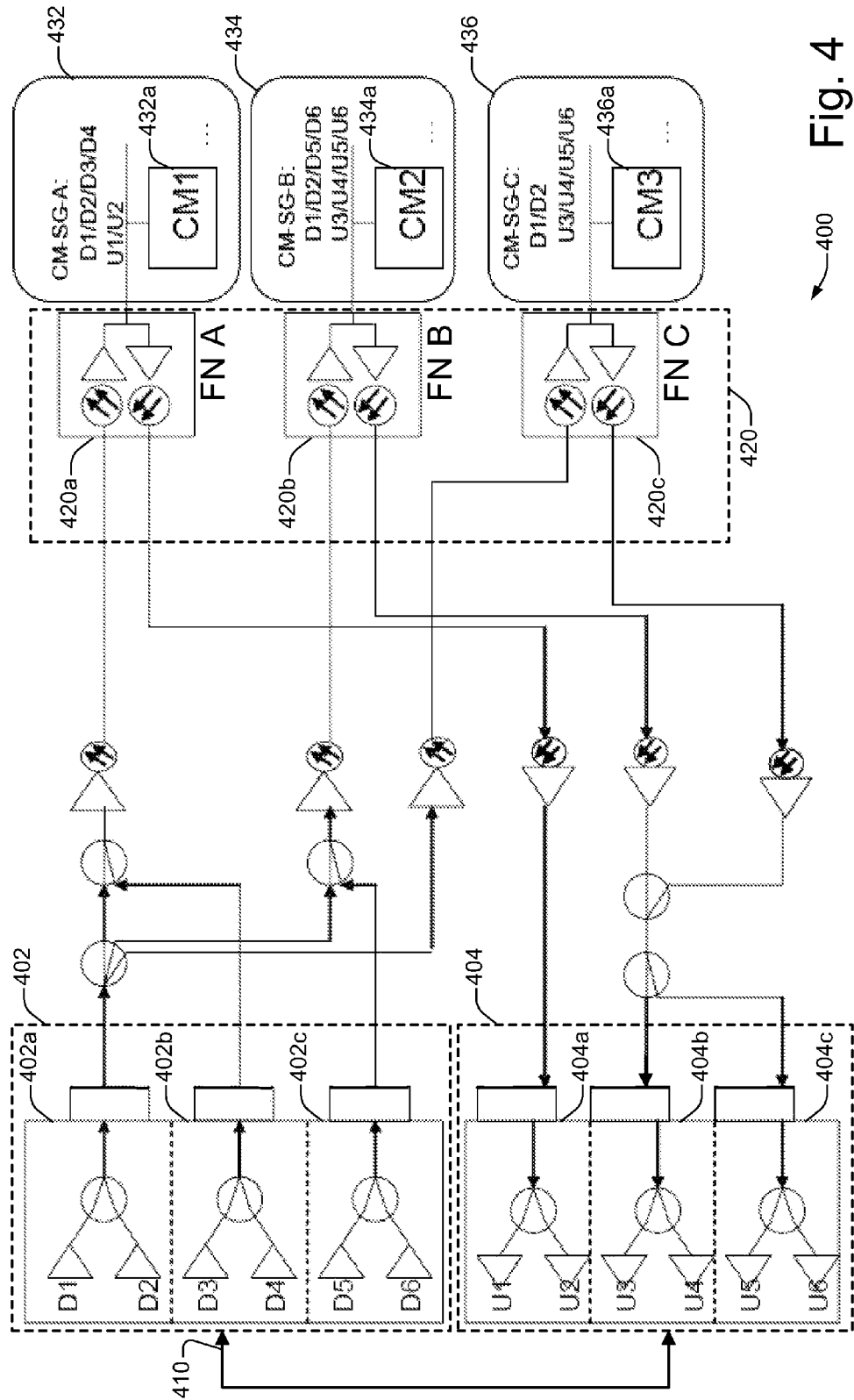
FIG. 4 illustrates a specific example embodiment of a block diagram of a portion of a cable network.

FIG. 4 shows a block diagram of cable network portion 400 in accordance with a specific example embodiment. The specific example embodiment of the cable network portion illustrated in FIG. 4 is an splitting/combining HFC network. The cable network portion 400 includes one or more transmitter device(s) 402, one or more receiver device(s) 404, one or more fiber node(s) 420, and/or one or more groups (e.g., 432) of one or more CMs (e.g., 432a). In different embodiments, the techniques described herein may be applied to communications on one or more different types of shared access network (e.g., a satellite network, a wireless network, different types of cable networks, etc.).

At 402, a group of one or more transmitter device(s) is illustrated according to a specific example embodiment. In some embodiments, one or more transmitter device(s) may be operable to perform one or more functions related to transmitting communications on one or more shared access channels. For example, in some embodiments, one or more transmitter device(s) 402 may be operable to perform functions relating to frequency modulation, demodulation, multiplexing, and/or demultiplexing. In the specific example embodiment of cable network portion 400, one or more transmitters in group 402 may be configured to transmit downstream data from a CMTS to one or more CMs on one or more downstream channels via one or more fiber node(s) (e.g., 420a).

At 404, a group of one or more receiver device(s) is illustrated according to a specific example embodiment. In some embodiments, one or more receiver device(s) may be operable to perform one or more functions related to receiving communications on one or more shared access channels. For example, in some embodiments, one or more receiver device(s) 404 may be operable to perform functions relating to frequency modulation, demodulation, multiplexing, and/or demultiplexing. In the specific example embodiment of cable network portion 400, one or more receivers in group 404 may be configured to receive upstream data from one or more CMs on one or more upstream channels via one or more fiber node(s) (e.g., 420a).

In one or more embodiments, one or more transmitter device(s) 402 and/or receiver device(s) 404 may be operable to modulate one or more RF signals for transmission on one or more RF channels and/or demodulate one or more RF signals transmitted on one or more RF channels. According to different embodiments, various types of modulation techniques may be used for modulation/demodulation of signals, such as, for example, one or more of the following (or combinations thereof):

- Quadrature Amplitude Modulation (QAM)
- Quadrature Phase Shift Keying (QPSK)
- Etc.

In one or more embodiments, one or more transmitter device(s) 402 and/or receiver device(s) 404 may be operable to perform one or more functions relating to upstream and/or downstream frequency domain multiplexing and/or demultiplexing. In some embodiments, one or more transmitter and/or receiver device(s) may be configured or designed to multiplex a plurality of upstream and/or downstream signals for transmission on one or more upstream and/or downstream channels. Additionally, one or more transmitter and/or receiver device(s) may be configured or designed to demultiplex one or more signals transmitted via one or more upstream and/or downstream channels into a plurality of upstream and/or downstream signals. For example, in the specific example embodiment of FIG. 4, transmitter and/or receiver device(s) may be configured or designed to diplex two RF QAM signals for downstream transmission to one or more fiber node(s) and/or CM(s). Additionally, transmitter and/or receiver device(s) may be configured or designed to undiplex one or more signals transmitted via one or more upstream channels from one or more fiber node(s) and/or CM(s).

In one or more embodiments embodiment, one or more transmitter device(s) 402 may be located on a line card in a CMTS. In some embodiments, a plurality of different transmitter devices may be located on one or more different line cards in a CMTS. In some embodiments, one or more different transmitter devices may be located on one or more different line cards in a plurality of different CMTSs.

In one or more embodiments embodiment, one or more receiver device(s) 404 may be located on a line card in a CMTS. In some embodiments, a plurality of different receiver devices may be located on one or more different line cards in a CMTS. In some embodiments, one or more different receiver devices may be located on one or more different line cards in a plurality of different CMTSs.

In some embodiments, one or more CMTS(s) may include one or more transmitter device(s) and one or more receiver device(s), such as for example on different line cards in the same CMTS. In some embodiments, one or more CMTS(s)s may include transmitter device(s) or receiver device(s). In various embodiments, various configurations of upstream and/or downstream transmitters and/or receivers may be used, and the configuration of transmitters and/or receivers in the specific example embodiment of the cable network portion illustrated in FIG. 4 is not intended to be limiting in any way.

At 432, a service group is illustrated in accordance with a specific embodiment. A service group may represent a set of upstream and/or downstream channels that a cable modem is operable to detect. In the specific example embodiment of cable network portion 400, the group 432 of cable modems share a common service group.

According to various embodiments, one or more cable modems in service group 432 may be operable communicate with one or more transmitters (e.g., 402) and/or receivers (e.g., 404) in one or more CMTS(s) via one or more fiber nodes (e.g., fiber node 420a) on one or more shared access channels.

In the specific example embodiment of cable network portion 400, one or more cable modems in service group 432 (e.g., cable modem CM1 432*a*) may be operable to receive communications on one or more of downstream channels D1, D2, D3, and D4. In at least one embodiment, one or more CMs in service group 432 (e.g., cable modem CM1 432*a*), may be capable of receiving communications on downstream channels other than D1, D2, D3, and D4 but may be limited to one or more of channels D1, D2, D3, and D4 based on a particular cable network and/or cable modem configuration.

In the specific example embodiment of cable network portion 400, one or more cable modems in service group 432 (e.g., cable modem CM1 432*a*) may be operable to transmit communications on one or more of upstream channels U1 and U2. In at least one embodiment, one or more CMs in service group 432 (e.g., cable modem CM1 432*a*), may be capable of transmitting communications on upstream channels other than U1 and U2 but may be limited to one or more of channels U1 and U2 based on a particular cable network and/or cable modem configuration.

In at least one embodiment, one or more downstream service flows associated with one or more CMs in service group 432 may be associated with one or more Bonding Groups. One or more Bonding Groups associated with CMs in service group 432 may include one or more of channels D1, D2, D3, and D4. According to different embodiments, one or more upstream service flows associated with CMs in service group 432 may be associated with one or more Bonding Groups. One or more Bonding Groups associated with CMs in service group 432 may be associated with one or more of channels U1 and U2.

At 434, a group of cable modems is illustrated in accordance with a specific embodiment. In the specific example embodiment of cable network portion 400, the group 434 of cable modems represents a service group.

According to various embodiments, one or more cable modems in service group 434 may be operable communicate with one or more transmitters (e.g., 402) and/or receivers (e.g., 404) in one or more CMTS(s) via one or more fiber nodes (e.g., fiber node 420*b*) on one or more shared access channels.

In the specific example embodiment of cable network portion 400, one or more cable modems in service group 434 (e.g., cable modem CM1 434*a*) may be operable to receive communications on one or more of downstream channels D1, D2, D5, and D6. In at least one embodiment, one or more CMs in service group 434 (e.g., cable modem CM1 434*a*), may be capable of receiving communications on downstream channels other than D1, D2, D5, and D6 but may be limited to one or more of channels D1, D2, D5, and D6 based on a particular cable network and/or cable modem configuration.

In the specific example embodiment of cable network portion 400, one or more cable modems in service group 434 (e.g., cable modem CM1 434*a*) may be operable to transmit communications on one or more of upstream channels U3, U4, U5, and U6. In at least one embodiment, one or more CMs in service group 434 (e.g., cable modem CM1 434*a*), may be capable of transmitting communications on upstream channels other than U3, U4, U5, and U6 but may be limited to one or more of channels U3, U4, U5, and U6 based on a particular cable network and/or cable modem configuration.

In at least one embodiment, one or more downstream service flows associated with one or more CMs in service group 434 may be associated with one or more Bonding Groups. One or more Bonding Groups associated with CMs in service group 434 may include one or more of channels D1, D2, D5, and D6. According to different embodiments, one or more upstream service flows associated with CMs in service group 434 may be associated with one or more Bonding Groups. One or more Bonding Groups associated with CMs in service group 434 may be associated with one or more of channels U3, U4, U5, and U6.

At 436, a group of cable modems is illustrated in accordance with a specific embodiment. In the specific example embodiment of cable network portion 400, the group 436 of cable modems represents a service group.

According to various embodiments, one or more cable modems in service group 436 may be operable communicate with one or more transmitters (e.g., 402) and/or receivers (e.g., 404) in one or more CMTS(s) via one or more fiber nodes (e.g., fiber node 420*b*) on one or more shared access channels.

In the specific example embodiment of cable network portion 400, one or more cable modems in service group 436 (e.g., cable modem CM1 436*a*) may be operable to receive communications on one or more of downstream channels D1 and D2. In at least one embodiment, one or more CMs in service group 436 (e.g., cable modem CM1 436*a*), may be capable of receiving communications on downstream channels other than D1 and D2 but may be limited to one or more of channels D1 and D2 based on a particular cable network and/or cable modem configuration.

In the specific example embodiment of cable network portion 400, one or more cable modems in service group 436 (e.g., cable modem CM1 436*a*) may be operable to transmit communications on one or more of upstream channels U3, U4, U5, and U6. In at least one embodiment, one or more CMs in service group 436 (e.g., cable modem CM1 436*a*), may be capable of transmitting communications on upstream channels other than U3, U4, U5, and U6 but may be limited to one or more of channels U3, U4, U5, and U6 based on a particular cable network and/or cable modem configuration.

In at least one embodiment, one or more downstream service flows associated with one or more CMs in service group 436 may be associated with one or more Bonding Groups. One or more Bonding Groups associated with CMs in service group 436 may include one or more of channels D1 and D2. According to different embodiments, one or more upstream service flows associated with CMs in service group 436 may be associated with one or more Bonding Groups. One or more Bonding Groups associated with CMs in service group 436 may be associated with one or more of channels U3, U4, U5, and U6.

Figure 5:
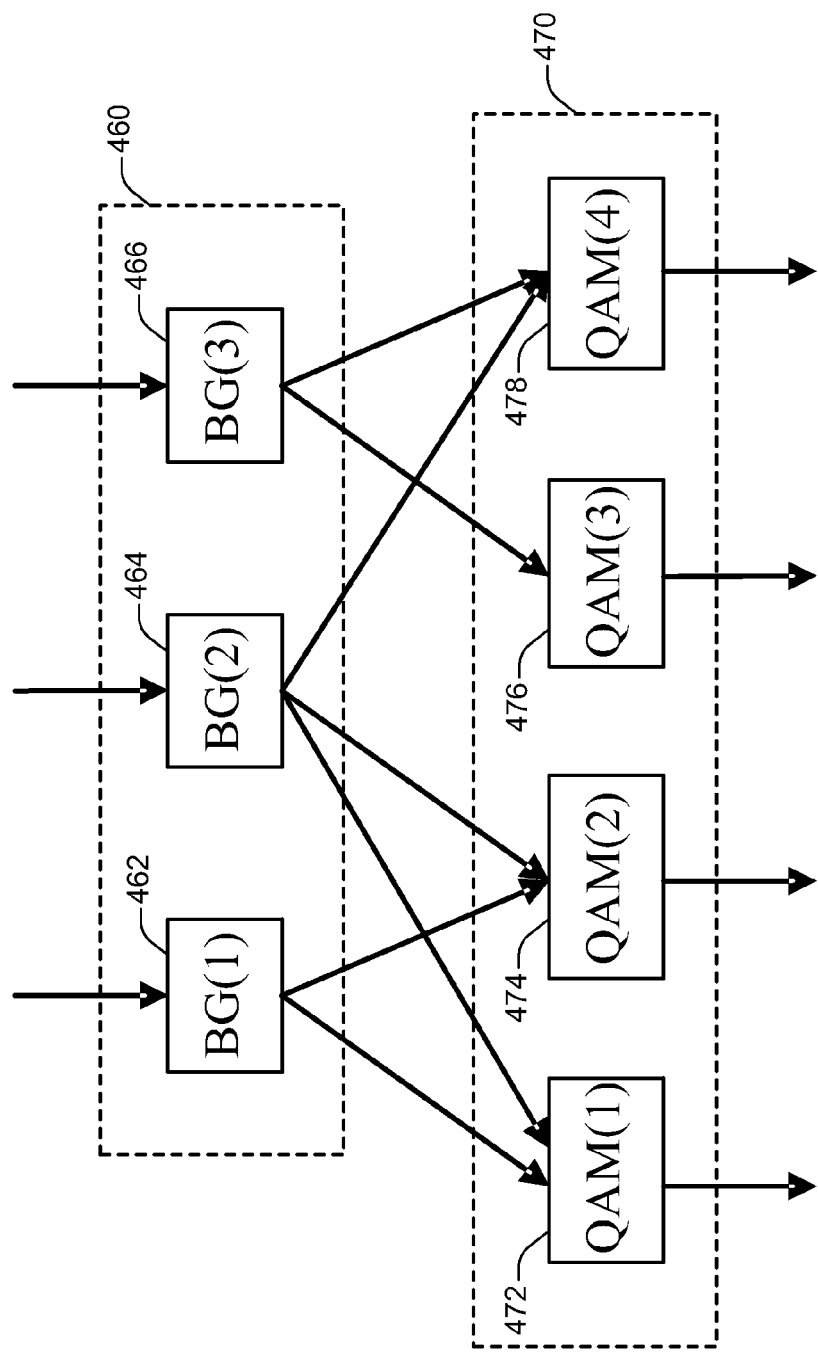
FIG. 5 illustrates a specific example embodiment of a configuration diagram of a portion of a cable network.

FIG. 5 shows a configuration diagram 450 of cable network portion configured in accordance with a specific example embodiment. In the specific example embodiment of cable network portion 450, each Bonding Group BG represents a group of one or more QAMs operable to convey information associated with one or more service flows associated with the Bonding Group BG. For example, a connection between a first Bonding Group and a first QAM in the specific example cable network configuration diagram 450 indicates that in the specific example embodiment of the cable network portion represented by configuration diagram 450, the first QAM is operable to convey information associated with one or more service flows associated with the first Bonding Group BG.

In the specific example embodiment of the cable network portion represented by cable network configuration diagram 450, Bonding Group BG(1) 462 is associated with QAM(1) 472 and QAM(2) 474. In the specific example embodiment of the cable network portion represented by cable network configuration diagram 450, Bonding Group BG(2) 464 is associated with QAM(2) 472, QAM(2) 474, and QAM(4) 478. In the specific example embodiment of the cable network portion represented by the cable network configuration diagram 450, Bonding Group BG(3) 466 is associated with QAM(3) 476 and QAM(4) 478. In different embodiments (not shown), different Bonding Groups may be associated with different QAMs.

Figure 6:
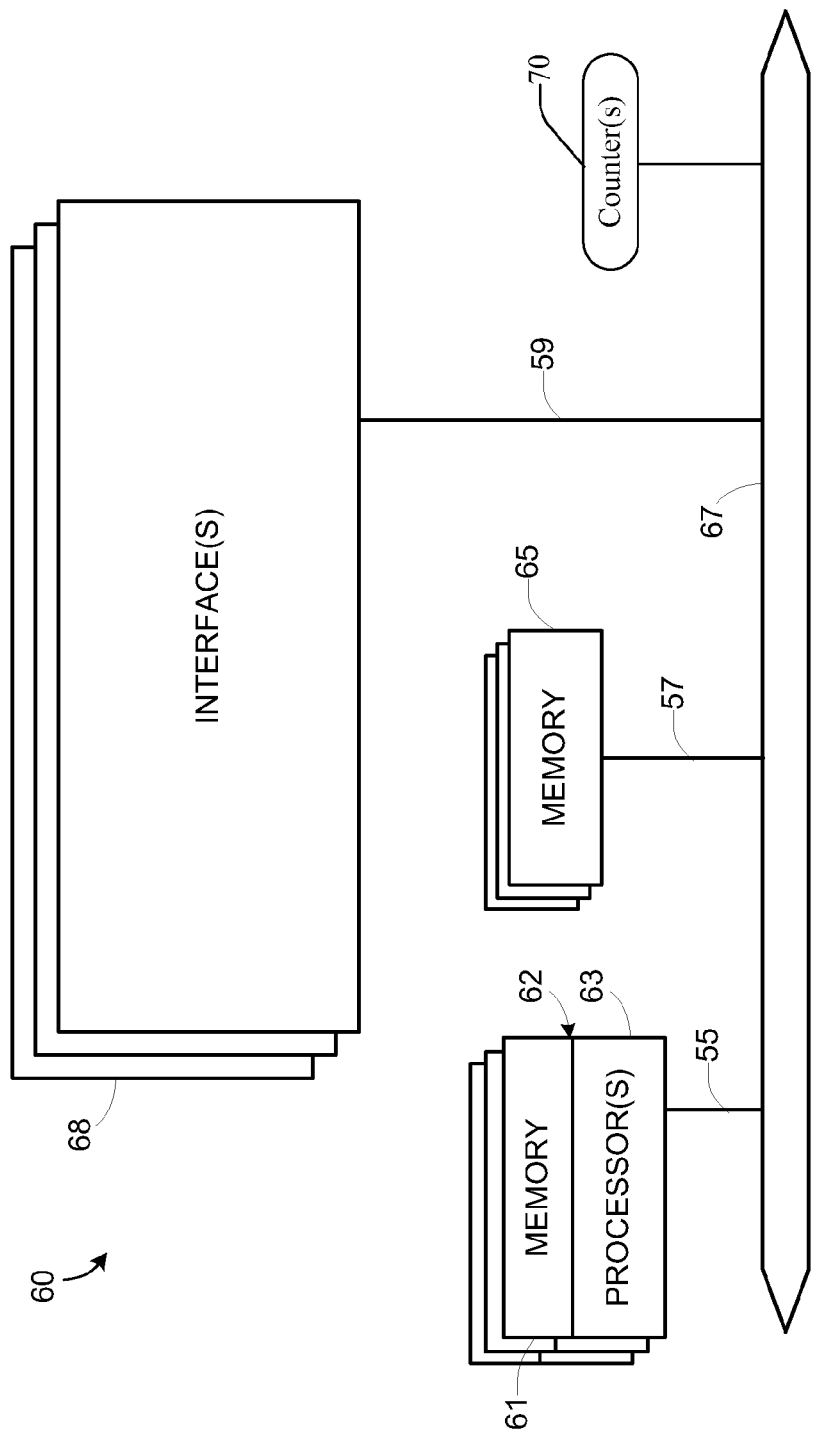
FIG. 6 illustrates a specific example embodiment of a portion of a cable modem termination system.

FIG. 6 shows a block diagram of a specific embodiment of a Cable Modem Termination System (CMTS) 60 in accordance with a specific embodiment. In at least one embodiment, the CMTS 60 may comprise at least one packet routing engine ("PRE"), herein also referred to as a "routing engine." In alternate embodiments, the CMTS may include a multiple packet routing engines ("PREs").

Generally, at least a portion of the various techniques described herein may be implemented on software and/or hardware. For example, they can be implemented in an operating system kernel, in a separate user process, in a library package bound into network applications, on a specially constructed machine, or on a network interface card. In a specific embodiment, at least some techniques described herein may be implemented via software such as an operating system or in an application running on an operating system.

A software or software/hardware hybrid implementation of various techniques described herein may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, in one embodiment, the CMTS 60 may be implemented using specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In other embodiments, various techniques may be implemented on a general-purpose network host machine such as a personal computer or workstation. Further, at leased some features described herein may be at least partially implemented on a card (e.g., an interface card) for a network device or a general-purpose computing device.

Referring to the example of FIG. 6, CMTS 60 may include a master central processing unit (CPU) 62, interfaces 68, and at least one bus 67 (e.g., a PCI bus). When acting under the control of appropriate software or firmware, the CPU 62 may be responsible for implementing specific functions associated with the functions of a desired network device. For example, the CPU 62 may be responsible for analyzing packets, encapsulating packets, forwarding packets to appropriate network devices, calculating insertion rate estimates and/or desired insertion interval values, facilitating cable modem network sign-on activities, etc. In one embodiment, the CPU 62 may accomplish at least a portion of such functions under the control of software including an operating system, and any appropriate applications software.

CPU 62 may include one or more processors 63 such as a processor from the Motorola, AMD, Intel family of microprocessors, and/or the MIPS family of microprocessors. In an alternative embodiment, processor 63 may be implemented as specially designed hardware for controlling the operations of CMTS. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the CMTS 60. Among the interfaces that may be provided are Ethernet interfaces, baseband interfaces, backplane interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management, etc. By providing separate processors for the communications intensive tasks, these interfaces allow the master microprocessor 62 to efficiently perform other functions such as, for example, routing computations, network diagnostics, security functions, etc.

CMTS 60 may also include appropriate hardware and/or hardware and software for implementing operations related to traffic shaping analysis and/or traffic shaping adjustment. For example, CMTS 60 may include appropriate hardware and/or hardware and software for implementing various data structures related to traffic shaping analysis and/or traffic shaping adjustment. In at least one embodiment, at least one data structure may be operable to track information relating to the amount of data scheduled for transmission over one or more Bonding Groups and/or channels. According to different embodiments, CMTS 60 may include appropriate hardware and/or hardware and software to increase or decrease the bandwidth (e.g., bandwidth associated with one or more QAMs) available to convey data associated with one or more service flows (e.g. one or more service flows associated with a Bonding Group).

Although the system shown in FIG. 6 illustrates one example of a CMTS device, it is by no means the only device architecture which may be used for implementing one or more of the techniques and/or features described herein. For example, an architecture having a single processor that handles communications as well as routing computations, etc. may be used. Further, other types of interfaces and media could also be used with the network device.

As illustrated in the example of FIG. 6, the CMTS it may employ one or more memories and/or memory modules (such as, for example, memory block 65), which, for example, may be operable to store data, program instructions for the general-purpose network operations and/or other information relating to the functionality of the cable modem ranging and/or other CM sign-on activities described herein. The program instructions may specify an operating system and one or more applications, for example. Such memory or memories may also be configured to store data structures and/or other specific non-program information described herein. In at least one embodiment, the memory module(s) may include non-volatile and/or volatile memory such as, for example, random access memory (e.g., synchronous dynamic random access memory (SDRAM)), etc.

Because such information and program instructions may be employed to implement the systems and methods described herein, various aspects are directed to machine-readable storage media that include program instructions, state information, etc. for performing various operations described herein. Examples of machine-readable storage media include, but are not limited to, magnetic media such as, for example, hard disks, floppy disks, and magnetic tape; optical media such as, for example, CD-ROM disks; magneto-optical media such as, for example, floptical disks; and hardware devices that are specially configured to store and perform program instructions, such as, for example, read-only memory devices (ROM) and random access memory (RAM). Examples of program instructions include both machine code, such as, for example, produced by a compiler, and files containing higher level code that may be executed by the computer using an interpreter.

One skilled in the art would appreciate that multiple processors, a variety of memory formats, and/or multiple system controllers, for example, can be used in this context as well as in other contexts described herein. The program instructions may control the operation of an operating system and/or one or more applications, for example. The memory or memories may also be configured to store data structures, insertion interval tables, and/or other specific non-program information described herein.

Because such information and program instructions may be employed to implement the systems/methods described herein, machine readable storage media (e.g., which includes program instructions, state information, etc.) may be used for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 7:
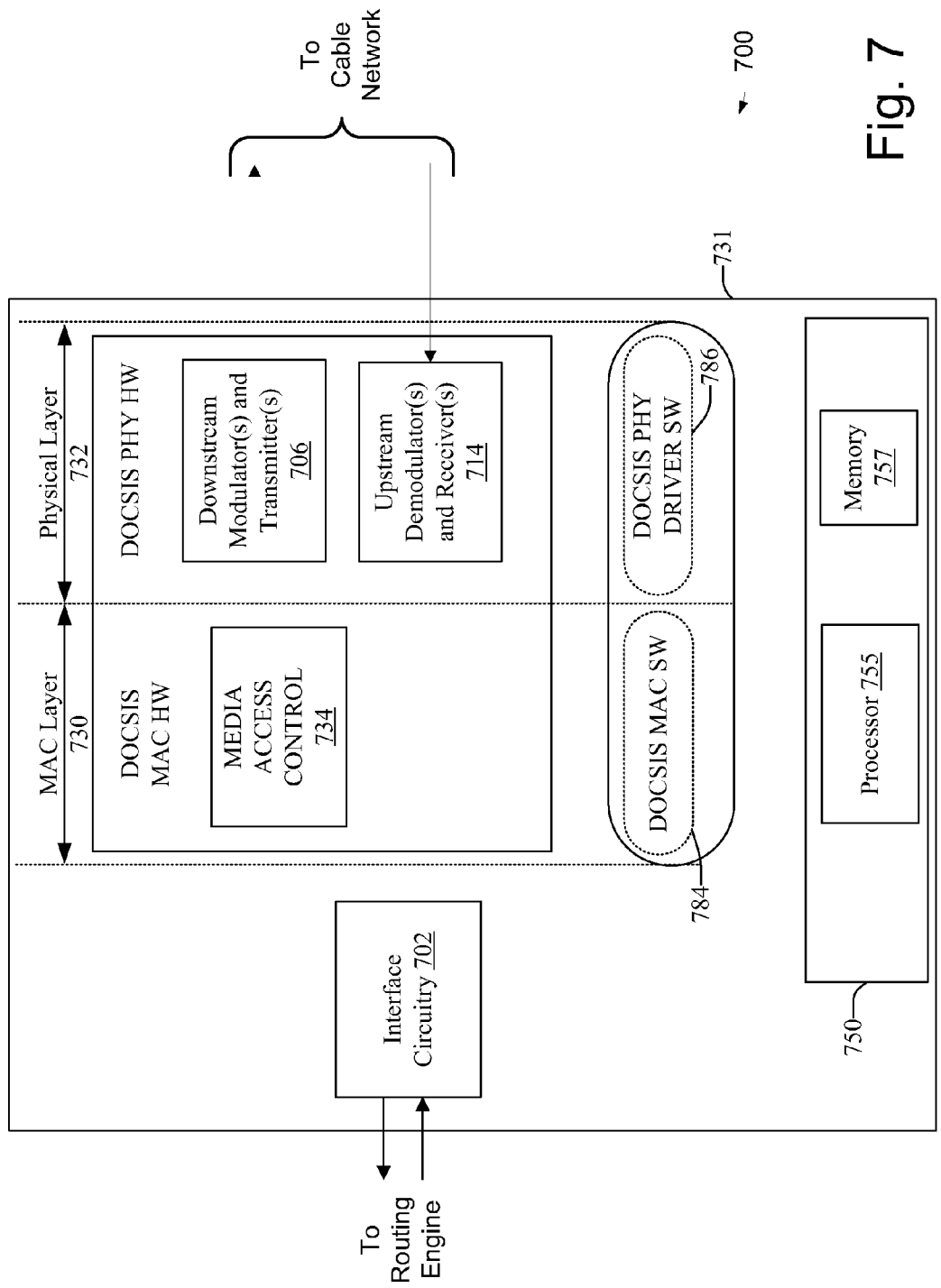
FIG. 7 illustrates a specific example embodiment of a line card.

According to different embodiments, one or more of the routing engines may be configured to communicate with a plurality of different line cards such as that illustrated, for example, in FIG. 7 of the drawings. According to a specific embodiment, the line cards may include different types of line cards which have been specifically configured to perform specific functions. For example, in at least one embodiment, some line cards may be implemented as radio-frequency (RF) line cards which have been configured or designed for use in a cable network. Additionally, some line cards may be implemented as network interface cards which have been configured or designed to interface with different types of external networks (e.g. WANs, LANs, etc.) utilizing different types of communication protocols (e.g. Ethernet, Frame Relay, ATM, TCP/IP, etc.). For example, in at least one embodiment, one or more line cards may be operable to communicate with external data sources via, for example, optical fiber, microwave link, satellite link, and/or through various media. A data network interface may include hardware and software for interfacing to various networks. According to various embodiments, a data network interface may be implemented on a line card as part of a conventional router for a packet-switched network. Using this type of configuration, the CMTS may be able to send and/or receive IP packets to and from the data network interface using, for example, network layer software.

According to a specific embodiment, the operations associated with obtaining an IP address for cable modems may be implemented by appropriate network layer software at the CMTS. This may involve the CMTS communicating with a DHCP server (not shown) via a data network interface, for example.

In at least one embodiment, at least a portion of the line cards may include respective interface circuitry for providing an appropriate interface between the host line card, other line cards, and/or the routing engine(s). According to specific embodiments, the interface circuitry may be operable to function as a translator that converts conventional formats of data received at the line cards to a suitable protocol format for transmission from the line card to appropriate routing engine(s), line card(s), and/or other network devices.

At least some CMTS (or head end system) embodiments may be implemented on various general purpose CMTSs. In a specific embodiment, systems may be specially configured CMTSs such as, for example, specially configured models in the uBR-7200 and uBR-10012 series of CMTSs available from Cisco Systems, Inc. of San Jose, Calif.

Although the system shown in FIG. 6 represents one specific CMTS architecture, it is by no means the only CMTS architecture on which embodiments can be implemented. For example, other types of interfaces and media could also be used with the CMTS.

FIG. 7 shows a specific embodiment of a CMTS line card 700 in accordance with a specific embodiment. According to a specific embodiment, the line card 700 may be configured or designed to implement selected aspects of the DOCSIS functionality such as, for example, DOCSIS MAC functionality and/or other functionality which conventionally has been implemented at the CMTS.

In the specific embodiment as shown in FIG. 7, line card 700 may be operable to provide functions on several network layers, including a physical layer 732, and a Media Access Control (MAC) layer 730. Generally, the physical layer is responsible for receiving and transmitting signals on the cable plant. Hardware portions of the physical layer include one or more downstream modulator(s) and transmitter(s) 706 and/or one or more upstream demodulator(s) and receiver(s) 714. The physical layer also includes software 786 for driving the hardware components of the physical layer. Similarly, in some embodiments, one or more cable modems on a cable network may include one or more downstream demodulator(s) and receiver(s) and/or one or more upstream modulator(s) and transmitter(s).

Upstream optical data signals (e.g., representing one or more packets) arriving via an optical fiber node may be converted to electrical signals, and then demodulated by the demodulator/receiver 714. The demodulated information is then passed to MAC layer block 730.

One purpose of MAC layer 730 is to encapsulate, with MAC headers, downstream packets and decapsulate, of MAC headers, upstream packets. In at least one embodiment, the encapsulation and decapsulation proceed as dictated by the above-mentioned DOCSIS standard for transmission of data and/or other information. The MAC headers include addresses to specific modems (if sent downstream), and/or to the CMTS (if sent upstream). Note that the cable modems may also include MAC addressing components. For example, in one embodiment of the cable modems, these components encapsulate upstream data with a header containing the MAC address of the CMTS.

MAC layer 730 includes a MAC hardware portion 734 and a MAC software portion 784. The MAC layer software portion may include software relating to DOCSIS MAC functionality, etc. The MAC layer hardware and software portions operate together to provide the MAC functionality, such as, for example, DOCSIS MAC functionality. In one embodiment, MAC controller 734 may be dedicated to performing some MAC layer functions, and may be distinct from processor 755.

In one embodiment, upstream information processed by MAC layer block 730 may be forwarded to interface circuitry 702. As described previously, interface circuitry 702 includes appropriate hardware and/or hardware and software for converting data formats received at the line cards to a suitable protocol format for transmission from the line card to other appropriate devices, components and/or systems.

In one embodiment, when a packet is received from the routing engine at the interface circuitry 702, the packet may be passed to MAC layer 730. The MAC layer 730 may transmit information via a one-way communication medium to downstream modulator and transmitter 706. Downstream modulator and transmitter 706 may be operable to take the data (or other information) in a packet structure and convert it to modulated downstream frames, such as, for example, MPEG and/or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data may likewise be modulated using, for example, QAM16 and/or QSPK. According to a specific embodiment, the modulated data is converted from IF electrical signals to RF electrical signals (or vice-versa) using one or more electrical signal converters (not shown).

As shown in FIG. 7, line card 700 includes a central hardware block 750 including one or more processors 755 and memory 757. These hardware components interact with software and other hardware portions of the various layers within the line card. They provide general purpose computing power for much of the software. Memory 757 may include, for example, I/O memory (e.g. buffers), program memory, shared memory, etc. One or more data structures used for implementing one or more embodiments may reside in such memory. In at least one embodiment, the software entities 784, 786 may be implemented as part of a network operating system running on hardware 750. At least a part of the interface functionality described herein may be implemented in software as part of the operating system. In the example of FIG. 7, such software may be part of MAC layer software 784, and/or may be closely associated therewith. Of course, at least a portion of the interface logic described herein could reside in hardware, software, or some combination of the two.

According to specific embodiments, at least a portion of the typically employed by the CMTS during registration and pre-registration may be performed at the MAC layer of the line card 700 and/or at other portions of the CMTS 200.

According to a specific embodiments, at least a portion of functions described herein which may be performed by the CMTS (e.g. FIG. 6), line cards (e.g. FIG. 7), and/or selected components thereof, may be implemented in a centralized CMTS system (e.g., residing at the Head End Complex of the cable network), and/or may be implemented at one or more distributed CMTS (DCMTS) systems (e.g. residing at one or more fiber nodes).

One or more embodiments may be implemented in any computer network having a standardized protocol for utilizing a central termination system (e.g. Head End) to schedule timeslots for remote stations and/or nodes on one or more return (or upstream) channel(s). In wireless networks, the central termination system may be referred to as a Head End and/or wireless base station. In satellite networks, the central termination system may be referred to as a master controlling station.

Figure 8A:
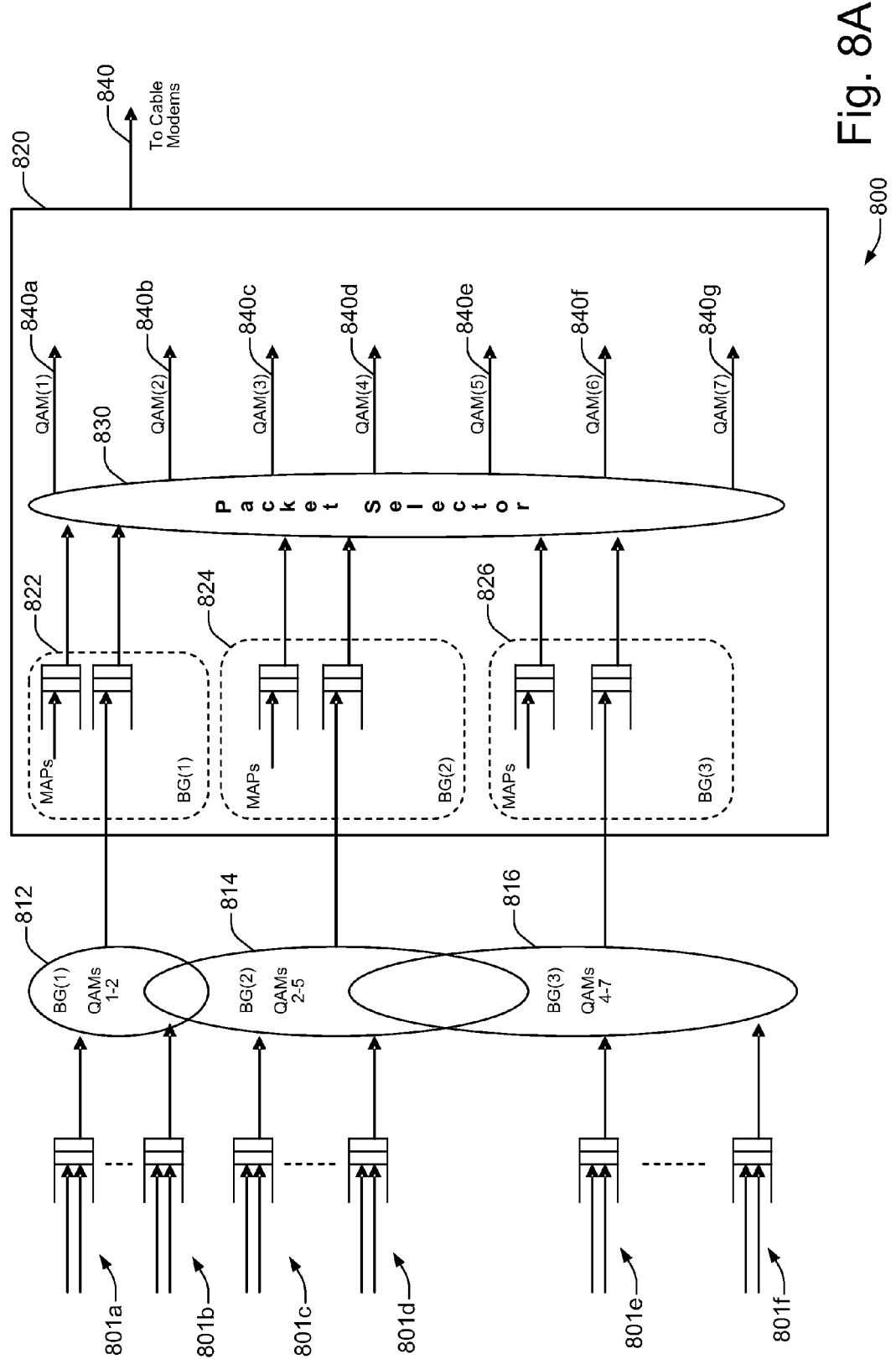
FIG. 8A illustrates a specific example embodiment of a portion of a cable network 800.

FIG. 8A shows a block diagram of a specific example embodiment of a portion of a cable network 800. As illustrated in FIG. 8A, network portion 800 includes one or more QAMs 840*a-g* configured to transport traffic associated with one or more traffic portions 801*a-f*. Network portion 800 further includes one or more Bonding Groups (e.g., Bonding Groups BG(1) 812, BG(2) 814, BG(3) 816) that each include one or more channels (e.g., QAMs). As illustrated in FIG. 8A, network portion 800 is configured such that traffic associated with a respective traffic portion may be transported via one or more QAMs associated with a respective Bonding Group.

As shown in the example of FIG. 8A, network portion 800 includes one or more traffic portions 801*a-f*. Each (or selected) traffic portions may be associated with a respective type of service flow used for transporting selected traffic. For example, a first traffic portion 801*a* may be associated with a first type of service flow associated with a first type of traffic (e.g., VOIP traffic). A second traffic portion 801*b* may be associated with a second type of service flow associated with a second type of traffic (e.g., internet traffic). A third traffic portion 801*c* may be associated with a third type of service flow associated with a third type of traffic (e.g., VoD traffic). In various embodiments, various traffic portions may be associated with various types of service flows.

In at least one embodiment, a cable modem may be associated with one or more service flows. According to some embodiments, different service flows may be used to characterize selected upstream and/or downstream data stream(s) transported between one or more network entities (e.g., CMTS, CMs, devices, components, network nodes, etc.). Each (or selected) service flows may be associated with one or more attributes or parameters related to QoS (e.g., minimum bandwidth rates, maximum bandwidth rates, etc.).

A communication channel (herein referred to as "QAM") is illustrated at 840*a* according to a specific embodiment. In the specific embodiment of network portion 800 illustrated in FIG. 8A, the QAMs in group 840 are downstream QAMs operable to transport data from one or more CMTSs to one or more cable modems. In different embodiments (not shown), upstream channels that transport data from one or more cable modems to one or more CMTSs may be used.

As shown in the example of FIG. 8A, network portion 800 includes one or more Bonding Groups (e.g., 812, 814, 816). According to different embodiments, a Bonding Group represents a group of QAMs on which data associated with one or more service flows may be transmitted. For example, in the specific example embodiment network portion 800, Bonding Group BG(1) 812 includes QAM(1) and QAM(2) and which can be used to transport traffic associated with service flows associated with traffic portions 801*a* and 801*b*. Bonding Group BG(2) 814 includes QAM(2), QAM(3), QAM(4), and QAM(5) and which can be used to transport traffic associated with service flows associated with traffic portions 801*c* and 801*d*. Bonding Group BG(3) 816 includes QAM(4), QAM(5), QAM(6), and QAM(7) and which can be used to transport traffic associated with service flows associated with traffic portions 801*e* and 801*f*.

In at least one embodiment, as illustrated in FIG. 8A, traffic associated with a specific service flow may be scheduled for transmission on a Bonding Group spanning multiple QAMs. For example, in the specific example embodiment of network portion 800, traffic scheduled for transmission on Bonding Group BG(1) may be scheduled for transmission on either of QAM(1) or QAM(2). Traffic scheduled for transmission on Bonding Group BG(2) may be scheduled for transmission on any of QAM(2), QAM(3), QAM(4), or QAM(5). Traffic scheduled for transmission on Bonding Group BG(3) may be scheduled for transmission on any of QAM(4), QAM(5), QAM(6), or QAM(7). In at least one embodiment, one or more QAMs may be shared by multiple Bonding Groups. For example, in the specific example embodiment of network portion 800, QAM(2) is associated with Bonding Groups BG(1) and BG(2), and QAM(4) and QAM(5) are each associated with Bonding Groups BG(2) and BG(3). As discussed above, such overlapping associations of Bonding Groups and/or channels make traffic scheduling with QoS assurances very complex, and existing traffic scheduling techniques may not be compatible with scheduling traffic in accordance with QoS assurances on cable networks configured in accordance with DOCSIS 3.0.

As illustrated in the example embodiment of FIG. 8A, network portion 800 may include a packet scheduler/transmitter 820 which, for example, may configured with necessary hardware and/or hardware and software to schedule packets for transmission to one or more cable modems via one or more QAMs. In at least one embodiment, packets may be scheduled for transmission at packet scheduler/transmitter 820 using, for example, one or more different traffic scheduling techniques such as, for example, shortest queue first (SQF), weighted fair queuing (WFQ), etc.

In one or more embodiments, packet scheduler/transmitter 820 may schedule packets for transport using one or more technique(s) implemented in hardware, such as for example hardware associated with a network processor, and/or some combination of hardware and software, such as for example executable code implemented by one or more processors.

In at least one embodiment, packet scheduler/transmitter 820 may also be operable to perform one or more operations related to load balancing and/or traffic shaping. According to different embodiments, packet scheduler/transmitter 820 may be unable to perform one or more operations related to load balancing and/or traffic shaping. In at least one embodiment, it may be desirable to transport traffic to packet scheduler/transmitter 820 in such a way that packet scheduler/transmitter 820 can schedule traffic for transmission without engaging in one or more operations related to load balancing or traffic shaping.

Figure 8B:
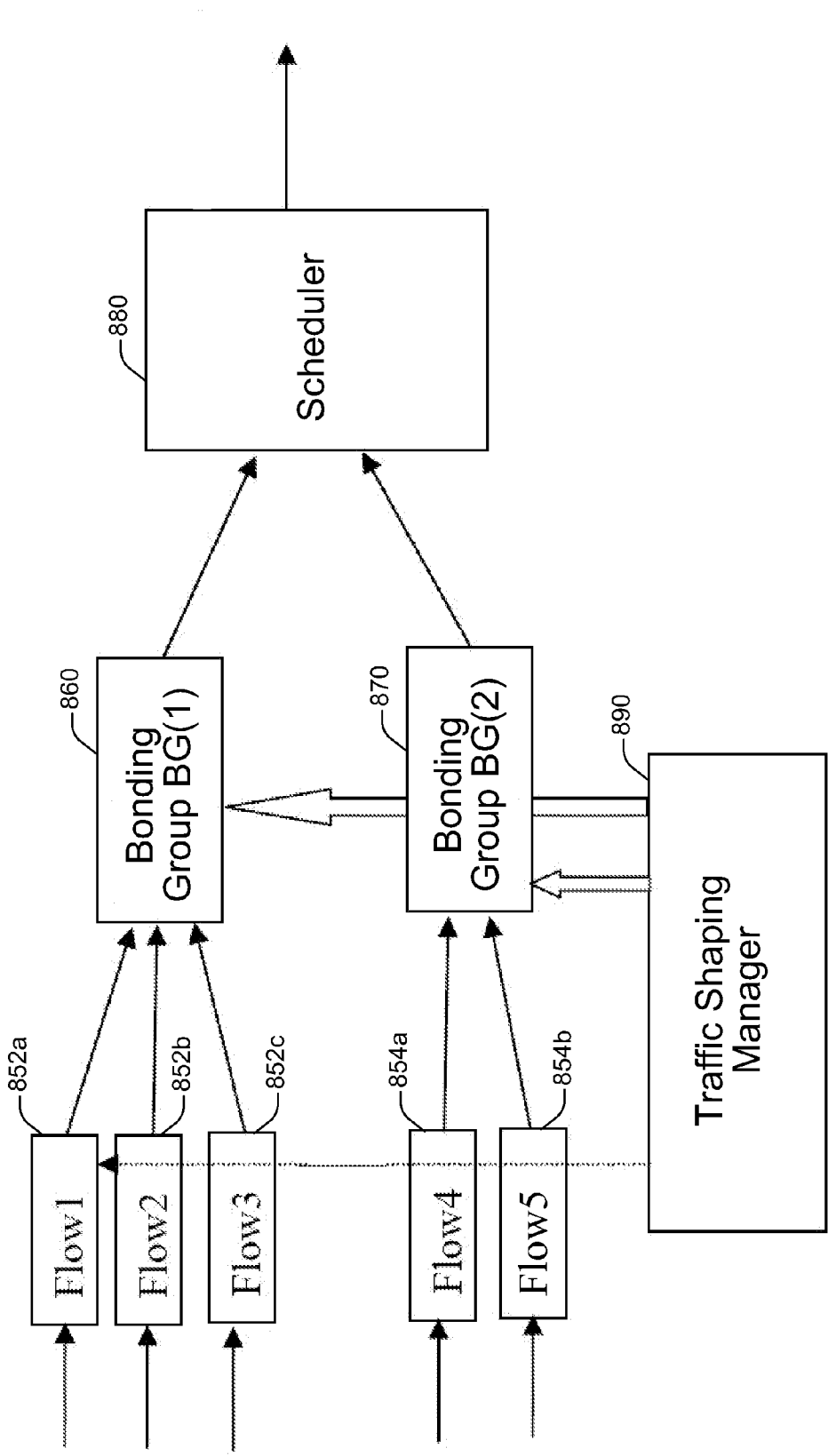
FIG. 8B illustrates a specific example embodiment of a portion of a cable network 850.

FIG. 8B shows a block diagram of a specific example embodiment of a cable network portion 850.

As illustrated in FIG. 8B, network portion 850 includes at least one Traffic Scheduler 880 and at least one Traffic Shaping Manager 890. Network portion 850 further includes one or more Bonding Groups (e.g., Bonding Groups BG(1) 860 and BG(2) 870). As discussed above, a respective Bonding Group may include one or more channels on which traffic associated with one or more service flows (e.g., 852*a*, 852*b*, 852*c*, 854*a*, 854*b*, etc.) may be scheduled for transport. For example, traffic from service flow Flow 1 852*a*, service flow Flow 2 852*b*, and service flow Flow 3 852*c* may be scheduled for transmission on Bonding Group BG(1) 860. Further, traffic from service flow Flow 4 854*a* and service flow Flow 5 854*b* may be scheduled for transmission on Bonding Group BG(1) 870.

In the specific example embodiment of FIG. 8B, network portion 850 includes Scheduler 880. In some embodiments, Scheduler 880 may perform functions substantially similar to those described with respect to packet scheduler/transmitter 820 in FIG. 8A.

In the specific example embodiment of FIG. 8B, network portion 850 includes Traffic Shaping Manager 890. According to various embodiments, Traffic Shaping Manager 890 may include various types of hardware and/or software components such as, for example, one or more of the following (or combinations thereof):

A network processor or packet processor (e.g., CPP).
Software executed in a CMTS and/or line card.
Etc.

In at least one embodiment, Traffic Shaping Manager 890 may be configured with appropriate hardware and/or hardware and software for implementing one or more operations related to traffic shaping analysis and/or traffic shaping adjustment such as those described herein. For example, Traffic Shaping Manager 890 may include appropriate hardware and/or hardware and software for implementing and/or populating different data structures related to traffic shaping analysis and/or traffic shaping adjustment. In at least one embodiment, at least one data structure may be operable to track information relating to the amount of data scheduled for transmission (e.g., over one or more time intervals) via one or more Bonding Groups and/or channels.

In at least one embodiment, Traffic Shaping Manager 890 may be configured with hardware and/or hardware and software appropriate to allocate or assign (e.g., for traffic shaping purposes) selected packets relating to a given service flow (e.g., Flow 1 852*a*) to one or more different QAMs associated with a given Bonding Group (e.g., BG(1) 860). In some embodiments, Traffic Shaping Manager 890 may be operable to implement various functions relating to one or more of the traffic shaping techniques described herein.

In some embodiments, inputs to Traffic Shaping Manager 890 may include downstream or upstream traffic which is to be scheduled for communication between a CMTS and one or more CMs of the cable network. In some embodiments, Traffic Shaping Manager 890 be configured or designed to generate various types of output information and/or control signals which, for example, may be provided to selected component(s) of a CMTS (and/or Cable Modem), which, for example, may be used for shaping traffic associated with one or more Bonding Groups and/or service flows.

In at least one embodiment, a Bonding Group may be represented as a Bandwidth Limited Tunnel ("BLT") (e.g., a Schedule in a CPP, etc.). For example, in one embodiment, all (or selected ones of) the service flows belonging to the Bonding Group may be mapped as queue entries to this BLT. Since the effective bandwidth of a Bonding Group may be not deterministic, it may be determined by the relative traffic demand. In one embodiment, the output of the Bonding Group may be fed to a traffic scheduler (such as, for example, a Jib implementing an SQF scheduling algorithm).

In at least one embodiment, the shaping rate (or the effective bandwidth) of the Bonding Group scheduler may be dynamically adjusted based on the aggregate traffic demand on that Bonding Group. The incoming traffic on all (or selected ones of) the Bonding Groups may be continuously monitored.

Based on the measured rates of the incoming traffic on all (or selected ones of) the Bonding Groups, a background task (e.g., associated with Traffic Shaping Manager 890) periodically calculates the new shaping rate for each Bonding Group. According to one embodiment, the dynamically adjusted Bonding Group bandwidth may be utilized in conjunction with SQF (e.g., in a MAC-layer processor) to ensure that the QAM bandwidth may be utilized efficiently, under the assumption that the bandwidth of a Bonding Group changes slowly at the timescale of bandwidth adjustment. This assumption may be reasonable if Bonding Groups may be highly aggregated and/or, and/or the rate adjustment may be done relatively often. Both of these aspects are discussed below.

In DOCSIS 3.0 compatible cable networks, it is anticipated that cable operators may be able to deploy several hundred users on a single Bonding Group. As such the average traffic volume on a single Bonding Group may be fairly stable. For bandwidth updates rates close to one second, this scheme could give reasonable utilization of the bandwidth.

According to different embodiments, the implementation of such a scheme may involve several components, such as, for example: (1) measuring the incoming traffic volume, and/or (2) adjusting the allocated bandwidth periodically, etc. For example, in at least one embodiment, a bandwidth adjustment algorithm based on traffic demand may be provided which is configured or designed to account for total QAM bandwidth, and/or to keep track of Bonding Group to QAM association. According to various embodiments, such proposed schemes/algorithms may be configured or designed to implement (and/or address) one or more of the following considerations (or combinations thereof):

Each QAM may preferably allocate certain fraction of its total bandwidth to each Bonding Group it may be member of. The Sum of all (or selected ones of) the fractions may preferably add up to the total QAM bandwidth (e.g. the bandwidth allocation may be "feasible"). In one embodiment, this allocation may be logical in the sense that it may not be explicitly configured. In one embodiment, a scheduling algorithm (e.g., SQF) may be provided to distribute the incoming "feasible" traffic among different QAMs.

The effective shaping bandwidth of the Bonding Group may be related to the sum of bandwidth fractions contributed by all (or selected ones of) the QAMs it is associated with.

Some of the Bonding Groups may have service flows with non-zero minimum reserved rates. In some embodiments, the allocated bandwidth for a Bonding Group may preferably be greater than sum-total of Min-Rates of all (or selected ones of) the flows (henceforth referred to as Bonding Group Min-Rate).

In situations where most or all of the Bonding Groups are not congested, the excess bandwidth may preferably be fairly distributed among all (or selected ones of) the Bonding Groups. According to different embodiments, various types of policies, parameters, criteria, and/or algorithms may be utilized for implementing and/or policing the fairness of the distribution of the excess bandwidth such as for example, one or more of the following (or combinations thereof): distributing excess bandwidth equally among the Bonding Groups, distributing bandwidth based on the demand weight of Bonding Groups, etc.

When a Bonding Group is congested, the Min-Rate guarantees may be preserved. In one embodiment this may be achieved, for example, by giving bandwidth to the Min-Rate traffic before allocating it to the excess rate traffic.

In at least one embodiment, various operations relating to traffic shaping and/or traffic scheduling adjustment may be frequently and/or periodically initiated (e.g., on the order of about once every 0.5-2 seconds) for each Bonding Group. Accordingly, in at least one embodiment may be desirable that the traffic shaping and/or traffic scheduling algorithms not be very complex or compute intensive.

In attempting to satisfy each (or selected ones) of the considerations above, it will be recognized that the computation of the bandwidth allocation may not be a trivial operation. In one embodiment, at least a portion of operations may be executed by a control plane CPU (e.g., outside the CPP). However sending out the statistics for every Bonding Group and/or receiving and/or processing the new rate values may involve substantial IPC messages. Hence, in at least some embodiments, it may be preferable to execute the algorithm within the CPP itself.

Further, in at least one embodiment, one or more traffic shaping and/or traffic scheduling algorithms described or contemplated herein may preferably compute the contribution from each QAM to each of its Bonding Group, and based on this allocation, compute the shaping rate of each Bonding Group as the sum of the corresponding allocations over all (or selected ones of) QAMs associated with the Bonding Group.

In at least one embodiment, one or more traffic shaping procedures described herein may be based upon various embodiments of architectures described herein. In at least one embodiment, one or more traffic shaping procedures may be configured or designed to compute a dynamic estimate of the QAM shares that may preferably be allocated to different Bonding Groups (BGs). These dynamically calculated or determined shares may be then used to compute the shaping rates of the Bonding Groups. For example, in one embodiment, the shaping rate of a BG may be simply the sum of the bandwidth allocated to this BG in all (or selected ones of) QAMs this BG can use.

According to one embodiment, once the shaping rates are calculated or determined, an HQF-based rate-controlled scheduler/shaper may be used to shape the Bonding Groups to the desired (dynamically changing rates). The output of the shaper may be sent towards the QAMs, where the packets may be intercepted by a Shortest Queue First (SQF) scheduler. When SQF receives a packet of a particular Bonding Group, it places the packet in the least occupied queue of all (or selected ones of) QAMs that can service the Bonding Group of this packet. In one embodiment, it may be assumed that each QAM has a FIFO queue which may be drained at the rate corresponding to the capacity of the QAM.

One aspect described herein relates to various techniques for computing the dynamic bandwidth allocation of a QAM to different BGs. In one embodiment, a method may be based on an "SQF emulation" mechanism which periodically computes the allocation each BG would (hypothetically) get in each QAM over the measurement period, if all (or selected ones of) arriving packets were immediately sent to a (virtual) shortest FIFO queue of all (or selected ones of) all (or selected ones of) (logical) QAM queues this packet could go to. The mechanism then computes the total number of bytes that may be send to each QAM under such virtual SQF policy, and/or uses such "virtual SQF allocation" to guide the choice of the bandwidth sharing rations of each QAM, as described below.

Note the distinction between the actual SQF that may be used to schedule the packets leaving the shaper (in the data plane), and/or the virtual SQF that may be used to compute the rates of the shaper (in the control plane). Note also that simply using SQF (without shaping) in the dataplane may not be suitable in the case of overload, as the QAMs can potentially build large queues, causing potential violation of QOS guarantees of all (or selected ones of) flows sharing the QAM. Accordingly, one aspect described herein relates to various techniques for emulating the sharing achieved by the hypothetical scheduler to guide the shaping rates.

One proposed traffic shaping technique may be configured or designed to estimate the QAM shares that may preferably be allocated to different BGs (and/or, ultimately, the shaping rates of each BG). The traffic shaping technique may be based on emulating the allocation each BG would get in each QAM may preferably all (or selected ones of) packets were immediately sent to some QAM upon arrival, using a traffic shaping policy for choosing the QAM.

For example, in one embodiment, an emulated traffic scheduler may be provided which has been configured or designed to immediately send the arrived packet to the least utilized QAM of those this packet can use. Under such hypothetical policy, we count the number of bytes that would have been received under such hypothetical policy on each QAM from each BG, and/or use this count to compute the shaping rates as shown below. Note that such simple policy may not be suitable in the case of overload, as the QAMs can potentially build large queues, causing unacceptably high reordering (or order-restoration latency). However, we use this hypothetical policy to guide the desired shaping rates for the BGs.

It may be important to not confuse the emulated traffic scheduler (e.g., used for the purposes of computing the shaping rates as shown below), and the actual traffic scheduler used to schedule packets after they leave the BG shapers. The first one may be used in the control plane for the purposes of the computation of the "feasible" shaping rates, while the latter may be used for the actual packet scheduling in the dataplane.

The use of emulated traffic schedulers provides an efficient and/or relatively lightweight technique for computation of the effective sharing ratios. One or more traffic shaping techniques described herein may be used with relatively small modifications on a wide range of platforms as it essentially allows to use the existing scheduling architectures with a control plane modification guiding the allocation of the sharing rates.

One or more traffic shaping techniques described herein can also be used with the other techniques such as, for example, new or emerging traffic scheduling techniques which, for example, may be configured or designed to use static sharing rate allocations to allow dynamic changes of the scheduling weights.

In one embodiment, the QAM usage under the emulated traffic schedulers may be used to compute the shaping rates, which may be then periodically reconfigured in the scheduler. It may be noted that, in at least some embodiments, if incoming traffic is already feasible, then shaping may be undesirable.

One issue or consideration relating to the computation of traffic shaping rates concerns the issue of ensuring minimal rate guarantees. For example, if a service flow (or a set of service flows) within a BG do not utilize their rates in a measurement interval, and/or the shaping rate in the following interval may be based on the actual, rather than the guaranteed rate of the BG traffic, then there may be a danger that if the traffic increases in the following interval, the shapers may prevent realization of combined minimal rate guarantees of a BG, and/or consequently may result in a violation of the committed service guarantees.

Accordingly, it is specifically contemplated herein that, one or more situations may occur in which a BG is allocated the measured rate, even if this rate is below the minimal bandwidth guarantee of a BG (and/or therefore potentially violate the min rate commitment if the rate of the BG increases); and/or in which a BG is allocated at least the min rate even if that min rate is not utilized (and/or hence potentially suffer undesirable under-utilization if the input rate of the BG does not increase). There may be also be other situations in which a BG is allocated allocate some amount of bandwidth in-between the measured rate and/or the min rate to allow partial ramp-up in the next measurement interval.

Further, it is contemplated that, in at least some situations, one or more traffic shaping rate techniques described herein may be vulnerable to underutilization if the bandwidth of the BGs fluctuates substantially at the timescale of the measurement interval, even if minimal rate guarantees may not be configured. However, it is anticipated that, in at least some embodiments, the BG may be expected to carry sufficiently aggregated traffic, and hence, fluctuations in the demand of the BG may be relatively small. Further, it is specifically contemplated that at least some traffic shaping techniques described herein may be configured or designed to address this issue in the case when the assumption of large aggregation and/or slow bandwidth fluctuations does not hold.

Specific example embodiments of operations related to traffic shaping analysis and traffic shaping adjustment are described with reference to FIGS. 9-16.

For purposes of explanation, and/or in order to avoid confusion, the following specific example embodiments will be described as applied to downstream traffic sent from one or more CMTSs on one or more downstream QAMs to one or more cable modems. However, these specific example embodiments are not intended to be limiting, and it will be appreciated that, in different embodiments (not shown), the techniques described herein may be adapted for use in conjunction with different types of traffic, different types of network devices/components, and/or different types of network environments, such as, for example, one or more of the following (or combinations thereof):

Upstream or downstream traffic.
Different types of channels (e.g., RF channels, etc.).
Different types of encoding techniques (e.g., quadrature amplitude modulation, quadrature phase shift keying, etc.).
Etc.

Figure 9:
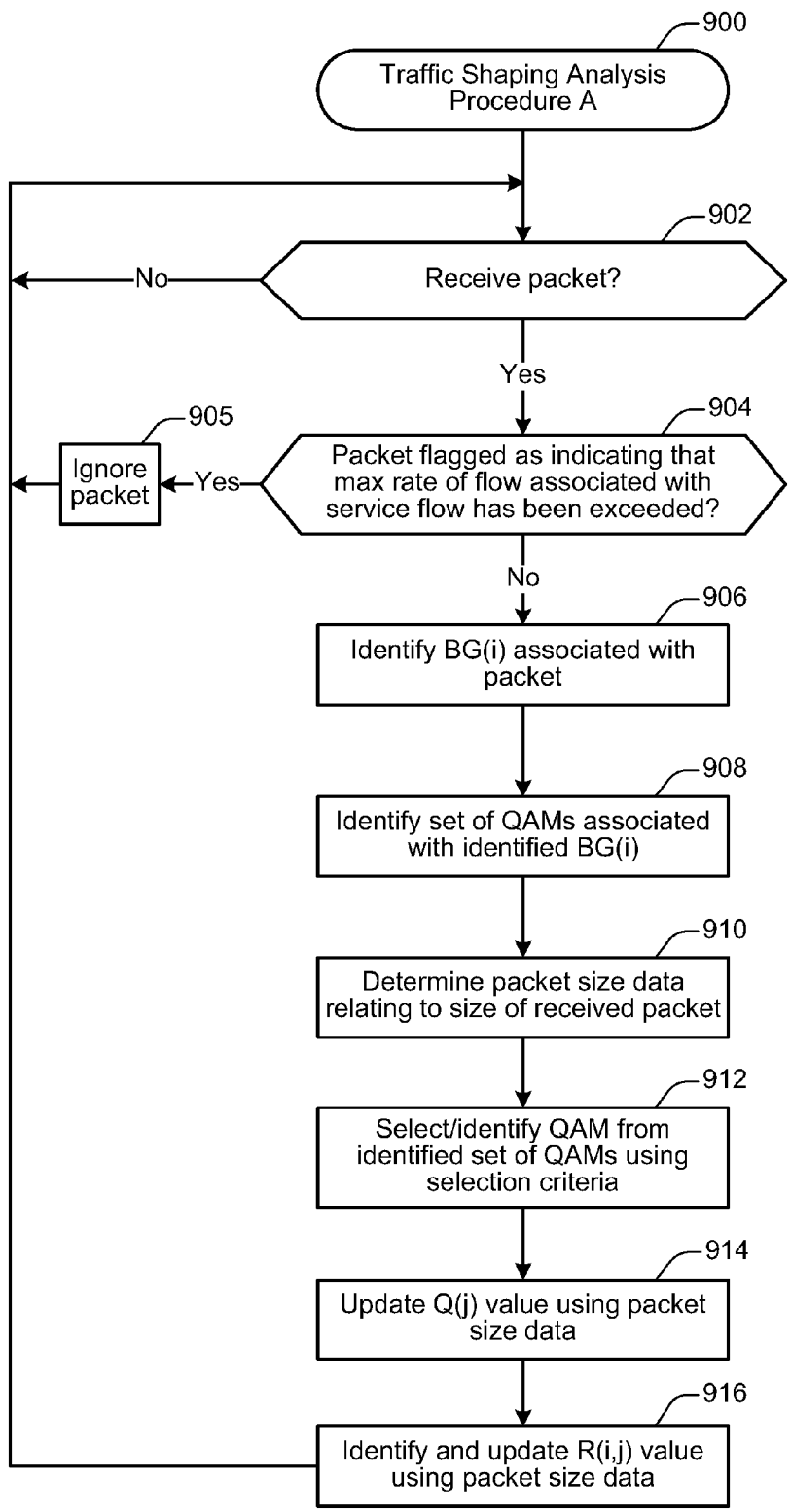
FIG. 9 illustrates a specific example embodiment of a Traffic Shaping Analysis Procedure.

FIG. 9 shows an example embodiment of a Traffic Shaping Analysis Procedure A 900 in accordance with a specific embodiment. In some embodiments, the Traffic Shaping Analysis Procedure may analyze network traffic information for the purpose of traffic shaping. For example, in some embodiments the output of the Traffic Shaping Analysis Procedure may be used to determine one or more shaping rates for one or more Bonding Groups. In some embodiments, for example, the output of the Traffic Shaping Analysis Procedure may be used as the input to one or more different procedures related to traffic shaping, such as for example the example embodiment of a Traffic Shaping Adjustment Procedure that will be described in reference to FIG. 10.

In one or more embodiments, a Traffic Shaping Analysis Procedure may be utilized in conjunction with a traffic shaping manager device, such as, for example, Traffic Shaping Manager 890 of FIG. 8B. In some embodiments, at least a portion of a Traffic Shaping Analysis Procedure may be initiated and/or implemented by one or more systems, devices, and/or controllers in a shared access network (e.g., a CMTS in a cable network). In some embodiments, at least a portion of a Traffic Shaping Analysis Procedure may be initiated and/or implemented by a network processor which has been configured or designed to include appropriate hardware and/or hardware and software for implementing or initiating aspects of the Traffic Shaping Analysis Procedure. One such network processor may be, for example, a Cisco Packet Processor (herein referred to as CPP), available from Cisco Systems, Inc. of San Jose, Calif.

In some embodiments, one or more different threads or instances of a Traffic Shaping Analysis Procedure may be implemented concurrently on one or more processors. In at least one embodiment, one or more different threads or instances of a Traffic Shaping Analysis Procedure may be initiated at periodic intervals (e.g., at regular periodic intervals, at irregular periodic intervals, upon termination of one or more different threads or instances of a Traffic Shaping Analysis Procedure, etc.). In some embodiments, one or more different threads or instances of a Traffic Shaping Analysis Procedure may be initiated in response to one or more conditions and/or events which satisfies minimum threshold criteria for triggering a Traffic Shaping Analysis Procedure. For example, one or more separate threads or instances of a Traffic Shaping Analysis Procedure may be initiated in response to receiving a packet. In one or more embodiments, one or more separate threads or instances of a Traffic Shaping Analysis Procedure may be initiated for each (or selected) Service Flow(s) and/or Bonding Group(s).

In some embodiments, one or more different threads or instances of a Traffic Shaping Analysis Procedure may be initiated upon demand (e.g., by a network operator, by a CMTS, by a network processor, by a traffic shaping manager, by a network node, by a cable modem, by a Bonding Group, etc.). According to various embodiments, one or more different threads or instances of Traffic Shaping Analysis Procedure may be triggered and/or implemented manually, automatically, statically, dynamically, concurrently, and/or some combination thereof.

For purposes of illustration, a specific example embodiment of a Traffic Shaping Analysis Procedure will be described by way of example with respect to FIG. 9.

As illustrated in the example embodiment of FIG. 9, it is assumed that the Traffic Shaping Analysis Procedure is implemented at a network processor which includes appropriate hardware and/or hardware and software for traffic shaping analysis. Different embodiments of the Traffic Shaping Analysis Procedure (not shown), may include one or more features or operations in addition to those illustrated in the specific example embodiment of FIG. 9. In various embodiments of the Traffic Shaping Analysis Procedure, one or more features or operations illustrated in the specific example embodiment of FIG. 9 may vary. In various embodiments of the Traffic Shaping Analysis Procedure, features or operations illustrated in the specific example embodiment of FIG. 9 may be omitted. Additionally, in various embodiments of the Traffic Shaping Analysis Procedure, features or operations illustrated in the specific example embodiment of FIG. 9 may be performed in a different order than is shown.

A specific example embodiment of a Traffic Shaping Analysis Procedure will be described by way of example with respect to the cable network configuration 1350 illustrated in FIG. 13A.

FIG. 13A shows a representation of a portion of cable network configured in accordance with a specific embodiment. The example cable network configuration 1300 illustrates a specific example configuration of a cable network wherein each Bonding Group (e.g., 1312, 1314, 1316) is associated with a respective group of QAMs. An "X" in the example cable network configuration 1300 indicates that, in this specific example embodiment, a particular Bonding Group (herein referred to as BG) is configured to communicate via use of one or more associated QAM(s).

For example, in the specific example embodiment of the cable network configuration illustrated at 1300, it is assumed that Bonding Group BG(1) 1312 includes QAM(1) 1302 and QAM(2) 1304, that Bonding Group BG(2) 1314 includes QAM(2) 1304 and QAM(3) 1306, and that Bonding Group BG(3) 1316 includes QAM(3) 1306 and QAM(4) 1308. In other embodiments (not shown), different combinations of Bonding Groups may be associated with different combinations of QAMs. Further, in at least one embodiment, based on the specific example embodiment of the cable network configuration illustrated at 1300, it may be assumed that Bonding Group BG(1) includes only the set of QAM(s) consisting of QAM(1) and QAM(2), that Bonding Group BG(2) includes only the set of QAM(s) consisting of QAM(2) and QAM(3), and that Bonding Group BG(3) includes only the set of QAM(s) consisting of QAM(3) and QAM(4).

In the example embodiments discussed herein, the term "BG(i)" may be used for reference purposes to refer to a specific Bonding Group, where "i" is a variable used to indicate a selected one of a plurality of BGs. For example, if i=1, a specific Bonding Group corresponding to BG(1) may be represented. In the example embodiments discussed herein, the term "QAM(j)" may be used for reference purposes to refer to a specific QAM, where "j" is a variable used to indicate a selected one of a plurality of QAMs. For example, if j=1, a specific QAM corresponding to QAM(1) may be represented.

Returning to FIG. 9, a packet may be received 902. In at least one embodiment, the packet is received at a network component (e.g., a CMTS, a traffic shaping manager device, a network processor, etc.) in the head end of a shared access network.

When a packet is received 902, the received packet may be analyzed 904 to determine whether it has been flagged as being associated with a service flow which has exceeded the maximum bandwidth rate associated with the service flow. In some embodiments, for example, the received packet may be associated with a first service flow which is associated with a cable modem.

As discussed above, according to various embodiments, a first cable modem may be associated with one or more service flows. In at least one embodiment, each (or selected) service flows may be associated with one or more different attributes (e.g., minimum bandwidth rates, maximum bandwidth rates, etc.) related to quality of service. In one or more embodiments, one or more QoS parameters may be defined and/or determined at one or more components (e.g., a CMTS) included in a network head end and/or hub. In various embodiments, one or more QoS parameters may be defined and/or determined manually, automatically, dynamically, statically, or some combination thereof. According to some embodiments, one or more QoS parameters may be defined and/or determined in accordance with an agreement between a service provider and a customer. For example, a service level agreement (herein referred to as SLA) with a first customer in a cable network may define one or more QoS parameters which may be associated with one or more types of data traffic flows. In some embodiments, one or more different customers may pay different amounts of money in exchange for different types and/or levels of service. For example, a first customer may pay more money than a second customer in exchange for a higher minimum bandwidth rate for internet traffic and/or a higher CBR for VOIP traffic.

In some embodiments, an SLA may define, for example, the maximum bandwidth associated with the first service flow. According to various embodiments, one or more service flows may be associated with a maximum bandwidth in different ways, which may include, but are not limited to, one or more of the following (or combinations thereof):

Assignment of a maximum bandwidth to a service flow by a device (e.g., a CMTS, a traffic shaping manager, etc.).

Assignment of a maximum bandwidth by a network operator (e.g., a network operator of a cable network, etc.).

Assignment of a maximum bandwidth to a service flow when the service flow is created (e.g., based on a CM configuration file, when a cable modem first registers, using DOCSIS signaling between a CM and the CMTS (e.g., in a voice call, etc.), when a cable modem is already registered, based on bandwidth capacity, etc.).
Etc.

According to various embodiments, whether a service flow has exceeded the maximum bandwidth associated with that service flow may be determined at one or more different network components, such as for example in the CMTS. In one embodiment, whether a service flow has exceeded the maximum bandwidth associated with that service flow may be determined, for example, after the service flow with which the packet is associated has been identified and/or before implementing one or more traffic shaping operations.

In at least one embodiment, a maximum bandwidth value associated with the service flow may be determined by one or more devices/systems (e.g., CMTS, Traffic Shaping Device, etc.) using various types of information. In some embodiments, the actual bandwidth associated with a service flow may be determined, for example by tracking the number and size of packets associated with a given service flow over one or more specified time intervals. A determination may be made as to whether a service flow has exceeded the maximum bandwidth associated with the service flow, for example, by then determining whether the actual bandwidth exceeds the maximum bandwidth value.

In one or more embodiments, if a determination is made that the maximum bandwidth associated with a service flow has been exceeded, then a status flag may be set. In some embodiments, for example, the status flag may be set by the device where the determination is made. In some embodiments, the status flag may include one or more bits or bytes associated with the received packet. According to various embodiments, possible locations of the status flag in the received packet may include, but are not limited to, one or more of the following (or combinations thereof):
One or more data structures.
The payload of the received packet.
Metadata associated with the received packet.
Etc.

In at least one embodiment, if it is determined that the received packet is associated with a service flow that has exceeded the maximum bandwidth associated with the service flow, then the received packet may be ignored (905). In some embodiments, if the received packet is ignored, then it may be ignored for purposes of further processing by the Traffic Shaping Analysis Procedure and/or forwarded to a different device or procedure for further processing. In different embodiments, if the received packet is ignored, then it may be dropped entirely and not processed further.

At 906 it is assumed that the received packet is not associated with a service flow that has exceeded the maximum bandwidth associated with the service flow. Accordingly, as shown, for example, at 906, a specific Bonding Group (BG(i)) associated with the received packet may be identified. According to various embodiments, a variety of different techniques may be used for identifying the specific Bonding Group associated with the received packet, such as, for example, one or more of the following (or combinations thereof):
Using an IP address associated with the received packet (e.g., the destination IP address, etc.).
Using information associated with the received packet (e.g., data in the packet header, data in the packet payload, metadata associated with the packet, etc.).
Using information stored in one or more data structures.
Using one or more values from a network device (e.g., a CMTS, a traffic shaping manager device, memory, etc.).
Etc.

By way of example with reference to the specific example embodiment of FIG. 13A, if it is assumed that the received packet is associated with Bonding Group 2, then BG(2) may be identified at 906.

As illustrated at 908, the set of one or more QAM(s) associated with the identified Bonding Group (e.g., BG(2)) may be identified. For example, referring again to the specific example embodiment of FIG. 13A, if it is assumed that the received packet is associated with Bonding Group BG(2), then the set of QAM(s) identified at 908 of FIG. 9 may correspond to QAM(2) 1304 and QAM(3) 1306. Similarly, if it were determined that that the received packet is associated with Bonding Group BG(1), the set of QAM(s) identified at 908 of FIG. 9 may correspond to QAM(1) 1302 and QAM(2) 1304.

According to various embodiments, various techniques may be used for identifying the particular set of QAM(s) associated with a given Bonding Group. For example, a set of QAM(s) may be identified by analyzing configuration information (e.g., from a data structure, from a network configuration, etc.).

As illustrated at 910, packet size data relating to the size of the received packet may be determined. In at least one embodiment, packet size is measured in bytes. According to various embodiments, packet size may be measured in one or more of bits, bytes, kilobits, kilobytes, etc. According to different embodiments, packet size may include the size of one or more of packet header data, payload data, and/or any other data associated with the packet (or any combination thereof). In the specific example embodiment discussed herein, it is assumed (e.g., for purposes of simplicity and ease of explanation) that the size of the received packet is "1" (e.g., 1 KB. However, it will be appreciated that in different embodiments, packets of different sizes may be received. In one embodiment, packet size may be determined by noting one or more memory locations associated with, for example, the start and end location of the packet in memory. In some embodiments, packet size may be determined by, for example, a forwarding entity.

A specific example embodiment of a Traffic Shaping Analysis Procedure will be described by way of example with respect to the specific example embodiment of a traffic shaping data structure 1350 illustrated in FIGS. 13B-H.

FIGS. 13B-H represent various types of data and/or data structures which may be used for implementing one or more aspects of the traffic shaping technique(s) described herein. In the specific example embodiments of FIGS. 13B-H, it is assumed that a cable network is configured according to the specific example embodiment of a cable network configuration shown in FIG. 13A. It will be appreciated that the specific example embodiments of the data structures and/or traffic shaping data illustrated and/or described with respect to FIGS. 13E-H have been simplified for purposes of illustration and ease of explanation, and is not intended to be limiting in any way.

FIG. 13B shows a representation of a traffic shaping data structure 1350 illustrating specific example traffic shaping-related data in accordance with a specific example embodiment. The specific example traffic shaping-related data illustrated in FIG. 13B may be populated by one or more threads or instances of a Traffic Shaping Analysis Procedure. One or more threads or instances of a Traffic Shaping Analysis Procedure may use traffic shaping-related data to perform one or more functions related to traffic shaping analysis. Alternate embodiments of the Traffic Shaping Analysis Procedure may be implemented using different types of traffic shaping data structures and/or different types of data, and/or may be implemented without requiring use of one or more traffic shaping related data structures.

Figure 13C:
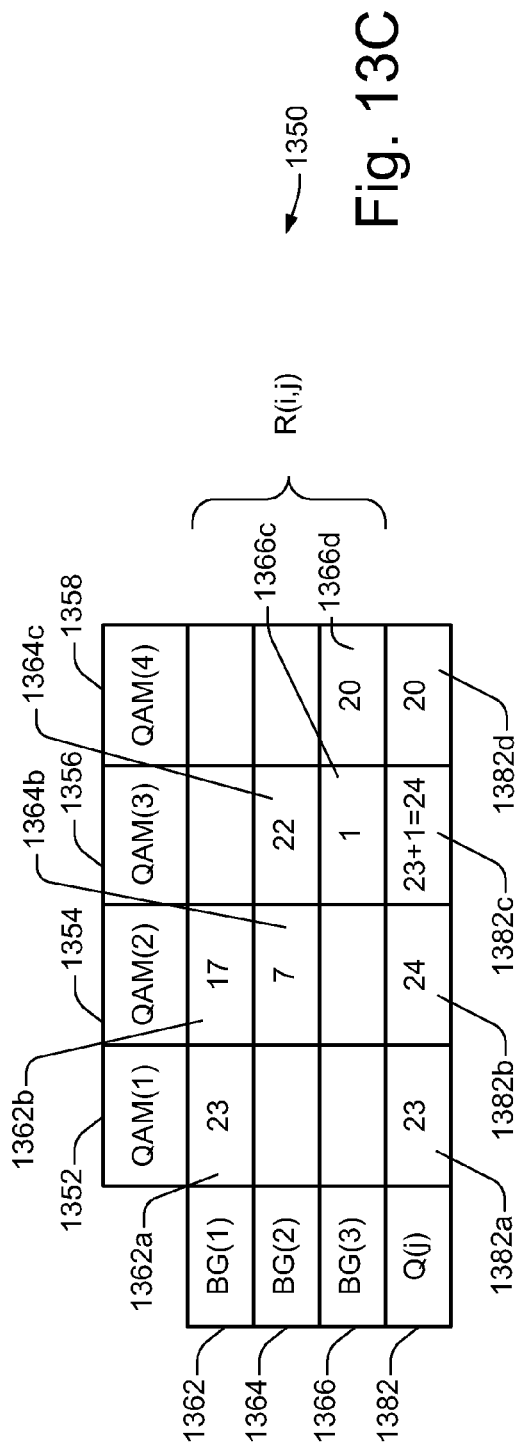
FIG. 13A illustrates a specific example embodiment of a configuration of a portion of a cable network.
FIGS. 13 B-H represent various types of data and/or data structures which may be used for implementing one or more aspects of the traffic shaping technique(s) described herein.
Figure 13D:
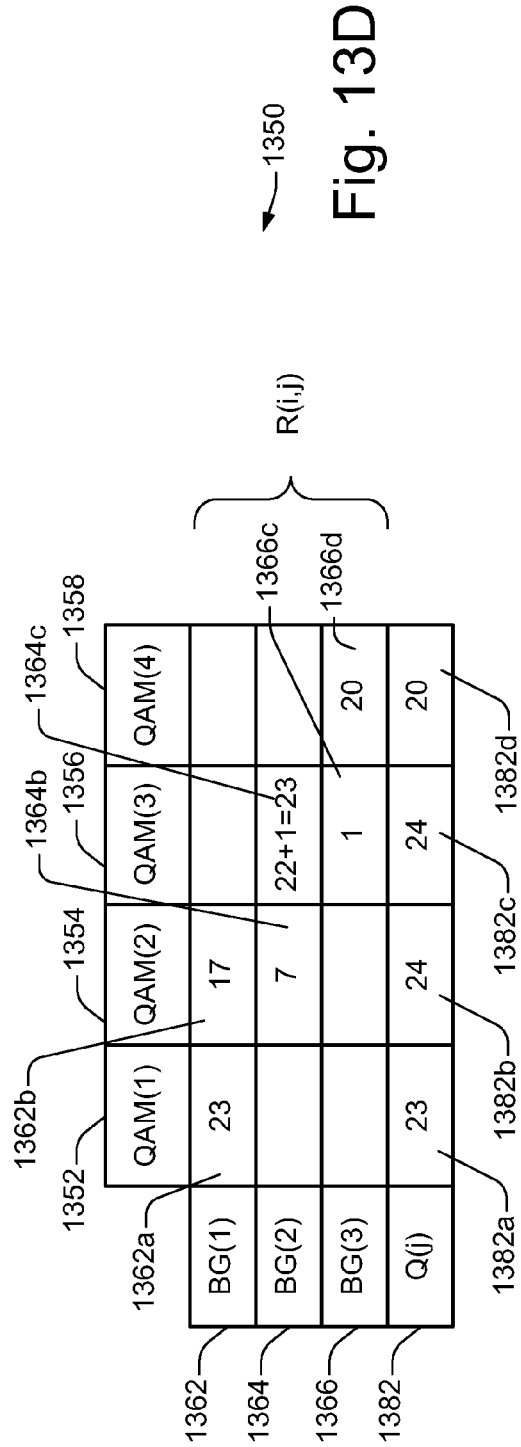

In the specific example embodiment of FIG. 13B, each Q(j) value represented at row 1382 may correspond to a particular Q(j) value which is associated with a respective QAM(j). In at least one embodiment, a Q(j) value may represent channel traffic data. For example, in some embodiments, channel traffic data Q(j) may represent, for example, an aggregate value of traffic that may be scheduled for transmission on a particular QAM(j) (e.g., during one or more time interval(s)). For example, in the specific example embodiments of FIGS. 13B-H, it is assumed that channel traffic data Q(j) are represented by numeric values, wherein a given Q(j) value is an aggregate value representative of the summation of the sizes of all (or selected) packets which may be scheduled for transmission on a given channel (e.g., QAM(j)) during at a given time interval. In different embodiments, Q(j) may represent a different quantity, such as for example a value related to an aggregation of the sizes of packets scheduled to be sent on QAM(j).

In other embodiments, the Q(j)-related data may be representative of other channel traffic data which may be used for performing traffic shaping across one or more channels associated with one or more Bonding Groups. In various embodiments, information or packet size may be measured or expressed according to various units such as, for example, bits, bytes, kilobits, kilobytes, megabits, megabytes, etc. In the specific example embodiments of FIG. 13B-H, for purposes of illustration it will be assumed that information or packet size is measured in megabits. However, in various embodiments packets may be of various sizes (e.g., 40 kilobits, 563 kilobits, etc.) may be received, and the use of packets of 1 Mbps for illustration purposes should not be construed as limiting in any way.

In at least one embodiment, one or more of the different types of data represented in FIG. 13B-H may be implemented and/or stored via the use of one or more counters (e.g., virtual counters implemented via the use of hardware and software). For example, according to different embodiments described herein, one or more of the following types of counters may be utilized:

Per Bonding Group counter: BG(i), which, for example, may represent a number of bytes received on a Bonding Group i).

Per QAM counter: Q(j), which, for example, may represent a number of bytes potentially queued on a QAM(j) (e.g., for traffic shaping purposes).

Per Bonding Group, per QAM counter, R(i,j), which, for example, may represent a number of bytes potentially queued on a QAM(j) coming from Bonding Group BG(i) (e.g., for traffic shaping purposes).

In at least one embodiment, when a packet arrives to the system (and/or is queued in the actual queue), these counters may be updated as follows:

Increment the counter BG(i) with the number of bytes in the packet, for the Bonding Group BG(i) which the packet was received on.

Check the per QAM counters for all (or selected ones of) the QAMs the Bonding Group may be a member of, and/or selects the QAM(j) with relatively lowest value of Q(j).

Increment R(i,j) for the selected QAM(j) and the Bonding Group BG(i).

Increment Q(j), for the selected QAM(j).

In one embodiment, one or more of these counters may be collected over the measurement interval between bandwidth adjustment, and/or may be used for the bandwidth usage estimation as described herein.

In at least one embodiment, the Traffic Shaping Analysis Procedure may preferably compute allocation from each QAM to each Bonding Group. For example, referring to the example of FIG. 13B, the Traffic Shaping Analysis Procedure may be configured or designed to ensure that all (or selected ones of) the QAM bandwidth constraints and/or parameters may be satisfied, while, at the same time, allowing for the various bandwidth demands to be met.

One possible approach for solving this problem is via the use of Linear Programming (LP) algorithms. Other possible approaches for solving this problem may include, for example, one or more a number of available methods in the wide arsenal of LP solvers (e.g., a simplex method, etc.). While different solvers differ in complexity, in general they may not be trivial to implement in a network processor such as, for example, CPP. Furthermore, implementing such solutions it in the control plane CPU would involve the use of significant CPU power and/or excessive IPC messages. Hence, in at least one embodiment, a simpler solution may be desirable.

Returning to FIG. 9, as illustrated at 912, one or more QAMs is selected or identified from the identified set of QAMs using a first set of selection criteria. For example, in some embodiments, the selection of the QAM (e.g., at 912) may be based upon the relative values of the Q(j) data and/or other channel traffic data associated with each QAM that has been identified (e.g., at 908) as being associated with a particular Bonding Group. For example, in some embodiments the QAM (of the identified set of QAMs) which currently has the relatively smallest amount of scheduled traffic may be selected. For example, in one embodiment, the QAM (of the identified set of QAMs) which currently has the relatively lowest or smallest Q(j) value may be selected.

It will be appreciated, however, that in different embodiments, other types of selection criteria may be used such as, for example: selecting the QAM(s) with the relatively greatest or largest Q(j) value(s), etc. In some embodiments, if we selection criteria results in more than one QAM being selected from the identified set of QAMs, (e.g., if two Q(j) values are equally small), then a specific one of these QAMs may be selected, for example, using other selection mechanisms and/or selection criteria such as, for example, random selection, selection based upon available channel capacity, selection based upon data relating to channel performance history, etc.

By way of example with reference to the specific example embodiment of FIG. 13B, it is assumed that QAM(2) and QAM(3) are identified (e.g., at 908) as being associated with Bonding Group BG(2). Accordingly, in this particular example, it is assumed (at 912) that the QAM with the relatively smallest Q(j) value is selected from the respective Q(j) values corresponding to QAM(2) and QAM(3). Thus, for example, as illustrated in the example embodiment of FIG. 13B, the Q(j) value associated with QAM(2) is Q(2)=24 (1382b) and the Q(j) value associated with QAM(3) is Q(3) =23 (1382c). Accordingly, in this specific example embodiment, QAM(3) may be selected or identified at 912. In a different example embodiment (not shown), if instead it were assumed that QAM(1) and QAM(2) were identified, then QAM(1) may be selected or identified to be the QAM with the relatively smallest Q(j) value from the identified set of QAMs since, for example, as illustrated in the example embodiment of FIG. 13B, Q(1)=23 and Q(2)=24.

As illustrated at 914, the Q(j) value corresponding to the particular QAM (e.g., QAM(3)) which was selected at 912 may be automatically and/or dynamically updated using the packet size data (e.g., as determined at 910). According to various embodiments, the selected Q(j) value may be modified or updated using the packet size data according to various methods (e.g., adding, incrementing, etc.).

For example, in one embodiment, the selected Q(j) value may be updated by adding the packet size data thereto. An example of this is illustrated at 1351 of FIG. 13C, wherein the Q(3) value (e.g., "23") corresponding to QAM(3) is shown being updated using the packet size data (e.g., "1" megabit) representing the size of the received packet (e.g., as determined at 910). Thus, in this particular example, the Q(3) value may be automatically and dynamically updated, for example, by adding the value "1" to the value "23" to achieve an updated Q(3) value of "24".

As illustrated at 916, one or more R(i,j) values may be automatically and/or dynamically updated using the packet size data (e.g., as determined at 910). According to various embodiments, the selected R(i,j) value may be modified or updated using the packet size data according to various methods (e.g., adding, incrementing, etc.)

In one or more embodiments described herein, the expression R(i,j) may be used to represent traffic data relating to or associated with a specific Bonding Group (BG(i)) and a specific QAM(j). In some embodiments, R(i,j) may correspond to traffic data representing a rate associated with traffic from BG(i) to QAM(j). For example, in the specific example embodiment of FIG. 13B, the expression R(1,2) may be interpreted as referring to the specific traffic shaping data associated with Bonding Group BG(1) and QAM(2), which, for example, is represented at 1362*b* (FIG. 13B). Similarly, the expression R(2,3) may be interpreted as referring to the specific traffic shaping data associated with Bonding Group BG(2) and QAM(3), which, for example, is represented at 1364*c* (FIG. 13B).

In at least one embodiment, the traffic shaping data associated with a given R(i,j) may be representative of an aggregate or cumulative amount of traffic relating to packets associated with one or more service flows (e.g., associated with a selected BG(i)) which may be scheduled for transmission (e.g., during one or more time interval(s)) on a selected channel QAM(j). For example, in the specific example embodiment of FIG. 13B, the traffic shaping data value corresponding to R(1,2) is 17 (e.g., as shown at data portion 1362*b*). In one embodiment, this value may be interpreted as meaning that the aggregate or cumulative amount of traffic (e.g., relating to packets associated with one or more service flows which are associated with Bonding Group BG(1)) which may be scheduled for transmission on QAM(2) is 17. Similarly, as illustrated in the example embodiment of FIG. 13B, the traffic shaping data value corresponding to R(3,4) is 20 (e.g., as shown at data portion 1366*d*), which may be interpreted as meaning that the aggregate or cumulative amount of traffic (e.g., relating to packets associated with one or more service flows which are associated with Bonding Group BG(3)) which may be scheduled for transmission on QAM(4) is 20.

In other embodiments, the value and/or other data associated with a given R(i,j) may represent other types of traffic shaping data which may be used in conjunction with one or more traffic shaping procedures and/or operations such as those described herein.

Returning to FIG. 9, as described previously at 916, one or more R(i,j) values may be automatically and/or dynamically updated using the packet size data (e.g., as determined at 910). In one embodiment, the specific R(i,j) value may be updated by adding the packet size data thereto. An example of this is illustrated at 1364*c* of FIG. 13D, wherein the R(2,3) value (e.g., "22") corresponding to QAM(3) and Bonding Group BG(2) is shown being updated using the packet size data (e.g., "1") representing the size of the received packet (e.g., as determined at 910). Thus, in this particular example, the R(2,3) value may be automatically and dynamically updated, for example, by adding the value "1" to the value "22" to achieve an updated R(2,3) value of "23".

In one embodiment, the QAM with the relatively lowest counter value indicates the least loaded QAM. The R(i,j) values thus calculated or determined give approximately how the load per Bonding Group may be distributed across the QAMs when multiple Bonding Groups may be simultaneously carrying traffic. The periodic background task (e.g., one or more threads or instances of a Traffic Shaping Adjustment Procedure) uses these values to compute the bandwidth allocation for a Bonding Group. Note that, in at least one embodiment, $\Sigma_j R(i,j)=BG(i)$, may correspond to the incoming traffic rate of the identified Bonding Group BG(i).

It will be appreciated that, in at least one embodiment, the updating of the Q(j) value as shown at 914, for example, may be omitted from the Traffic Shaping Analysis Procedure 900 and/or may be implemented by a different process or procedure which, for example, may be configured or designed to periodically and continuously update (e.g., as needed) the Q(j) values represented at row 1382 using the respective, current/updated set of R(i,j) values associated with each respective QAM(j).

In one or more embodiments, one or more Q(j) and/or R(i,j) values may be reset to a default value. In at least one embodiment, the default value is zero. In different embodiments, it is not required that one or more Q(j) and/or R(i,j) values be reset to a default value. According to various embodiments, one or more Q(j) and/or R(i,j) values may be reset at periodic intervals (e.g., at regular periodic intervals, at irregular periodic intervals, upon termination and/or implementation of one or more different threads or instances of a Traffic Shaping Analysis Procedure, etc.). According to various embodiments, one or more Q(j) and/or R(i,j) values may be reset when an event or condition is detected (e.g., a pre-determined time, a network load condition, a signal, the receipt of a packet, boot up and/or shut down of an operating system or other software, initialization of network hardware, etc.) which satisfies minimum threshold criteria for resetting one or more Q(j) and/or R(i,j) values. According to various embodiments, one or more Q(j) and/or R(i,j) values may be reset upon demand (e.g., by a network operator, by a CMTS, by a network processor, by a traffic shaping manager, by a network node, by a cable modem, by a Bonding Group, etc.).

Figure 10:
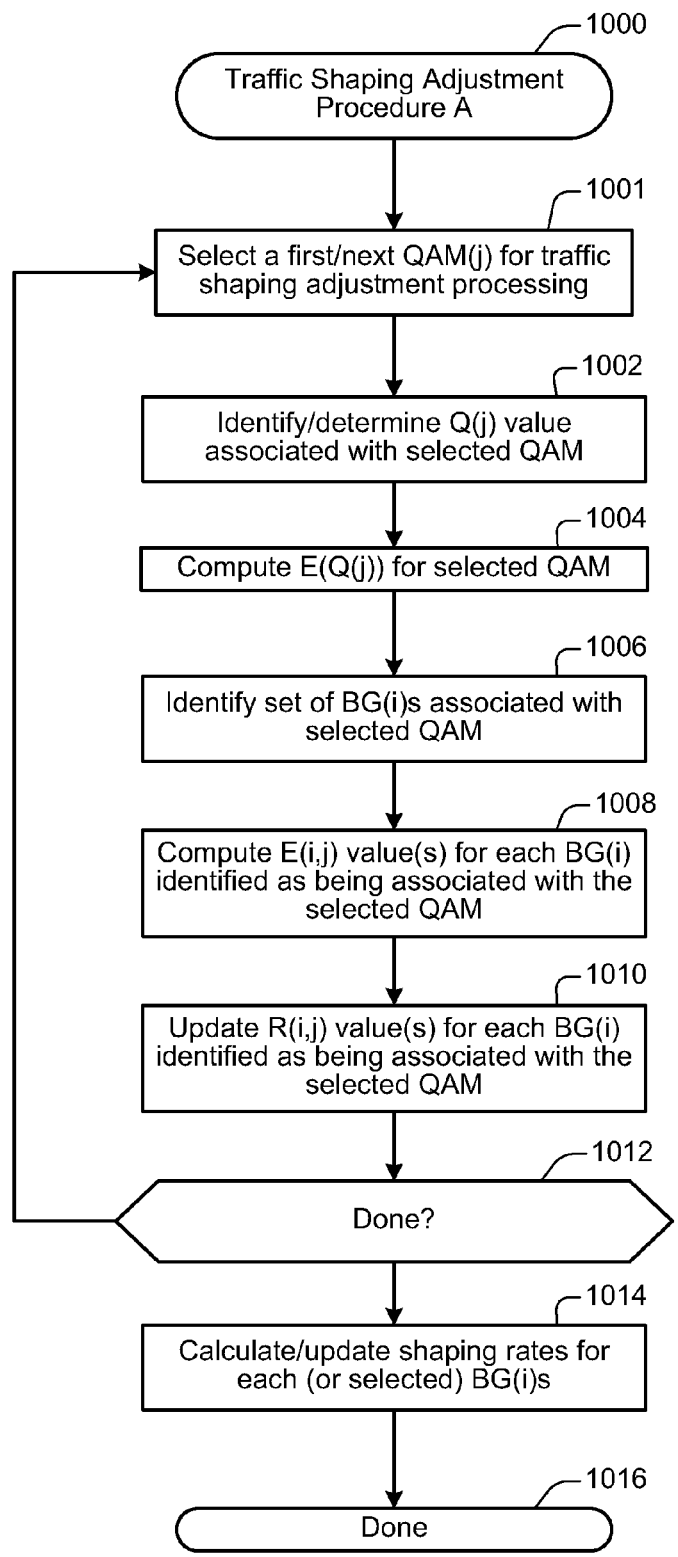
FIG. 10 illustrates another specific example embodiment of a Traffic Shaping Adjustment Procedure.

FIG. 10 shows an example embodiment of a Traffic Shaping Adjustment Procedure A 1000 in accordance with a specific embodiment. In some embodiments, the Traffic Shaping Adjustment Procedure may adjust one or more traffic shaping parameters and/or values for the purpose of traffic shaping. For example, in some embodiments, the output of the Traffic Shaping Analysis Procedure may be include one or more traffic shaping rates and/or other types of traffic shaping data associated with, for example, each (or selected) Bonding Group(s). According to various embodiments, the input of the Traffic Shaping Adjustment Procedure may include various types of traffic shaping data (e.g., traffic shaping data associated with the Traffic Shaping Analysis Procedure of FIG. 9)

and/or other types of network traffic information. For example, in some embodiments, the Traffic Shaping Adjustment Procedure 1000 may utilize various types of information or data generated by Traffic Shaping Analysis Procedure 900 and/or may utilize various types of traffic shaping data (or portions thereof) such as that illustrated and described with respect to FIGS. 13B-H.

In at least one embodiment, a Traffic Shaping Adjustment Procedure may be implemented by and/or utilized in conjunction with a traffic shaping device, such as, for example, Traffic Shaping Manager 890 of FIG. 8B. In at least one embodiment, at least a portion of Traffic Shaping Adjustment Procedure 1000 may be initiated and/or implemented by one or more systems, devices, and/or controllers such as, for example, a CMTS (e.g., CMTS 200) (or components thereof), Traffic Shaping Manager 890, etc. In at least one embodiment, at least a portion of Traffic Shaping Adjustment Procedure 1000 may be initiated and/or implemented by a network processor, which includes appropriately configured hardware and/or hardware and software. According to different embodiments, one such network processor may be, for example, a specifically configured processor for implementing various types of CMTS-related functionality such as, for example, a Cisco Packet Processor (CPP), available from Cisco Systems, San Jose, Calif.

It will be appreciated that one or more different threads or instances of a Traffic Shaping Adjustment Procedure 1000 may be implemented concurrently on one or more processors. Additionally, in a least one embodiment, one or more separate threads or instances of the Traffic Shaping Adjustment Procedure 1000 may be initiated and/or executed concurrently with one or more threads or instances of the Traffic Shaping Analysis Procedure(s) described herein.

In at least one embodiment, one or more different threads or instances of a Traffic Shaping Adjustment Procedure may be initiated at periodic intervals (e.g., at regular periodic intervals, at irregular periodic intervals, upon termination of one or more different threads or instances of a Traffic Shaping Adjustment Procedure, etc.). For example, in some embodiments one or more different threads or instances of a Traffic Shaping Adjustment Procedure may be initiated at a regular periodic interval between 0.5 seconds and 5 seconds (e.g., every 1 second). In some embodiments, one or more users may configure one or more intervals at which one or more different threads or instances of a Traffic Shaping Adjustment Procedure may be initiated. According to various embodiments, one or more different threads or instances of a Traffic Shaping Adjustment Procedure may be initiated in response to one or more conditions or events which satisfies minimum threshold criteria for triggering a Traffic Shaping Adjustment Procedure, which may include, but are not limited to, one or more of the following (or combinations thereof):

One or more time-related events/conditions.
One or more event(s)/condition(s) relating to the termination and/or initiation of one or more threads or instances of one or more Traffic Shaping Analysis Procedures and/or Traffic Shaping Adjustment Procedures
One or more network load related events/conditions.
One or more event(s)/condition(s) relating to receipt or detection of a signal (e.g., a signal sent by a CMTS, a signal sent by a traffic shaping device, etc.).
One or more event(s)/condition(s) relating to boot up and/or shutdown of software (e.g., of an operating system, of an interface, of other software, etc.)
One or more event(s)/condition(s) relating to boot up and/or shutdown of hardware (e.g., a CMTS, a traffic shaping device, a network node, etc.).
Etc.

According to different embodiments, one or more different threads or instances of a Traffic Shaping Adjustment Procedure may be initiated upon demand (e.g., by a CMTS, etc.). According to different embodiments, one or more different threads or instances of Traffic Shaping Adjustment Procedure may be triggered or implemented manually, automatically, statically, dynamically, concurrently, or some combination thereof.

In this specific example embodiment of FIG. 10, it is assumed that the Traffic Shaping Adjustment Procedure 1000 is implemented at a network processor which includes appropriate hardware and/or hardware and software for implementing various types of traffic shaping management operations such as, for example, route lookup, packet classification, service flow traffic rate monitoring, traffic shaping analysis, traffic shaping adjustment, calculation of various types of traffic shaping rates, etc. Different embodiments of the Traffic Shaping Adjustment Procedure (not shown), may include features or operations in addition to those illustrated in the specific example embodiment of FIG. 10. In different embodiments of the Traffic Shaping Adjustment Procedure (not shown), features or operations in addition to those illustrated in the specific example embodiment of FIG. 10 may vary. In different embodiments of the Traffic Shaping Adjustment Procedure (not shown), features or operations illustrated in the specific example embodiment of FIG. 10 may be omitted. Additionally, various actions and/or operations relating to one or more embodiments of the Traffic Shaping Adjustment Procedure may be performed in an order different than is shown in the example of FIG. 10.

A specific example embodiment of a Traffic Shaping Adjustment Procedure of FIG. 10 will be described by way of example with respect to the cable network configuration 1300 represented in FIG. 13A, and with respect to the example traffic shaping data structure 1350 illustrated in FIG. 13E.

FIG. 13E shows a representation of a traffic shaping data structure 1350 illustrating specific example traffic shaping-related data in accordance with a specific example embodiment. In at least one embodiment, the specific example traffic shaping-related data illustrated in FIG. 13E may be populated by one or more threads or instances of a Traffic Shaping Analysis Procedure and/or one or more threads or instances of a Traffic Shaping Adjustment Procedure. One or more threads or instances of a Traffic Shaping Adjustment Procedure may use traffic shaping-related data as illustrated in FIG. 13E to perform one or more functions related to traffic shaping adjustment, such as for example updating one or more traffic shaping parameters. Other embodiments of Traffic Shaping Adjustment Procedures may utilize different types of traffic shaping data, and/or may be implemented without requiring the use of a traffic shaping data structure.

In the specific example embodiment of FIG. 13E, it is assumed that a cable network is configured according to the specific example embodiment of the cable network configuration 1300 represented in FIG. 13A.

As illustrated in FIG. 13E, it is assumed in this particular example that each respective QAM (e.g., 1352, 1354, 1356, 1358) has associated therewith a respective Q(j) value as represented, for example, by the traffic shaping data (e.g., numeric values "23", "24", "24", "20" (e.g., Mbits)) indicated by row 1382. For example, in the specific example embodiment of FIG. 13E, it is assumed that the numeric value "23" corresponding to traffic shaping data portion 1382a is representative of an amount of traffic which may be scheduled for transmission over QAM(1) 1352. In at least one embodiment, this representative of an amount of traffic may further be representative of a summation or aggregate of the packet sizes (e.g., as measured in bits, bytes, kilobits, kilobytes, etc.) of all (or selected ones) of the packets which may be scheduled for transmission over QAM(1) 1352 over one or more specific time intervals. Similarly, it is assumed that the numeric value "24" corresponding to traffic shaping data portion 1382*b* is representative of an amount of traffic which may be scheduled for transmission over QAM(2) 1354; that the numeric value "24" corresponding to traffic shaping data portion 1382*c* is representative of an amount of traffic which may be scheduled for transmission over QAM(3) 1356; and that the numeric value "20" corresponding to traffic shaping data portion 1382*d* is representative of an amount of traffic which may be schedule for transmission over QAM(4) 1358.

As illustrated in the example embodiment of FIG. 13E, each respective QAM (e.g., 1352, 1354, 1356, 1358) may have associated therewith a respective BWQ(j) value (e.g., represented at row 1380) which is representative of channel bandwidth capacity data representing the bandwidth capacity of each respective QAM(j). According to different embodiments, the channel bandwidth capacity data may correspond to physical or raw channel bandwidth capacity (e.g., the number of bits a channel can transmit per adjustment interval). For example, if the adjustment interval is 1 second and the data rate is 40 Mbps, BWQ(j) may be 40. If instead the adjustment interval is 2 second and the data rate is 40 Mbps, BWQ(j) may be 80. In at least one embodiment, each QAM (or specifically designated QAMs) may have the same or substantially similar BWQ(j) value. In different embodiments (not shown), one or more QAMs may have different BWQ(j) values.

In the specific example embodiments assumed herein, it is assumed that the data rate is 40 Mbps and the adjustment interval is 1 second. In these specific example embodiments, R(i,j) and Q(j) represent a number of bits measured over the same adjustment interval of 1 second. Applying the same interval for all of the traffic data values and for BWQ(j) may permit the calculation of one or more channel bandwidth capacities.

As illustrated at 1380 of FIG. 13E, each QAM is assumed to have a maximum channel bandwidth capacity of 40 (e.g., Mbps). According to different embodiments, the bandwidth capacity of a given channel may be expressed in terms of megabits per second (Mbps), megabytes per second, gigabits per second (Gbps), gigabytes per second, terabits per second, terabytes per second, etc.

Returning to FIG. 10, at 1001 a first QAM(j) may be selected for traffic shaping adjustment processing. According to different embodiments, various different types or criteria and/or selection algorithms may be used for determining the first and/or next QAM(j) to be selected for traffic shaping adjustment processing. For example, in one embodiment, QAMs may be analyzed sequentially.

At 1002 the Q(j) value associated with the selected QAM may be identified or determined. In the specific example embodiment of FIG. 13E, it is assumed that QAM(2) has been selected (e.g., at 1001) for traffic shaping adjustment processing. Accordingly, using the example data illustrated in the data structure 1351 of FIG. 13E it is assumed that Q(j) value associated with the currently selected QAM(2) is identified/determined to be Q(2)=24.

At 1004, traffic shaping differential data E(j) may be calculated or determined for the selected QAM. In at least one embodiment, the traffic shaping differential data E(j) may be representative of the difference between the bandwidth capacity BWQ(j) over the adjustment period associated with the selected QAM and the current Q(j) value associated with the selected QAM. For example, in one embodiment, traffic shaping differential data E(j) may represent a remaining amount of available bandwidth available on QAM(j) after taking into account the traffic shaping bandwidth (e.g., Q(j) value) which has already been allocated on that particular QAM (e.g., during any given time interval). In some embodiments, traffic shaping differential data E(j) may be representative of, for example, a value that represents and/or is related to a difference between a bandwidth capacity value (e.g., BWQ(j)) and the Q(j) value.

Consider first the case when no minimum rates may be defined (this restriction may be removed below). In this particular example, if the measured R(i, j) do not overload the QAMs (e.g., for all (or selected ones of) QAM(j)s, $\Sigma_i$ R(i,j) <BWQ(j), where BWQ(j) is the QAM bandwidth (e.g., 40 Mbps)), then R(i,j) may be used directly to define the portion of QAM(j) guaranteed to BG(i).

This bandwidth may be distributed based on the demand of individual Bonding Group, at the same time considering the load on other Bonding Groups.

For these non-overload conditions, the excess bandwidth may be calculated or determined per QAM as:

$$E(j)=Q-\Sigma_i R(i,j)$$

In the specific example embodiment of FIG. 10, it is assumed that the E(j) value may be calculated according to the expression:

$$E(j)=BWQ(j)-Q(j) \qquad (2),$$

where the variable (j) represents an identifier associated with a selected QAM(j).

In the specific example embodiment of FIG. 13E, it is assumed that BWQ(2)=40 and Q(2)=24. Accordingly, in this specific example, as shown at 1384*b*, E(Q(2)) may be calculated according to: BWQ(2)–Q(2)=40–24=16.

At 1006, a set of one or more Bonding Groups BG(i)s associated with the selected QAM may be identified. According to different embodiments, various different types or data and/or other information may be used for identifying the set of Bonding Groups BG(i)s associated with the selected QAM, such as, for example by receiving and/or reading configuration information (e.g., system configuration information stored in one or more data structures, etc.).

For example, in the present illustrative example, as illustrated in FIG. 13A, it is assumed that the cable network has been configured such that Bonding Group BG(1) includes QAM(1) and QAM(2), and that Bonding Group BG(2) includes QAM(2) and QAM(3). Accordingly, based upon the specific configuration, the set of Bonding Groups associated with the selected QAM(2) may be identified (1006) or determined to be the Bonding Group set of: BG(1) and BG(2).

As illustrated at 1008, one or more E(i,j) values may be calculated or determined or calculated for each BG(i) identified as being associated with the selected QAM. In at least one embodiment, E(i,j) be representative of QAM-Bonding Group traffic shaping differential data relating to each BG(i) identified as being associated with the selected QAM.

In at least one embodiment, the QAM-Bonding Group traffic shaping differential data E(i,j) may be calculated or determined by an approximate or exact division of E(j) by the number of BG(i)s associated with QAM(j). For example, in one embodiment, the E(i,j) value for a given BG(i)-QAM(j) association may be calculated according to the expression:

$$E(i,j)=E(j)/(\# \text{ of } BG(i)\text{s associated with } QAM(j)) \qquad (3),$$

where the variable (j) represents an identifier associated with a selected QAM(j).

In some embodiments, the E(i,j) value for a given BG(i)-QAM(j) association may be calculated according to the expression:

$$E(i,j) = \text{ROUND}(E(j)/(\# \text{ of } BG(i)\text{s associated with } QAM(j))) \quad (4),$$

where the variable (j) represents an identifier associated with a selected QAM(j), and where the expression ROUND (x) represents the closest integer value to x (e.g., rounded up/down).

This excess bandwidth may be available per QAM, and/or may be distributed among all (or selected ones of) the Bonding Groups associated with the QAM. Various policies may be adopted for distributing the excess bandwidth among individual BG allocations of the QAM bandwidth. For example, one policy may be to divide the excess bandwidth equally among all (or selected ones of) the Bonding Groups, the QAM may be member of. Alternatively, other policies may provide advanced schemes such as, for example, min-max fairness.

In the specific example embodiment of FIG. 13E, it is assumed that the selected QAM is QAM(2), that E(Q(2)) E(2)=16, and that the number of BG(i)s associated with QAM (2) is 2 (e.g., corresponding to BG(1) and BG(2)). Accordingly, in this specific example, E(1,2) may be calculated according to: E(Q(2))/2=16/2=8. Similarly, E(2,2) may be calculated according to: E(Q(2))/2=16/2=8.

In at least one embodiment, if E(j) is negative, then it may sometimes be the case that $\Sigma_i R(i,j) > BWQ(j)$. Also, if E(j) is negative, then there may be no excess bandwidth to distribute. In this case, it may be unnecessary to compute E(i,j), and/or separate computation may be needed for adjusting R(i,j) values.

For example, in at least one embodiment, E(i,j) may represent a value used to adjust one or more R(i,j) values for the purposes of one or more traffic shaping adjustment operations. In at least one embodiment, if QAM(j) has more bandwidth capacity than the Q(j) value (e.g., for a given time interval), then E(i,j) may be, for example, a positive number. In at least one embodiment, if QAM(j) has less bandwidth capacity than the Q(j) value (e.g., for a given time interval), then E(i,j) may be, for example, a negative number. In at least one embodiment, if Q(j) matches or substantially matches the BWQ(j) value (e.g., for a given time interval), then E(i,j) may be zero. However, in different embodiments (not shown) E(i,j) may be any representation of an adjustment to an R(i,j) value.

In other embodiments, E(i,j) may be calculated or determined by one or more different techniques, which may include, but are not limited to, one or more of the following (or combinations thereof):

Min-Max fairness

Distributing the bandwidth equally among a set of bonding groups.

Etc.

As illustrated at 1010, one or more R(i,j) value(s) may be updated. For example, as illustrated at 1010, in some embodiments at least one R(i,j) value for each BG(i) identified as being associated with the selected QAM may be updated. As discussed above, R(i,j) may represent a value representing traffic shaping data related to a specific Bonding Group and a specific QAM. For example, R(i,j) represents traffic shaping data associated with Bonding Group BG(i) and QAM(j). In one embodiment, R(i,j) data may be updated using E(i,j) data (e.g., adding an E(i,j) value to an R(i,j) value). In various embodiments, R(i,j) may be updated according to various methods (e.g., adding, incrementing, etc.).

For example, in the specific example embodiment of FIG. 13F, it is assumed that Q(2) is selected 1002, that E(j) is calculated or determined at 16, that BG(1) and BG(2) are identified 1006, and that E(1,2) and E(2,1) are each calculated or determined as 8. In this specific example embodiment under these example assumptions, R(1,2) 1372b is updated by adding 8 to 17 to yield a new R(1,2) value of 25, and R(2,2) 1374b is updated by adding 8 to 7 to get a new R(2,2) value of 15.

As illustrated at 1012, a determination is made as to whether to implement operations 1001-1012. In at least one embodiment, one or more of operations 1001-1012 may be implemented if at least one QAM identified for traffic shaping has not yet been selected (e.g., at 1001) in one or more threads or instances of Traffic Shaping Adjustment Procedure A 1000. It will be appreciated that in some embodiments one or more operations related to traffic shaping may not be performed for one or more selected and/or identified QAM(s). In various embodiments, various criteria may be used to determine whether to implement operations 1001-1012.

As illustrated at 1014, shaping rates for each BG(i) may be calculated. In at least one embodiment, shaping rates for each BG(i) may be calculated by determining a summation of all R(i,j) values associated with a particular BG(i). In the specific example embodiment of FIG. 13F, the R(i,j) values associated with a particular BG(i) include all R(i,j) values in a particular row. In a different embodiment (not shown), one or more R(i,j) values may be represented in a different way.

The specific example embodiment of FIG. 13G illustrates specific example traffic shaping data, for example as populated by operations 1001-1012 as performed for each QAM identified for traffic shaping. In the example embodiment of FIG. 13G, R(i,j) values have been updated in using E(i,j) values determined in accordance with E(j) values.

In the example traffic shaping data illustrated in FIG. 13G, it is assumed that Bonding Group BG(3) has a Traffic Load value of only 20, as illustrated at data portion 1360. Bonding Group BG(3) is configured to transport information on QAM (3) and/or QAM(4). However, QAM(3) has been scheduled to transport a substantial portion of the traffic associated with Bonding Group BG(2). Hence all (or selected portions of) of Bonding Group B(3) traffic may be concentrated on QAM(4). In this example embodiment, the total QAM usage may be uniform in most cases; except for QAM(4), where only traffic associated with Bonding Group B(3) can contribute.

Since in some embodiments the excess bandwidth may be uniform across one or more of a set of identified QAM(s), the excess bandwidth may in some embodiments be distributed uniformly across the bonding groups. In various embodiments, this would give extra "headroom," which may help to meet the bandwidth demand on a bonding group if, for example, traffic surges. The following example illustrates an allocation of substantially uniform sharing of excess bandwidth among bonding groups.

In the specific example embodiment of FIG. 13G, the shaping rate for each BG(i) is represented by "BW Allocated to BG" column 1362. In the specific example embodiment illustrated in FIG. 13G, the shaping rate 1362a for Bonding Group BG(1) 1372 is determined to be 65 (e.g., Mbps) by adding the R(i,j) values in row 1372 of R(1,2)=40 and R(1,2)=25. The shaping rate 1362b for Bonding Group BG(2) 1374 is determined to be 55 by adding the R(i,j) values in row 1374 of R(2,2)=15 and R(2,3)=40. The shaping rate 1362c for Bonding Group BG(3) 1376 is determined to be 40 by adding the R(i,j) values in row 1376 of R(3,3)=0 and R(3,4)=40. One or more different shaping rates may be calculated if different values are assumed. It will be appreciated that in this example embodiment, that excess bandwidth may be uniform across Bonding Group BG(1) and Bonding Group BG(2). For example, in the specific example embodiment of FIG. 13G, Bonding Group BG(1) has been allocated 65 (e.g., Mbps), which is 25 (e.g., Mbps) more than its identified traffic load of 40 (e.g., Mbps). Similarly, Bonding Group BG(2) has been allocated 55 (e.g., Mbps), which is 25 (e.g., Mbps) more than its identified traffic load of 30 (e.g., Mbps).

In at least one embodiment, the shaping rates for each BG(i) may be used in, for example, packet processing (e.g., packet scheduling, packet routing, etc.) as a restriction on the maximum bandwidth available to all of the service flows associated with each BG(i).

In the case when no minimum rates may be defined for any BGs, and/or when the measured rates of the BGs under the emulated traffic shaping produce feasible allocations in a given measurement interval, the bandwidth allocations of all (or selected ones of) Bonding Group(s) may be calculated or determined by allocating the measured rates R(i,j) plus a "fair" share of the excess rate of the QAMs, where the fair share may be defined by a number of policies. Once these allocations may be calculated or determined (e.g., as the sum of R(i,j) over all (or selected ones of) j), the allocations may be used as a shaping rate of BG(i), for all (or selected ones of) i.

In some embodiments, if a bonding group carries flows with non-zero min-rates, the min-rate commitment may be met. However, it is anticipated that if some service flows may be sending below their min rates, the allocation of shaping rate of the BGs based on the measured incoming rates only may result in violation of the min rate guarantee in the next interval (e.g., if one or more flows sending less than their min rate in the previous interval start sending at or above their min rates in the next measurement interval). Thus, it is anticipated that in some instances the computation of shaping rates for Bonding Groups based on measured R(i,j) values only may be insufficient, and/or the computation may not account for the committed bandwidth.

In some embodiments this may be addressed by allocating to each Bonding Group the larger of the minimum rate guarantee and/or B(j) (or some number between these two values). If, however, the resulting parameters no longer result in a feasible allocation, then in some embodiments additional processing may be desirable, as is discussed below.

The bandwidth allocation based on virtual traffic scheduling as discussed in the previous section may be based on measuring the offered load. When the incoming traffic exceeds the QAM capacity, the network processor may, for example, drop excess packets. However the data determined by the virtual traffic scheduler may reflect the total offered load which may exceed available capacity.

Thus in some embodiments the measured allocation may be scaled down to produce feasible shaping rates for all (or selected ones of) Bonding Group(s). Various schemes may be adopted to scale down the bandwidth demand. For example, it may be scaled down uniformly, so that every flow gets a bandwidth in proportion to its demand. One or more R'(i,j) values may be determined according to the expression:

$$R'(i,j)=R(i,j) \times Q/(\Sigma_i R(i,j))$$

In some embodiments, this policy may tend to favor greedy flows and/or penalize flows with lower demands. Additionally, a built in component (e.g., a policer) may be used to mark the flows exceeding the max-rates. In some embodiments, traffic shaping data may be measured and/or determined only for the flows that have not exceeded the max-rates.

In some embodiments, to favor the flows with lower demands a min-max fairness policy may be used. This may, for example, ensure that smaller demands may be met first before satisfying the greedy flows. According to various embodiments, the demands may be measured per Bonding Group and/or not per service flow. For example, a greedy Bonding Group may have several flows making reasonable demands, while low demand bonding groups may have only a few flows each making larger demands.

It is anticipated that scaling down flows uniformly under one or more overload conditions may result in violating a minimum bandwidth guarantee of some Bonding Group. For example, first assume that a single QAM is shared by two Bonding Groups BG(1) and BG(2) and that each BG has a committed minimum rate guarantee of ½ of the QAM bandwidth. Further assume that the input rate of BG(1) is exactly its minimum rate guarantee, whereas BG(2) has the input rate of 1.5 of the QAM bandwidth. Under these example assumptions, and overload condition may result, and/or the measured rates R(i,j) in this simple case may be simply ½ and/or 1.5 of the QAM bandwidth respectively. Under these example assumptions, scaling down these rates proportionally may result in the minimum bandwidth guarantee of BG(1) being violated. As will be described below, one or more embodiments described herein may resolve these issues.

Figure 11:
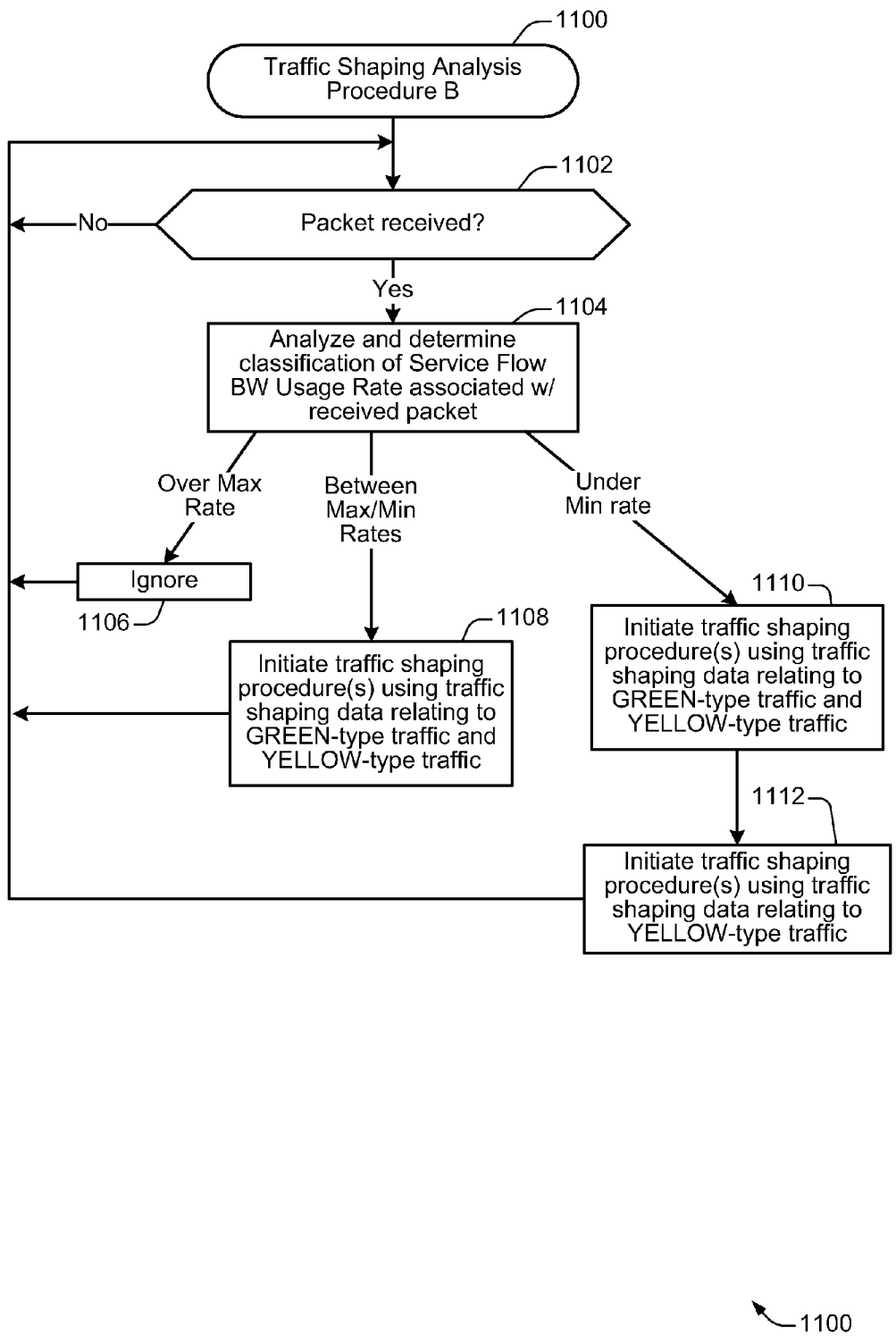
FIG. 11 illustrates a specific example embodiment of a Traffic Shaping Analysis Procedure.

FIG. 11 shows an example embodiment of a Traffic Shaping Analysis Procedure B 1100 in accordance with a specific embodiment. In some embodiments, the Traffic Shaping Analysis Procedure may analyze network traffic information for the purpose of traffic shaping. For example, in some embodiments the output of the Traffic Shaping Analysis Procedure may be used to determine one or more shaping rates for one or more service flows, Bonding Groups, channels, etc. In some embodiments, for example, the output of the Traffic Shaping Analysis Procedure may be used as the input to one or more different procedures related to traffic shaping, such as for example the example embodiment of a Traffic Shaping Adjustment Procedure that will be described in reference to FIG. 12.

In one or more embodiments, a Traffic Shaping Analysis Procedure may be utilized in conjunction with a traffic shaping manager device, such as, for example, Traffic Shaping Manager 890 of FIG. 8B. In some embodiments, at least a portion of a Traffic Shaping Analysis Procedure may be initiated and/or implemented by one or more systems, devices, and/or controllers in a shared access network (e.g., a CMTS in a cable network). In some embodiments, at least a portion of a Traffic Shaping Analysis Procedure may be initiated and/or implemented by a network processor which has been configured or designed to include appropriate hardware and/or hardware and software for implementing or initiating aspects of the Traffic Shaping Analysis Procedure. One such network processor may be, for example, a Cisco Packet Processor (herein referred to as CPP), available from Cisco Systems, Inc. of San Jose, Calif.

In some embodiments, one or more different threads or instances of a Traffic Shaping Analysis Procedure may be implemented concurrently on one or more processors. In at least one embodiment, one or more different threads or instances of a Traffic Shaping Analysis Procedure may be initiated at periodic intervals (e.g., at regular periodic intervals, at irregular periodic intervals, upon termination of one or more different threads or instances of a Traffic Shaping Analysis Procedure, etc.). For example, in some embodiments one or more different threads or instances of a Traffic Shaping Adjustment Procedure may be initiated at a regular periodic interval between 0.5 seconds and 5 seconds (e.g., every 1 second). In some embodiments, one or more different threads or instances of a Traffic Shaping Analysis Procedure may be initiated in response to one or more conditions and/or events which satisfies minimum threshold criteria for triggering a Traffic Shaping Analysis Procedure. For example, one or more separate threads or instances of a Traffic Shaping Analysis Procedure may be initiated in response to receiving a packet. In one or more embodiments, one or more separate threads or instances of a Traffic Shaping Analysis Procedure may be initiated for each (or selected) Service Flow(s) and/or Bonding Group(s).

In some embodiments, one or more different threads or instances of a Traffic Shaping Analysis Procedure may be initiated upon demand (e.g., by a network operator, by a CMTS, by a network processor, by a traffic shaping manager, by a network node, by a cable modem, by a Bonding Group, etc.). According to various embodiments, one or more different threads or instances of Traffic Shaping Analysis Procedure may be triggered and/or implemented manually, automatically, statically, dynamically, concurrently, and/or some combination thereof.

For purposes of illustration, a specific example embodiment of a Traffic Shaping Analysis Procedure will be described by way of example with respect to FIG. 11.

As illustrated in the example embodiment of FIG. 11, it is assumed that the Traffic Shaping Analysis Procedure is implemented at a network processor which includes appropriate hardware and/or hardware and software for traffic shaping analysis. Different embodiments of the Traffic Shaping Analysis Procedure (not shown), may include one or more features or operations in addition to those illustrated in the specific example embodiment of FIG. 11. In various embodiments of the Traffic Shaping Analysis Procedure, one or more features or operations illustrated in the specific example embodiment of FIG. 11 may vary. In various embodiments of the Traffic Shaping Analysis Procedure, features or operations illustrated in the specific example embodiment of FIG. 11 may be omitted. Additionally, in various embodiments of the Traffic Shaping Analysis Procedure, features or operations illustrated in the specific example embodiment of FIG. 11 may be performed in an order different than is shown.

To address the issue of violating minimum bandwidth rate guarantees (e.g., under overload conditions), in at least one embodiment, a second instance of a virtual SQF scheduler may be maintained. The first instance may operate on packets which may be "within the min rate" of its service flow. The second SQF scheduler may see all (or selected ones of) other packets. To distinguish the "under-the-min-rate" and/or "over-the-min-rate" packets, various hardware and/or hardware and software may be used, such as for example using Policers provided as hardware accelerators within CPP to mark the packets differently depending on whether the packet may be in or out, for example, one or more configured Policer profiles.

In at least one embodiment, virtual SQF techniques may be enhanced as follows.
1 Another set of counters Rc(i,j) (e.g., each associated with a selected bonding group and selected QAM) may be maintained to track the traffic that may be under the min-rate. Additional data and/or counters Qc(j) (e.g., each associated with a selected QAM) may be maintained to keep track of cumulative traffic of all (or selected ones of) flows which may be under min-rate of those flows on the selected QAM.
2 If a packet is marked as a "min rate" packet, then the (virtual) SQF selects the QAM with, for example, the smallest value of Qc(j) and may updates Rc(i,j) and/or R(i,j), as well as Q(j) and/or Qc(j). If a packet is marked as an "excess rate" packet, then the (virtual) SQF selects the QAM(j) with, for example, the smallest value of Q(j) and may update R(i,j) and/or Q(j) only.

In at least one embodiment, a Qc(j) value may represent committed channel traffic data associated with providing a guaranteed bandwidth rate associated with a given channel. For example, in some embodiments, committed channel traffic data Qc(j) may represent, for example, an aggregate value of bandwidth that may be scheduled for transmission on a particular QAM(j) (e.g., during one or more time interval(s)) that has been classified/categorized as YELLOW-type traffic.

Thus, in at least one embodiment, R(i,j) may represent a total measured traffic load associated with Bonding Group BG(i) on QAM(j) under this emulated SQF, while Rc(i,j) may represents the load only due to "min-rate" traffic. Also note that it may at least sometimes be the case that $$Rc(i,j) <= R(i,j)$$

In some embodiments, if incoming traffic may not be causing congestion, then it may be the case that Q(j)<Q (e.g., the QAM bandwidth). Under that condition, bandwidth may be allocated based only on R(i,j) and still meet the min-rate commitment, if for example it is assumed that R(i,j) is greater than or equal to the committed rate of BG(i).

However in some embodiments if the incoming traffic may be causing congestion, the measured load per QAM may exceed the QAM bandwidth. In that case, the bandwidth may need to be allocated first based on Rc(i,j). The remaining bandwidth per QAM may be distributed, for example, in proportion to the demand R(i,j)-Rc(i,j), which may indicate non-committed traffic.

Additionally, when the total QAM bandwidth may be overloaded while one or more of the Bonding Groups may not be fully using their minimum rate guarantees, (while other BGs do utilize their minimum rate guarantees). As discussed herein, those BG which do not utilize their minimum rates may be allocated a larger bandwidth than their current demand up to its minimum rate guarantee.

For example, if the bandwidth allocation (e.g., the measured minimum bandwidth plus the excess bandwidth) may be such that the total allocation of bandwidth to all (or selected ones of) BGs may be at least as high as the minimum bandwidth guarantee of each BG, then no further steps may be desirable. If, however, for some bonding groups the allocation may be below their minimal rate guarantees, then one can consider adding additional allocation to those groups up to the minimal bandwidth guarantee. It may preferably be noted that it may be possible that such added bandwidth allocation may not be added without making the allocation infeasible. In such cases, in some embodiments, the BG may be given only as much allocation as would not violate the feasibility of the solution. In some such cases, one or more BGs may get only their actual minimum bandwidth+excess allocation bandwidth). In other embodiments, different techniques may be possible and/or desirable.

Returning to FIG. 11, a packet may be received 1102. In at least one embodiment, the packet is received at a network component (e.g., a CMTS, a traffic shaping manager device, a network processor, etc.) in the head end of a shared access network.

When a packet is received 1102, the received packet may be analyzed 1104 to determine information related to traffic shaping. In some embodiments, a service flow associated with the received packet may be determined or identified (e.g., via a service flow identifier associated with the received packet). Additionally, a Service Flow Bandwidth (BW)

Usage Rate associated with the identified Service Flow may be determined. For example, a Service Flow Bandwidth (BW) Usage Rate may be determined by receiving one or more configuration values (e.g., stored in a data structure and/or memory location). A Service Flow BW Usage Rate may be representative of an allocated and/or current BW usage rate associated with a given service flow (e.g., as measured over one or more time periods.)

As discussed herein, a given service flow may be associated with one or more QoS parameters. For example, in some embodiments, a given service flow may be associated with a maximum rate service flow parameter that may define, for example, the maximum bandwidth rate permitted to that service flow. Similarly, a given service flow may be associated with a minimum guaranteed rate that may define, for example, the minimum rate of bandwidth always (or nearly always) available to that service flow.

In at least one embodiment, traffic (e.g., associated with a given service flow) which may be categorized/classified as being associated with (and/or a member of) the OVER MAX RATE CLASSIFICATION/CATEGORY may be referred to as "RED-type" traffic. Similarly, traffic which may be categorized/classified as being associated with (and/or a member of) the BETWEEN MAX AND MIN RATE CLASSIFICATION/CATEGORY may be referred to as "GREEN-type" traffic. Further, traffic which may be categorized/classified as being associated with (and/or a member of) the UNDER MIN RATE CLASSIFICATION/CATEGORY may be referred to as "YELLOW-type" traffic.

According to various embodiments, classification and/or categorization related to Service Flow BW Usage Rates may be performed at one or more different network components, which may include, but are not limited to, one or more of the following (or combinations thereof):
- A CMTS (e.g., CMTS 200).
- A traffic shaping manager device (e.g., Traffic Shaping Manager 890).
- A network processor (e.g., a CPP).
- Etc.

According to various embodiments, classification and/or categorization related to Service Flow BW Usage Rates may be determined by one or more devices/systems (e.g., CMTS, Traffic Shaping Device, etc.) using various types of information. In some embodiments, the actual bandwidth associated with a service flow may be determined, for example by tracking the number and size of packets associated with a given service flow over one or more specified time intervals. A determination may be made as to whether a service flow has exceeded the maximum bandwidth associated with the service flow, for example, by then determining whether the actual bandwidth exceeds the maximum bandwidth value. Similarly, a determination may be made as to whether a service flow has exceeded the minimum bandwidth associated with the service flow. For example, a rate of traffic on a service flow may be determined in software or hardware (e.g., by a policer).

In one or more embodiments, classification and/or category information relating to Service Flow BW Usage Rates may be conveyed via one or more status flags. In some embodiments, for example, the status flag may be set by the device where the determination is made. In some embodiments, the status flag may include one or more bits or bytes associated with the received packet. According to various embodiments, possible locations of the status flag in the received packet may include, but are not limited to, one or more of the following (or combinations thereof):
- One or more data structures.
- The header of the received packet.
- Metadata associated with the received packet.
- Etc.

At 1106 it is assumed that the received packet is associated with a RED-type classification/category. In this case, the received packet may be ignored (1106). In some embodiments, if the received packet is ignored, then it may be ignored for purposes of further processing by the Traffic Shaping Analysis Procedure and/or forwarded to a different device or procedure for further processing. In different embodiments, if the received packet is ignored, then it may be dropped entirely and not processed further.

At 1106 it is assumed that the received packet is associated with a GREEN-type classification/category. In this case, one or more traffic shaping procedure(s) using traffic shaping data relating to GREEN-type traffic and YELLOW-type traffic may be initiated. For example, one or more operations (e.g., 906-916) related a Traffic Shaping Analysis Procedure may be initiated. In various embodiments various operations related to traffic shaping may be initiated.

At 1108 it is assumed that the received packet is associated with a YELLOW-type classification/category. In this case, one or more traffic shaping procedure(s) using traffic shaping data relating to GREEN-type traffic and YELLOW-type traffic may be initiated. For example, one or more operations (e.g., 906-916) related a Traffic Shaping Analysis Procedure may be initiated. In various embodiments various operations related to traffic shaping may be initiated. In some embodiments, the traffic shaping data used at 1108 may relate only to GREEN-type traffic and YELLOW-type traffic.

At 1110 it is assumed that the received packet is associated with a YELLOW-type classification/category. In this case, one or more traffic shaping procedure(s) using traffic shaping data relating to YELLOW-type traffic may be initiated. For example, one or more operations (e.g., 906-916) related a Traffic Shaping Analysis Procedure may be initiated. In various embodiments various operations related to traffic shaping may be initiated. In some embodiments, the traffic shaping data used at 1110 may relate only to YELLOW-type traffic.

Figure 12:
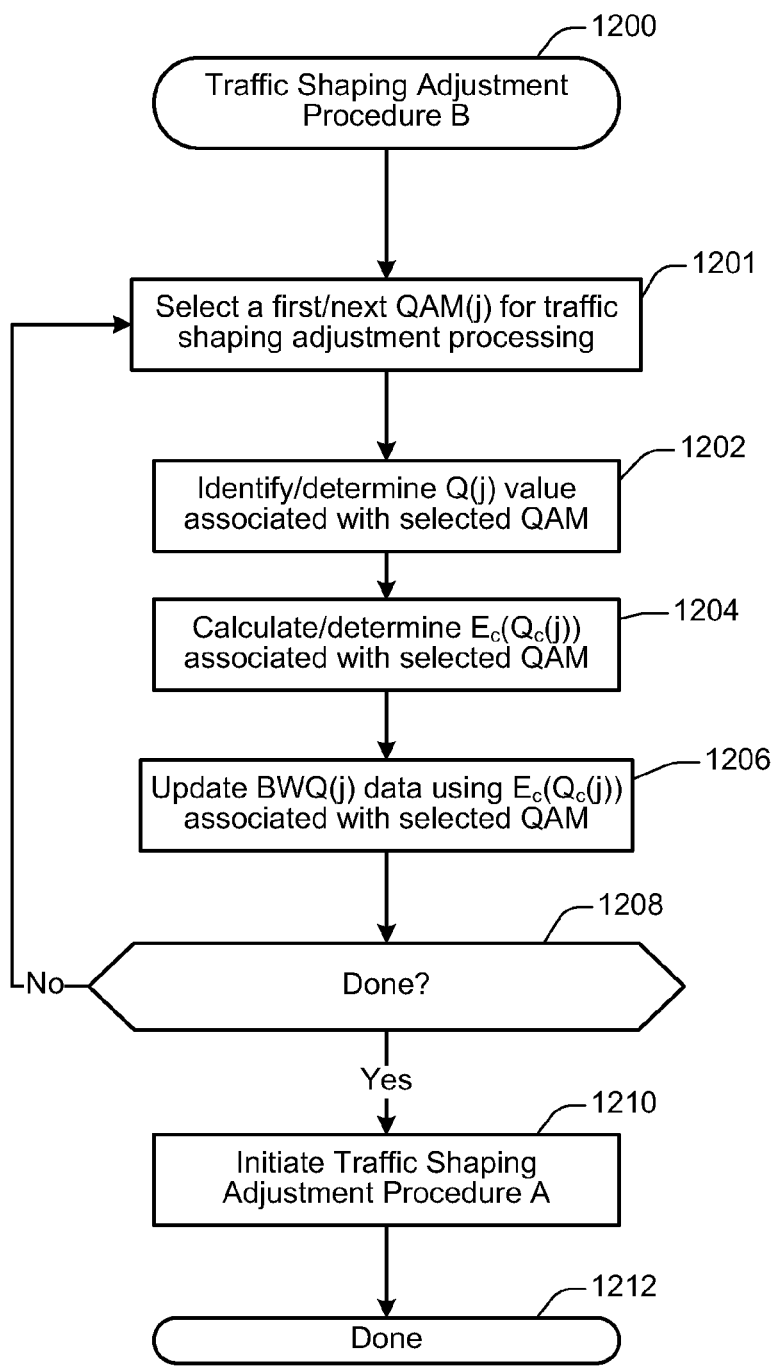
FIG. 12 illustrates another specific example embodiment of a Traffic Shaping Adjustment Procedure.

FIG. 12 shows an example embodiment of a Traffic Shaping Adjustment Procedure B 1200 in accordance with a specific embodiment. In some embodiments, the Traffic Shaping Adjustment Procedure may adjust one or more traffic shaping parameters and/or values for the purpose of traffic shaping. For example, in some embodiments, the output of the Traffic Shaping Analysis Procedure may include one or more traffic shaping rates and/or other types of traffic shaping data associated with for one or more different service flow(s), Bonding Group(s), communication channel(s), etc. According to various embodiments, the input of the Traffic Shaping Adjustment Procedure may include various types of traffic shaping data and/or other types of network traffic information. For example, in some embodiments, the Traffic Shaping Adjustment Procedure 1200 may utilize various types of information or data generated by Traffic Shaping Analysis Procedure 1100 and/or may utilize various types of traffic shaping data (or portions thereof) such as that illustrated and described with respect to FIGS. 13B-H.

In at least one embodiment, a Traffic Shaping Adjustment Procedure may be implemented by and/or utilized in conjunction with a traffic shaping device, such as, for example, Traffic Shaping Manager 890 of FIG. 8B. In at least one embodiment, at least a portion of Traffic Shaping Adjustment Procedure 1200 may be initiated and/or implemented by one or more systems, devices, and/or controllers such as, for example, a CMTS (e.g., CMTS 200) (or components thereof), Traffic Shaping Manager 890, etc. In at least one embodiment, at least a portion of Traffic Shaping Adjustment Procedure 1200 may be initiated and/or implemented by a network processor, which includes appropriately configured hardware and/or hardware and software. According to different embodiments, one such network processor may be, for example, a specifically configured processor for implementing various types of CMTS-related functionality such as, for example, a Cisco Packet Processor (CPP), available from Cisco Systems, San Jose, Calif.

It will be appreciated that one or more different threads or instances of a Traffic Shaping Adjustment Procedure 1200 may be implemented concurrently on one or more processors. Additionally, in a least one embodiment, one or more separate threads or instances of the Traffic Shaping Adjustment Procedure 1200 may be initiated and/or executed concurrently with one or more threads or instances of the Traffic Shaping Analysis Procedure(s) described herein.

In at least one embodiment, one or more different threads or instances of a Traffic Shaping Adjustment Procedure may be initiated at periodic intervals (e.g., at regular periodic intervals, at irregular periodic intervals, upon termination of one or more different threads or instances of a Traffic Shaping Adjustment Procedure, etc.). For example, in some embodiments one or more different threads or instances of a Traffic Shaping Adjustment Procedure may be initiated at a regular periodic interval between 0.5 seconds and 5 seconds (e.g., every 1 second). In some embodiments, one or more users may configure one or more intervals at which one or more different threads or instances of a Traffic Shaping Adjustment Procedure may be initiated. According to different embodiments, one or more different threads or instances of a Traffic Shaping Adjustment Procedure may be initiated in response to one or more conditions or events which satisfies minimum threshold criteria for triggering a Traffic Shaping Adjustment Procedure, which may include, but are not limited to, one or more of the following (or combinations thereof):

One or more time-related events/conditions.
One or more event(s)/condition(s) relating to the termination and/or initiation of one or more threads or instances of one or more Traffic Shaping Analysis Procedures and/or Traffic Shaping Adjustment Procedures
One or more network load related events/conditions.
One or more event(s)/condition(s) relating to receipt or detection of a signal (e.g., a signal sent by a CMTS, a signal sent by a traffic shaping device, etc.).
Receipt of a packet or other type of data parcel.
One or more event(s)/condition(s) relating to boot up and/or shutdown of software (e.g., of an operating system, of an interface, of other software, etc.)
One or more event(s)/condition(s) relating to boot up and/or shutdown of hardware (e.g., a CMTS, a traffic shaping device, a network node, etc.).
Etc.

According to different embodiments, one or more different threads or instances of a Traffic Shaping Adjustment Procedure may be initiated upon demand (e.g., by a network administrator, by a CMTS, by a network processor, by a traffic shaping manager, by a network node, by a cable modem, etc.). According to different embodiments, one or more different threads or instances of Traffic Shaping Adjustment Procedure may be triggered or implemented manually, automatically, statically, dynamically, concurrently, or some combination thereof.

In this specific example embodiment of FIG. 12, it is assumed that the Traffic Shaping Adjustment Procedure 1200 is implemented at a network processor which includes appropriate hardware and/or hardware and software for implementing various types of traffic shaping management operations such as, for example, performing traffic shaping adjustments, calculating various types of traffic shaping rates, etc. Different embodiments of the Traffic Shaping Adjustment Procedure (not shown), may include features or operations in addition to those illustrated in the specific example embodiment of FIG. 12. In different embodiments of the Traffic Shaping Adjustment Procedure (not shown), features or operations in addition to those illustrated in the specific example embodiment of FIG. 12 may vary. In different embodiments of the Traffic Shaping Adjustment Procedure (not shown), features or operations illustrated in the specific example embodiment of FIG. 12 may be omitted. Additionally, various actions and/or operations relating to one or more embodiments of the Traffic Shaping Adjustment Procedure may be performed in an order different than is shown in the example of FIG. 12.

FIG. 12 illustrates a specific example embodiment of a Traffic Shaping Adjustment Procedure in which more than one instance or embodiment of a traffic shaping data structure (e.g., the specific example embodiment of a Traffic Shaping Data Structure illustrated in FIG. 13B) is utilized. In the specific example embodiment of FIG. 12, at least one embodiment of a traffic shaping data structure that is limited to packets associated with service flows that have been classified as not exceeding the minimum committed bandwidth associated with those service flows is utilized. In the specific example embodiment of FIG. 12, at least one embodiment of a traffic shaping data structure that is limited to packets associated with service flows that have been classified as not exceeding the minimum committed bandwidth associated with those service flows is utilized. Utilizing more than one instance or embodiment of a Traffic Shaping Data Structure may, for example, assist in determining one or more adjusted traffic shaping values in such a way that one or more service flows is provided with at least enough bandwidth so as to meet the minimum committed bandwidth associated with the one or more service flows.

At 1201 a first QAM(j) may be selected for traffic shaping adjustment processing. According to different embodiments, various different types or criteria and/or selection algorithms may be used for determining the first and/or next QAM(j) to be selected for traffic shaping adjustment processing. For example, in one embodiment, QAM(s) may be selected sequentially. In some embodiments, a selection of the particular QAM may be based, at least in part, on the unique channel number associated with each respective QAM.

At 1202 the $Q_c(j)$ value associated with the selected QAM may be identified or determined.

At 1204, committed traffic shaping differential data $E_c(j)$ may be calculated or determined for the selected QAM. In some embodiments, committed traffic shaping differential data $E_c(j)$ may be calculated or determined based upon data associated with YELLOW-type traffic, as described above. In various embodiments, traffic shaping differential data $E_c(j)$ may be calculated or determined based upon data associated only with YELLOW-type traffic. In at least one embodiment, the committed traffic shaping differential data $E_c(j)$ may be representative of the difference between the bandwidth capacity BWQ(j) associated with the selected QAM and the current $Q_c(j)$ value associated with the selected QAM. For example, in one embodiment, committed traffic shaping differential data $E_c(j)$ may represent a remaining amount of available bandwidth available on QAM(J) after taking into account the committed traffic shaping bandwidth (e.g., $Q_c(j)$ value) which has already been allocated on that particular QAM (e.g., during any given time interval). In some embodiments, committed traffic shaping differential data $E_c(j)$ may be a value that represents and/or is related to a difference between a bandwidth capacity value (e.g., BWQ(j)), and the $Q_c(j)$ value.

In the specific example embodiment of FIG. 12, it is assumed that the $E_c(j)$ value may be calculated according to the equation:

$$E_c(j)=BWQ(j)-Q_c(j) \qquad (1),$$

where the variable (j) represents an identifier associated with a selected QAM(j).

As illustrated at 1206, channel bandwidth capacity value BWQ(j) data may be updated. In some embodiments, BWQ (j) data may be updated using $E_c(j)$ data associated with the selected QAM. In one or more embodiments, the BWQ(j) data may be associated with GREEN-type traffic and YELLOW-type traffic. In various embodiments, BWQ(j) data may be stored in various ways, such as for example in one or more temporary data structure(s), hardware and/or hardware and software counter(s), data field(s), processor(s), memory location(s), etc. In at least one embodiment, BWQ(j) data may be updated by, for example, writing data to a specific location where it is stored.

As illustrated at 1208, a determination is made as to whether to implement operations 1201-1208. In at least one embodiment, one or more of operations 1201-1208 may be implemented if at least one QAM identified for traffic shaping has not yet been selected (e.g., at 1201) in one or more threads or instances of Traffic Shaping Adjustment Procedure B 1200. It will be appreciated that in some embodiments one or more operations related to traffic shaping may not be performed for one or more selected and/or identified QAM(s). In various embodiments, various criteria may be used to determine whether to implement operations 1201-1212.

In at least one embodiment, as is illustrated at 1210, one or more operations associated with a Traffic Shaping Adjustment Procedure (e.g., Traffic Shaping Adjustment Procedure A 1000), may be initiated. In at least one embodiment, one or more operations associated with a Traffic Shaping Adjustment Procedure A may be initiated for traffic shaping data associated with GREEN-type and YELLOW-type traffic. For example, one or more operations associated with Traffic Shaping Adjustment Procedure A may be initiated for selected data after BWQ(j) portions of that data have been updated.

Figure 14:
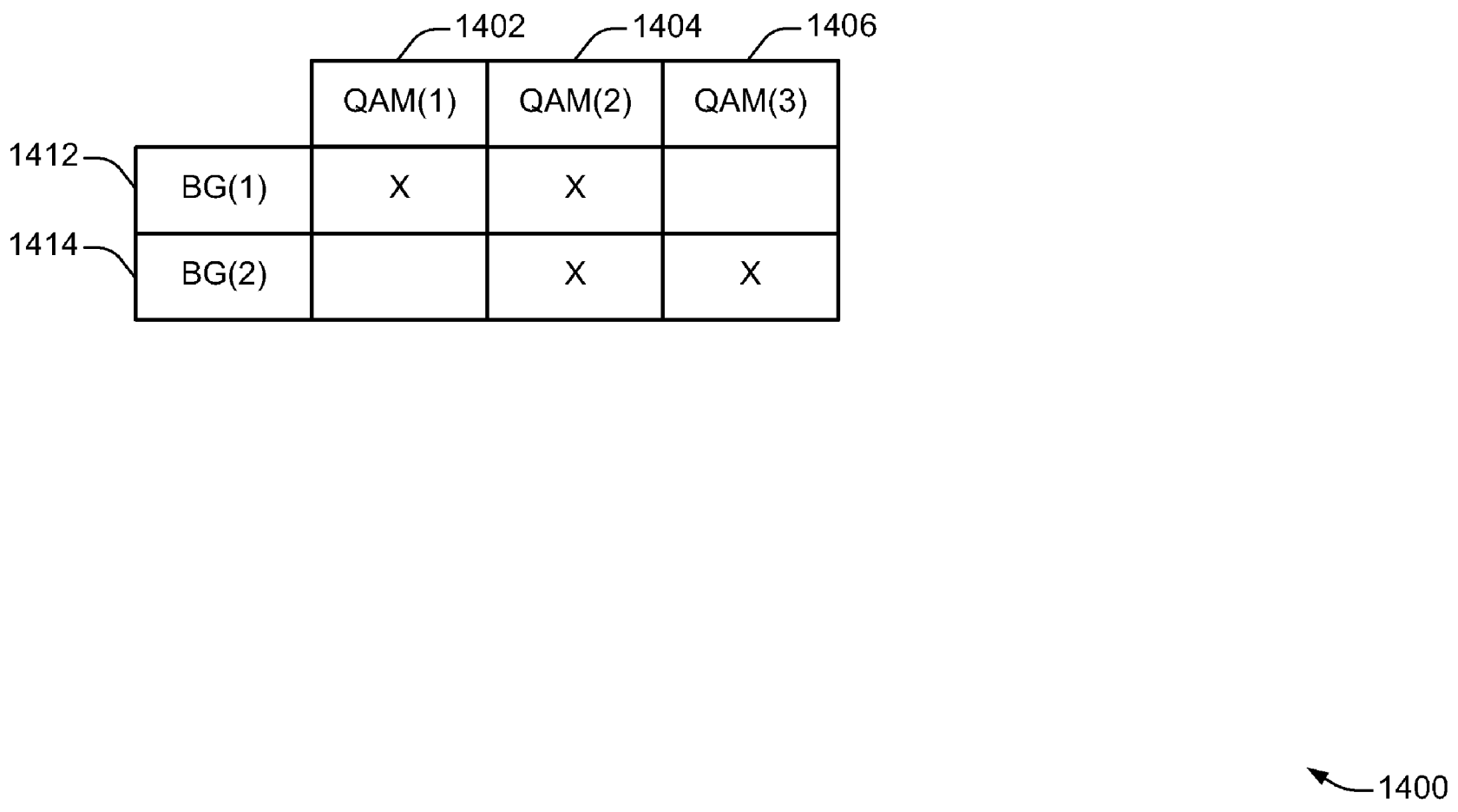

FIG. 14 shows a representation of a portion of cable network configured in accordance with a specific embodiment. The example cable network configuration 1400 illustrates a specific example configuration of a cable network wherein each Bonding Group (e.g., 1412, 1414) is associated with a respective group of QAMs. An "X" in the example cable network configuration 1400 indicates that, in this specific example embodiment, a particular Bonding Group (herein referred to as BG) is configured to communicate via use of one or more associated QAM(s).

For example, in the specific example embodiment of the cable network configuration illustrated at 1400, it is assumed that Bonding Group BG(1) 1412 includes QAM(1) 1402 and QAM(2) 1404, and that Bonding Group BG(2) 1414 includes QAM(2) 1404 and QAM(3) 1406. In other embodiments (not shown), different combinations of Bonding Groups may be associated with different combinations of QAMs.

Figure 15:
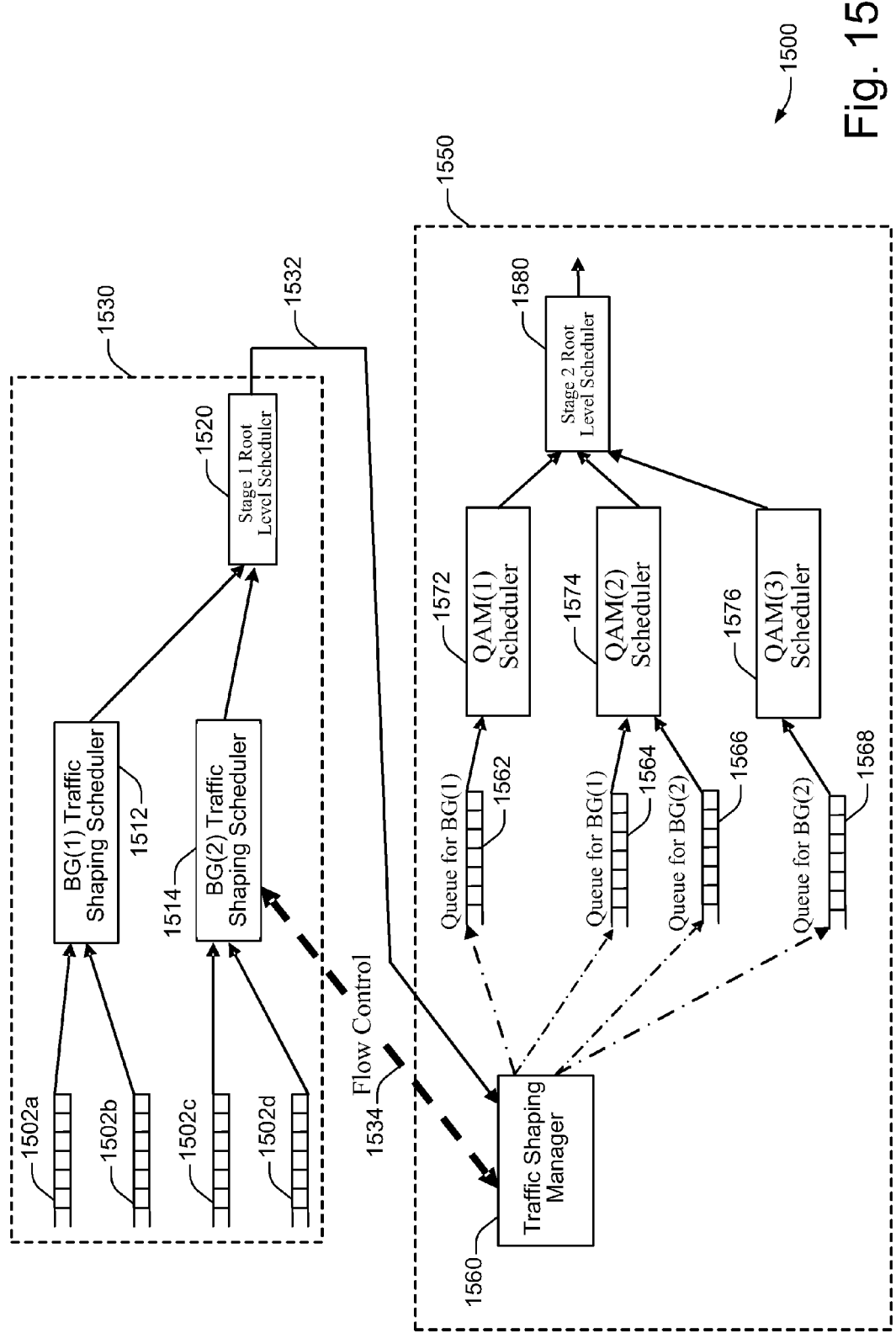
FIG. 15 illustrates a specific example embodiment of a portion of cable modem termination system.

FIG. 15 shows a portion of a CMTS configured in accordance with a specific embodiment. In at least one embodiment, one or more components illustrated in FIG. 15 may be implemented in, for example, in one or more network processors (e.g., a Cisco Packet Processor CPP). In at least one embodiment, one or more different components illustrated in FIG. 15 may represent different operations performed at one or more of the same physical components, such as for example operations performed within one or more network processors. In a some embodiments, one or more different components illustrated in FIG. 15 may represent operations performed at one or more different physical components.

Network portion 1500 may be configured or designed to perform one or more operations and/or procedures related to network processing and/or traffic shaping. For example, in some embodiments network portion 1500 may be operable to perform "lightweight" techniques for dynamic and/or real time computation of traffic shaping rates in a "Pull" model of traffic shaping.

Some embodiments may relate to shaping traffic while providing one or more minimum guaranteed bandwidth rates. It is anticipated that there may be a need or desire to tradeoff the level of utilization such techniques can provide and/or the ability to strictly guarantee minimum rates. However, in at least one embodiment, the various hybrid push-pull techniques described herein provide somewhat more complex techniques that address this issue. Such techniques may be especially useful, for example, when traffic in individual Bonding Groups may not be assumed to be very highly aggregated, and hence may, for example, vary significantly over relatively short time scales.

Various example embodiments described herein may be written with hierarchical scheduling in mind. One or more CMTS(s), line card(s) and/or network processor(s) may allow for two scheduling stages, and/or have built-in flow control per scheduling node. However, other embodiments may be in general implemented as various scheduling hierarchies with flow control between one or more nodes.

In at least one embodiment, one or more operations performed by network portion 1500 address the issue of underutilized bandwidth without affecting min-rate guarantees (e.g., minimum bandwidth guarantees associated with one or more service flows). In some embodiments, network processing performed by network portion 1500 may be implemented in two stages. For example, the example embodiment of network portion 1500 is designed or configured with a first stage of processing 1530 and a second stage of processing 1550. In some embodiments, one or more operations associated with the first stage of processing 1530 and one or more operations associated with the second stage of processing 1550 are performed at different physical components (e.g., different processors) of a CMTS and/or different network processor(s). Alternatively, one or more operations in the first stage of processing 1530 and in the second stage of processing 1550 may be performed in the same physical component of a CMTS and/or same network processor. Further, the division of stages in network portion 1500 is an example embodiment, and in different various embodiments various components could be illustrated in different stages than as shown in FIG. 15.

The first stage may be a "Push" scheduler. All (or selected ones of) the service flows associated with a given Bonding Group may be placed under a single Bonding Group BLT (e.g., a single Schedule). This BLT may be shaped at the maximum possible bandwidth associated with the Bonding Group. In some embodiments the maximum bandwidth rate of the BLT may be equal to the total sum of the bitrates of all (or selected ones of) the QAMs it is associated with.

In the specific example embodiment of FIG. 15, it is assumed that the cable network associated with network portion 1500 is configured as illustrated in the specific example embodiment of a cable network configuration shown in FIG.

14. As is illustrated in the specific example embodiment of a cable network configuration 1400, Bonding Group BG(1) is associated with QAM(1) and QAM(2), and Bonding Group BG(2) is associated with QAM(2) and QAM(3).

At 1502a, a service flow is illustrated according to a specific embodiment. As discussed elsewhere, a Bonding Group may refer to an identified set of upstream or downstream channels among which packets associated with one or more service flows may be distributed. In the example embodiment of network portion 1500, packets associated with service flows 1502a and 1502b may be distributed among QAMs associated with Bonding Group BG(1). Similarly, packets associated with service flows 1502c and 1502d may be distributed among QAMs associated with Bonding Group BG(2). It will be appreciated that this example embodiment is simplified for purposes of illustration, and that in some embodiments one or more Bonding Groups may be associated with many different service flows.

At 1512, a BG(1) Traffic Shaping Scheduler is illustrated according to a specific embodiment. In the specific example embodiment of FIG. 15, one or more packet scheduling operations related to Bonding Group BG(1) may be performed at BG(1) Traffic Shaping Scheduler 1512. For example, the BG(1) Traffic Shaping Scheduler may select and/or determine the order in which to schedule for transport packets associated with service flows associated with Bonding Group BG(1).

According to various embodiments, the BG(1) Traffic Shaping Scheduler may select and/or determine packets for scheduling according to one or more QoS parameters, such as for example according to one or more of (and/or combinations thereof): traffic priority, excess weight, min-rates, max-rates, etc. For example, in one embodiment BG(1) Traffic Shaping Scheduler may determine and/or select packets for scheduling so as to ensure that each (or substantially all) of the service flows associated with Bonding Group BG(1) can operate at least the min-rates associated with those service flows. Additionally, the BG(1) Traffic Shaping Scheduler may cause one or more packets to be transported to a further stage of processing (e.g., Stage 1 Root Level Scheduler 1520).

In at least one embodiment, BG(1) Traffic Scheduler 1512 may be associated with a maximum bandwidth rate value. According to different embodiments, a maximum bandwidth rate value associated with BG(1) Traffic Scheduler 1512 may be based on the aggregated maximum bandwidth of the one or more QAM(s) associated with BG(1). In at least one embodiment, the maximum bandwidth rate associated with BG(1) may be determined and/or adjusted by one or more Flow Control 1534 operations in association with, for example, the second stage of processing 1550. In the specific example embodiment of FIG. 15, a BLT (e.g., a schedule) for transmitting packets associated with the one or more service flows associated with BG(1) may be determined at BG(1) Scheduler 1512 in accordance with the maximum bandwidth rate value.

At 1520, a Stage 1 Root Level Scheduler device is illustrated according to a specific embodiment. In the specific example embodiment of FIG. 15, the Stage 1 Root Level Scheduler is configured to aggregate traffic from multiple schedulers (e.g., BG(1) Traffic Shaping Scheduler 1512 and BG(2) Traffic Shaping Scheduler 1514). Thus, in at least one embodiment, Stage 1 Root Level Scheduler 1520 may be operable to schedule packets from one or more bonding groups.

According to various embodiments, the Stage 1 Root Level Scheduler may select and/or determine packets for scheduling according to one or more QoS parameters, such as for example according to one or more of (and/or combinations thereof): traffic priority, excess weight, min-rates, max-rates, etc. For example, in one embodiment Stage 1 Root Level Scheduler may determine and/or select packets for scheduling so as to ensure that each (or substantially all) of the service flows associated with packets scheduled by Stage 1 Root Level Scheduler can operate at least the min-rates associated with those service flows. Additionally, the Stage 1 Root Level Scheduler may cause one or more packets to be transported to a further stage of processing (e.g., Traffic Shaping Manager 1560).

At 1550, a second stage of processing is illustrated according to a specific embodiment. In one or more embodiments, the second stage may be implemented using a "Pull Scheduler". In some embodiments, each QAM may be represented as a BLT (e.g., a schedule). Each Bonding Group associated with a given QAM may have an entry in the QAM BLT. According to various embodiments, the packets shaped out of the Push scheduler may be fed back to the CPP and/or may be eventually enqueued into the "Pull scheduler". Since a Bonding Group may be composed of multiple QAMs, a Bonding Group may have multiple potential entries in the second stage (e.g., one for each QAM it is associated with).

At 1560, a Traffic Shaping Manager is illustrated according to a specific embodiments. In one or more embodiments, Traffic Shaping Manager 1560 may be located outside of box 1550 and/or within box 1530. In at least one embodiment, Traffic Shaping Manager 1560 may be operable to perform one or more functions related to traffic shaping, such as for example enqueuing packets in one or more BG queues (e.g., 1562, 1564, 1566, 1568, etc.). For example, the Traffic Shaping Manager may receive a given packet from a different component and/or processing stage (e.g. Stage 1 Root Level Scheduler) and schedule the packet for transport on a QAM. Additionally, the Traffic Shaping Manager may select and/or determine a queue on which to schedule the given packet. For example, the Traffic Shaping Manager may select and/or determine the shortest (or nearly shortest) queue associated with the Bonding Group on which packets associated with the service flow associated with the packet are operable to be sent. For example, if a given packet is to be sent via Bonding Group BG(1), Traffic Shaping Manager 1560 may determine and/or select the shortest queue of the set of BG(1) Queue 1562 and BG(1) Queue 1564. In some embodiments, selecting the shortest of the eligible queue may result in, for example, emulating SQF at the pull scheduler level, which may keep QAM usage balanced or substantially balanced.

At 1562, a Queue for BG(1) is illustrated according to a specific embodiment. In the specific embodiment of network portion 1500, BG(1) Queue 1562 represents a number of bytes associated with packet(s) scheduled to be transported on QAM(1) and associated with respective service flows associated with Bonding Group BG(1). In some embodiments, one or more second stage BG queues (e.g., 1562, 1564, 1566, 1568, etc.) may be kept short by the use of flow control to reduce the reordering and/or order restoration latency, as is discussed below.

In one or more embodiments, when a packet enters the second stage of processing (e.g., is received back in the network processor), the Processing Element (e.g., network processor) enqueues the packet into one of the corresponding empty bonding group entries of the QAM scheduler with the shortest (or nearly shortest) queue length. According to various embodiments, the queue with the shortest queue length may be the queue with the fewest bytes enqueued therein, the fewest packets enqueued therein, or some other measure of size. Thus, in at least one embodiment, the push scheduler may enqueue the packets only when there is a room in one of the queues of the pull scheduler, and/or it chooses the QAM with most shallow queue of the given Bonding Group in which to put the packet.

At 1534, a Flow Control assertion in accordance with a specific embodiment. In at least one embodiment, if all (or selected ones of) the possible entries for a Bonding Group may be full, one or more Flow-Control assertions may be transmitted to the Bonding Group Scheduler in the Push stage. In one or more embodiments, one or more Flow-Control assertions may include one or more instructions related to one or more of the following (and/or combinations thereof): disabling traffic flow, enabling traffic flow, etc. In at least one embodiment, one or more Flow-Control assertions may be related to one or more Traffic Shaping Schedulers associated with one or more of the following (and/or combinations thereof): a specific Bonding Group, a selected set of Bonding Groups, all of the Bonding Groups, etc.

Since the service flows may be aggregated per Bonding Group, a given packet sent out of the Push scheduler may be selected by considering all (or selected ones of) the QoS attributes, such as, for example, one or more of the following (and/or combinations thereof): min-rate, max-rate, excess weight and/or relative priority. As mentioned above, in some embodiments the max-rate of the push scheduler may be set to the max-possible rate the Bonding Group can achieve. This may allow the Bonding Group to reach its maximum bandwidth, for example when the second stage scheduler may not be applying back-pressure by sensing excess traffic in the overlapping Bonding Groups. Thus, in some embodiments, when max rates may not be limiting the rate of a bonding group, this combination acts as a "Work Conserving" scheduler.

In one or more embodiments, the second stage scheduler distributes the Bonding Groups packets into individual QAMs. Thus one or more packets sent out, for example, of a network processor (e.g., CPP) may be already scheduled for transport via respective QAMs. In some embodiments, the packets send to, for example, a Media Access Control ("MAC") level processor (e.g., a JIB) may be forwarded to the designated QAM directly, bypassing one or more scheduling component(s) (e.g., SQF).

In one or more embodiments, the QAM scheduler in the Pull stage may be shaped at the QAM bit rate (e.g., 40 Mbps). The per QAM schedule in the second stage may allow the traffic from a Bonding Group to be distributed across all (or selected ones of) the QAMs it is associated with. For efficient bandwidth utilization, the second stage may in some embodiments guarantee the min-rate of all (or selected ones of) the flows and/or may at the same time distribute the excess bandwidth fairly. In order to meet the min-rate criteria, the total of the min-rate associated with all (or selected ones of) the flows across a given bonding group may, for example, be distributed across all (or selected ones of) the possible scheduling entries for the given bonding group. Various techniques described herein may be used to calculate or determine, for example, $C(i,j)$ to distribute the min-rates. In some embodiments, $C(i,j)$ may represent the bandwidth reserved for $BG(j)$ from QAM (i). In some embodiments, distributing the min-rate across one or more QAM(s) queues ensures that the second stage scheduler may guarantee the min-rate commitment of the respective service flows.

According to various embodiments, the pull scheduler may be a hierarchical scheduler with individual service flows aggregated into a Bonding Groups (e.g. CPP HIST scheduler). In at least one embodiment, the Push scheduler may be a WFQ scheduler with an entry per bonding group aggregated into QAM entries. Flow control may be used to limit packet reordering under overload.

At 1574, a QAM(2) Scheduler is illustrated according to a specific embodiment. In at least one embodiment, a QAM Scheduler may be operable to schedule for transport on a given QAM packets enqueued on respective BG Queues associated with that QAM. According to various embodiments, QAM(2) Scheduler may select and/or determine packets for scheduling according to various traffic shaping techniques (e.g., WFQ, SQF, etc.). As is illustrated in the specific example embodiment of FIG. 15, each QAM may be associated with one or more Bonding Groups. For example, in the specific example embodiment of FIG. 15, QAM(2) is associated with both Bonding Group BG(1) and BG(2). In this specific example embodiment, QAM(2) scheduler may be operable to schedule packets associated with BG(1) Queue 1562 and BG(2) Queue 1566. One or more QAM(2) schedulers may use various techniques to schedule packets from different QAM(s), such as for example WFQ techniques, round robin techniques, etc.

At 1580, a Stage 2 Root Level Scheduler device is illustrated according to a specific embodiment. In at least one embodiment, a Stage 2 Root Level Scheduler device may transport packets from one or more QAM schedulers to one or more devices (e.g. packet scheduler/transmitter 820) for transmission on one or more QAMs. In at least one embodiment, packets transported to a packet scheduler/transmitter may already be scheduled for transmission on a specific QAM in a specific order. Thus, one or more packets may bypass further processing (e.g., SQF) that one or more packet scheduler/transmitter(s) may be operable to perform. Alternately, one or more packet scheduler/transmitter(s) may perform further processing of the packets.

In some embodiments, having a finite min-rate per bonding group per QAM entry in the second stage may ensures that the packet enqueued may be drained in a finite time. For example if a min-rate entry ($B(i,j)$) above may be 1 Mbps, then a 1500 byte packet may be drained within 12 milliseconds (e.g., if the respective queue is served only at its min rate), or faster. In some embodiments, a finite min-rate per Bonding Group per QAM entry may be implemented without affecting the packet latency and/or ordering. In one or more embodiments, packets received for the same service flow may get spread across QAM queues.

DOCSIS 3.0 may limit one or more time intervals associated with packet re-ordering (e.g., to 3 milliseconds). Hence, in some embodiments, to guarantee that reordering latency is limited to a given time interval (e.g., 3 milliseconds) in the worst case, the minimum value of $C(i,j)$ may [be] defined as a specific value and/or a range of values (e.g., 4 Mbps). In some embodiments, the queue depth of the BLT (e.g., schedule) entry may be limited to a given size (e.g., a single MTU size (e.g., 1500 bytes)). In some embodiments, for larger values of $C(i,j)$, the buffer size may be increased (e.g., proportionally or substantially proportionally to $C(i,j)$).

In some embodiments, one or more Bonding Groups may not have a min-rate flow associated therewith. In one or more embodiments, the value of $B(i,j)$ for all (or selected ones of) the QAM entries may be zero. In some embodiments, $B(i,j)$ may represent the bandwidth reserved for $BG(j)$ from QAM (i). Hence, if a given QAM may be fully loaded with min-rate traffic, one or more packets enqueued in a given queue could stay there indefinitely, resulting in, for example, relatively high latency and/or out-of order window. Thus, a minimum value of $B(i,j)$ may be assigned even if no explicit minimum rate may be associated with the respective Bonding Group.

Assigning a minimum value of B(i,j) may affect the amount of reservable bandwidth per Bonding Group. In one or more embodiments, the implicit min-rate components may be applied for each (or selected) QAM the Bonding Group may be associated with. According to various embodiments, if there multiple Bonding Groups have no min-rate flows, then each of those Bonding Groups may require the implicit min-rate component per QAM. In general, if there may be "m" bonding groups with no min-rate flows each spanning "n" QAMs, the amount of reservable bandwidth lost may be calculated and/or determined according to the expression:

$$n \times m \times C(i,j) \text{(e.g., 4 Mbps)}$$

In one or more embodiments, if one or more operations related to flow control are not implemented between the Push and/or the Pull scheduler, the queues corresponding to the same BG in different QAMs may build up in the case of an overload condition. It is anticipated that a substantial reordering may occur if these queues are be allowed to grow large, or that packet loss may occur if these queues are made shallow. In some embodiments the queues in the Push scheduler may be kept sufficiently shallow, and/or flow control may be asserted on the BG entry in the Push scheduler when all (or selected ones of) queues of this BG become full, which may help to avoid either of these problems.

As stated herein, one or more traffic shaping techniques may be implemented using an HQF-based scheduler (e.g., CPP). In one or more embodiments, a back-pressure mechanism may be desirable to ensure flow control between stages during, for example, congestion conditions. Other commercially available schedulers incorporating general traffic shaping techniques (e.g., HQF) with the capability of shaping scheduling nodes to their maximum rates may also be used to implement this scheme.

In one or more embodiments, the incoming packets may be processed by one or more network processor(s) and/or may not remain indefinitely. In some embodiments, before allowing a Bonding Group scheduler in the Push stage to send a packet, one or more flow control mechanism(s) may ensure that there may be room in at least one of the eligible queues in the Pull stage. If all (or selected ones of) the eligible queues in the Pull stage may be full, a flow control may be asserted back to the Bonding Group scheduler in the push stage. Similarly if there may be room in at least one of the eligible queues, the flow control may be de-asserted. In some embodiments, a PPE may be used to, for example, sense the queue size and/or toggle the flow control. In one or more embodiments, flow control may be asserted only when all (or selected ones of) the eligible queues in the Pull stage are full, and/or flow control may be de-asserted when there may be space in at least one of the queues in the Pull scheduler for this BG has space in it. There may be a finite latency between sensing that there may be a room in one of the queues, and/or de-asserting the flow control. This latency may impact the overall latency of the packet, as well as the duration of window with out-of-order packets. However, one or more traffic shaping techniques described herein may keep the latency to acceptable levels.

Figure 16A:
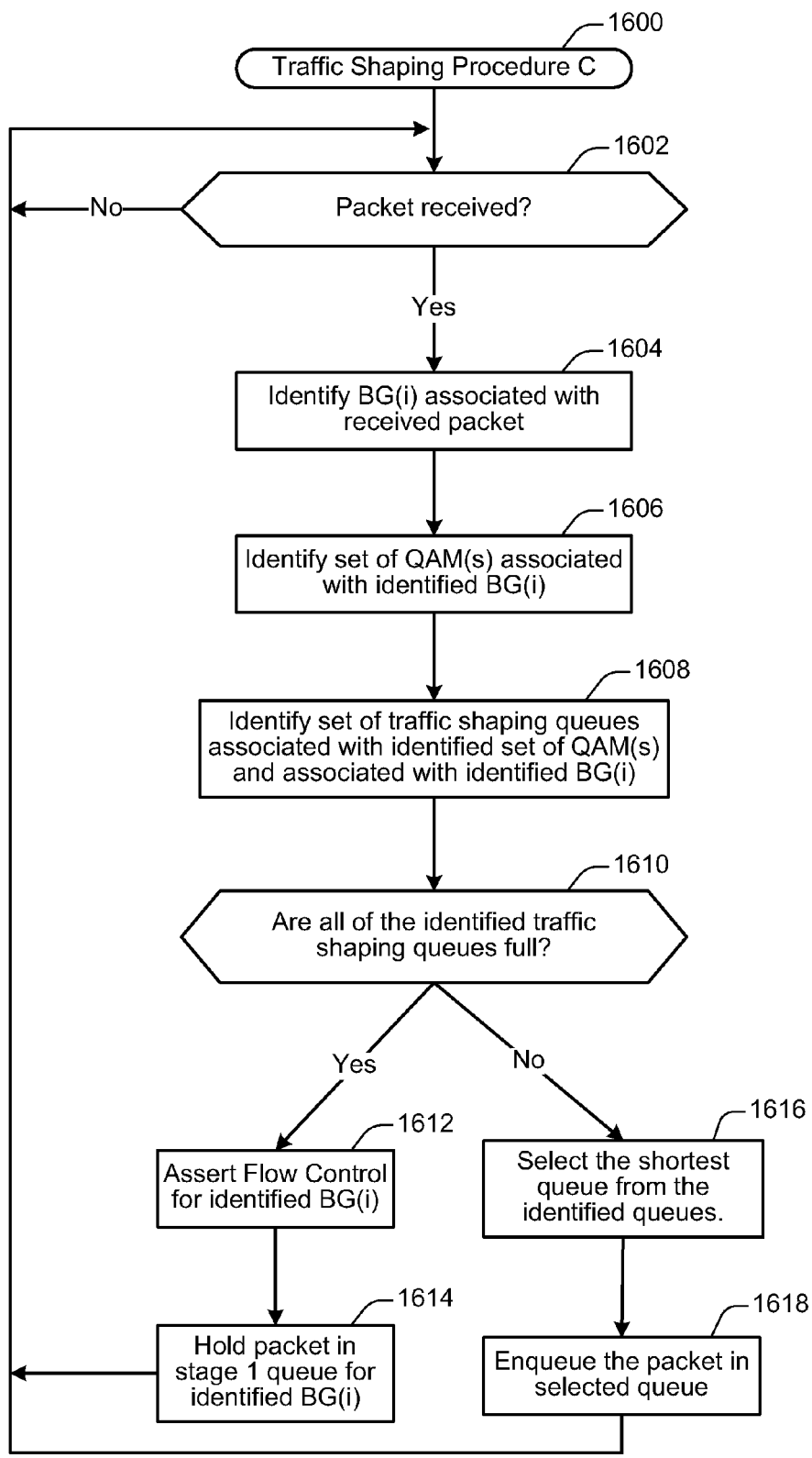
FIG. 16A illustrates a specific example embodiment of a Traffic Shaping Procedure.

FIG. 16A shows an example embodiment of a Traffic Shaping Procedure C 1600 in accordance with a specific embodiment. In some embodiments, one or more threads or instances Traffic Shaping Procedure C may be implemented to perform one or more functions related to traffic shaping. For example, one or more threads or instances of Traffic Shaping Procedure C may perform functions which may include, but are not limited to, monitoring traffic, scheduling traffic for transmission on one or more channels, updating traffic shaping values associated with one or more QAM(s) and/or Bonding Groups, etc. (and/or combinations thereof).

In at least one embodiment, Traffic Shaping Procedure C may be implemented by a CMTS configured for two stage traffic shaping (e.g., hybrid push-pull). For example, one or more instances or embodiments of Traffic Shaping Procedure C may be implemented by the example embodiment of a network portion illustrated in FIG. 15. In some embodiments, one or more two-stage (e.g., push-pull) scheduler technique (s) offers efficient bandwidth utilization. Since a given Bonding Group may not be shaped at a pre-determined rate, for example, in one or more embodiments sporadic surges in bandwidth demands may be handled efficiently. The min-rate allocation at the second stage may ensure the bandwidth commitment for the min-rate flows. According to various embodiments, additional queue entries per Bonding Group per QAM may be used to ensure fairness among the flows spanning Bonding Groups. Additionally, one or more techniques described herein may provide the ability to maintain high utilization and/or min rate guarantees in the presence of dynamically changing rates of bonding groups.

In at least one embodiment, at least a portion of a Traffic Shaping Procedure C may be initiated and/or implemented by one or more systems, devices, and/or controllers such as, for example, a Traffic Shaping Manager (e.g., Traffic Shaping Manager 1560). In some embodiments, at least a portion of a Traffic Shaping Procedure may be initiated and/or implemented by one or more systems, devices, and/or controllers in a shared access network (e.g., a CMTS in a cable network). In some embodiments, at least a portion of a Traffic Shaping Procedure may be initiated and/or implemented by a network processor which has been configured or designed to include appropriate hardware and/or hardware and software for implementing or initiating aspects of the Traffic Shaping Procedure. One such network processor may be, for example, a Cisco Packet Processor (herein referred to as CPP), available from Cisco Systems, Inc. of San Jose, Calif.

In some embodiments, one or more different threads or instances of a Traffic Shaping Procedure may be implemented concurrently on one or more processors. In at least one embodiment, one or more different threads or instances of a Traffic Shaping Procedure may be initiated at periodic intervals (e.g., at regular periodic intervals, at irregular periodic intervals, upon termination of one or more different threads or instances of a Traffic Shaping Procedure, etc.). In some embodiments, one or more different threads or instances of a Traffic Shaping Procedure may be initiated in response to one or more conditions and/or events which satisfies minimum threshold criteria for triggering a Traffic Shaping Procedure. For example, one or more separate threads or instances of a Traffic Shaping Procedure may be initiated in response to receiving a packet. In one or more embodiments, one or more separate threads or instances of a Traffic Shaping Procedure may be initiated for each (or selected) Service Flow(s) and/or Bonding Group(s).

In some embodiments, one or more different threads or instances of a Traffic Shaping Procedure may be initiated upon demand (e.g., by a network operator, by a CMTS, by a network processor, by a traffic shaping manager, by a network node, by a cable modem, by a Bonding Group, etc.). According to various embodiments, one or more different threads or instances of Traffic Shaping Procedure may be triggered and/or implemented manually, automatically, statically, dynamically, concurrently, and/or some combination thereof.

According to various embodiments, multiple concurrent threads or instances of Traffic Shaping Procedure C may be implemented concurrently for different BG(i)s. Additionally, a single thread or instance of Traffic Shaping Procedure C may shape traffic for multiple Bonding Groups (e.g., by cycling through Bonding Groups).

For purposes of illustration, a specific example embodiment of a Traffic Shaping Procedure will be described by way of example with respect to FIG. 16A.

As illustrated in the example embodiment of FIG. 16A, it is assumed that the Traffic Shaping Procedure C is implemented at a network processor which includes appropriate hardware and/or hardware and software for traffic shaping analysis. Different embodiments of the Traffic Shaping Procedure (not shown), may include one or more features or operations in addition to those illustrated in the specific example embodiment of FIG. 16A. In various embodiments of the Traffic Shaping Procedure, one or more features or operations illustrated in the specific example embodiment of FIG. 16A may vary. In various embodiments of the Traffic Shaping Procedure, features or operations illustrated in the specific example embodiment of FIG. 16A may be omitted. Additionally, in various embodiments of the Traffic Shaping Procedure, features or operations illustrated in the specific example embodiment of FIG. 16A may be performed in an order different than is shown.

At 1602 a packet may be received. In at least one embodiment, the packet is received at a network component (e.g., a CMTS, a network processor, etc.) in the head end of a shared access network.

At 1604, a specific Bonding Group (BG(i)) associated with the received packet may be identified. According to various embodiments, a variety of different techniques may be used for identifying the specific Bonding Group associated with the received packet, such as, for example, one or more of the following (or combinations thereof):

Using an IP address associated with the received packet (e.g., the destination IP address, etc.).
Using information associated with the received packet (e.g., data in the packet header, data in the packet payload, metadata associated with the packet, etc.).
Using information stored in one or more data structures.
Using one or more values from a network device (e.g., a CMTS, a traffic shaping manager device, memory, etc.).
Etc.

As illustrated at 1606, the set of one or more QAM(s) associated with the identified Bonding Group may be identified. For example, referring again to the specific example embodiment of FIG. 15, if it is assumed that Bonding Group BG(1) is selected for analysis, then the set of QAM(s) identified at 1606 may correspond to QAM(1) and QAM(2). Similarly, if it is assumed that Bonding Group BG(2) is selected for analysis, then the set of QAM(s) identified at 1606 may correspond to QAM(2) and QAM(3).

According to various embodiments, various techniques may be used for identifying the particular set of QAM(s) associated with a given Bonding Group. Examples of such techniques may include, but are not limited to, one or more of the following (or combinations thereof):

Receiving one or more values from one or more network component(s) (e.g., a traffic shaping manager, CMTS, etc.).
Accessing network topology information and/or other types of information which may be stored at one or more memories or data structures.
Analyzing configuration information (e.g., from a data structure, from a network configuration, etc.).
Analyzing hardware and/or hardware and software configuration information (e.g., identifying one or more busses on which packets may be sent, identifying one or more paths through which packets may be routed, etc.).
Etc.

As illustrated at 1608, the set of one or more traffic shaping queues and/or other types of data structures associated with the identified set of QAM(s) and associated with the selected Bonding Group may be identified. For example, referring again to the specific example embodiment of FIG. 15, if it is assumed that Bonding Group BG(1) is selected for analysis, then the set of queues identified at 1608 may correspond to Bonding Group BG(1) Queue 1562 and Bonding Group BG(1) Queue 1564. Similarly, if it is assumed that Bonding Group BG(2) is selected for analysis, then the set of queues identified at 1608 may correspond to Bonding Group BG(2) Queue 1566 and Bonding Group BG(2) Queue 1568.

According to various embodiments, various techniques may be used for identifying the particular set of queues and/or other types of data structures associated with a given Bonding Group. Examples of such techniques may include, but are not limited to, one or more of the following (or combinations thereof):

Receiving one or more values from one or more network component(s) (e.g., a traffic shaping manager, CMTS, etc.).
Accessing network topology information and/or other types of information which may be stored at one or more memories or data structures.
Analyzing configuration information (e.g., from a data structure, from a network configuration, etc.).
Analyzing hardware and/or hardware and software configuration information (e.g., identifying one or more busses on which packets may be sent, identifying one or more paths through which packets may be routed, etc.).
Etc.

As illustrated at 1610 according to a specific embodiment, a determination is made as to whether all the identified queues are full. In at least one embodiment, one or more of queues (e.g., BG(1) Queue 1562) and/or other types of data structures may be associated with a one or more size parameters. For example, a given queue may be associated with a size parameter that specifies one or more values related to a maximum number of packets and/or a maximum packet size that may be associated with the queue. For example, in the example embodiment of FIG. 15, if it is assumed that BG(1) is identified, then at 1610 a determination would be made as to whether both BG(1) Queue 1562 and BG(1) Queue 1564 are full. According to various embodiments, one or more queues and/or other types of data structures may share one or more common size parameter(s). Additionally, each or selected queues (and/or other types of data structures) may be associated with one or more different size parameter(s).

At 1612 it is assumed that all the identified traffic shaping queues and/or other types of data structures are full. In one or more embodiments, as illustrated at 1612 one or more operation(s) for asserting flow control for the identified BG(i) may be initiated. For example, one or more operations may be initiated for temporarily disabling output from one or more schedulers in the first processing stage associated with the identified BG(i) may be initiated. According to various embodiments, one or more operations for temporarily disabling output may be initiated by transmitting, for example, a flow control assertion from one or more components (e.g., Traffic Shaping Manager 1560) associated with the second stage of processing to one or more components (e.g. BG(1) Scheduler 1512) associated with the first stage of processing.

At 1614, the received packet is held in a stage 1 queue for the identified BG(1). For example, in the specific example embodiment illustrated in FIG. 15, if it is assumed that the received packet is associated with BG(1), the received packet may be held in a queue associated with BG(1) Traffic Shaping Scheduler 1512. In some embodiments, information related to the packet may be held in various data structure(s) and/or queues located in hardware and/or hardware and software. According to various embodiments, the received packet may be held in various ways, such as for example in a separate queue dedicated to packets held when flow control is asserted.

At 1616 it is assumed that one or more of the identified traffic shaping queues and/or other types of data structures is not full. As illustrated in the specific example embodiment of FIG. 16A, at 1616 a queue (e.g., Queue 1562 for BG(1)) is selected from the identified queues. For example, in at least one embodiment the shortest queue is selected. The shortest queue may be the queue with the smallest number of packets enqueued, the queue with the smallest number of bytes enqueued, the queue with the greatest excess capacity, etc. According to different embodiments, various techniques may be used for selecting a queue from the set of identified queues, such as for example comparing some measure of queue size with a threshold value, selecting a queue with excess capacity, etc.

At 1618, the received packet is enqueued in the identified queue. Various techniques may be used for enqueing the received packet in the identified queue. For example, information relating to the packet may be stored in one or more hardware and/or hardware and software locations (e.g., memory location(s), buffer(s), data structure(s), etc.). In the specific example embodiment illustrated in FIG. 15, if it is assumed that the received packet is associated with BG(1), then the received packet may be enqueued in, for example, Queue 1562 for BG(1), Queue 1564 for BG(1), etc.

Figure 16B:
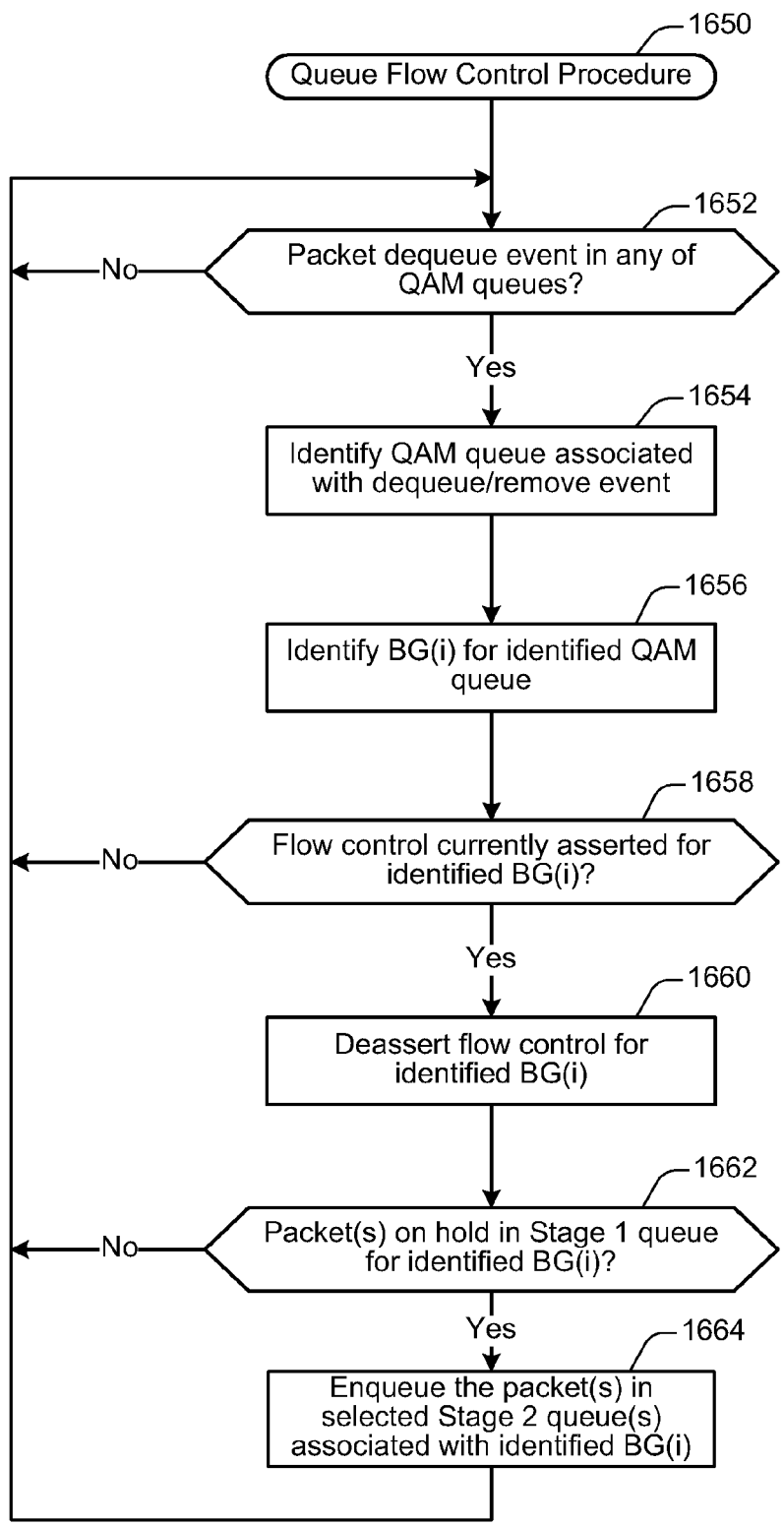
FIG. 16B illustrates a specific example embodiment of a Queue Flow Control Procedure.

FIG. 16B shows an example embodiment of a Queue Flow Control Procedure 1650 in accordance with a specific embodiment. In some embodiments, one or more threads or instances Queue Flow Control Procedure may be implemented to perform one or more functions related to traffic shaping. For example, one or more threads or instances of Queue Flow Control Procedure may perform functions which may include, but are not limited to, monitoring traffic, scheduling traffic for transmission on one or more channels, updating traffic shaping values associated with one or more QAM(s) and/or Bonding Groups, etc. (and/or combinations thereof).

In at least one embodiment, Queue Flow Control Procedure may be implemented by a CMTS configured for two stage traffic shaping (e.g., hybrid push-pull). For example, one or more instances or embodiments of Queue Flow Control Procedure may be implemented by the example embodiment of a network portion illustrated in FIG. 15. In some embodiments, one or more two-stage (e.g., push-pull) scheduler technique(s) offers efficient bandwidth utilization. Since a given Bonding Group may not be shaped at a pre-determined rate, for example, in one or more embodiments sporadic surges in bandwidth demands may be handled efficiently. The min-rate allocation at the second stage may ensure the bandwidth commitment for the min-rate flows. According to various embodiments, additional queue entries per Bonding Group per QAM may be used to ensure fairness among the flows spanning Bonding Groups. Additionally, one or more techniques described herein may provide the ability to maintain high utilization and/or min rate guarantees in the presence of dynamically changing rates of bonding groups.

In at least one embodiment, at least a portion of a Queue Flow Control Procedure may be initiated and/or implemented by one or more systems, devices, and/or controllers such as, for example, a Traffic Shaping Manager (e.g., Traffic Shaping Manager 1560). In some embodiments, at least a portion of a Queue Flow Control Procedure may be initiated and/or implemented by one or more systems, devices, and/or controllers in a shared access network (e.g., a CMTS in a cable network). In some embodiments, at least a portion of a Queue Flow Control Procedure may be initiated and/or implemented by a network processor which has been configured or designed to include appropriate hardware and/or hardware and software for implementing or initiating aspects of the Queue Flow Control Procedure. One such network processor may be, for example, a Cisco Packet Processor (herein referred to as CPP), available from Cisco Systems, Inc. of San Jose, Calif.

In some embodiments, one or more different threads or instances of a Queue Flow Control Procedure may be implemented concurrently on one or more processors. In at least one embodiment, one or more different threads or instances of a Queue Flow Control Procedure may be initiated at periodic intervals (e.g., at regular periodic intervals, at irregular periodic intervals, upon termination of one or more different threads or instances of a Queue Flow Control Procedure, etc.). In some embodiments, one or more different threads or instances of a Queue Flow Control Procedure may be initiated in response to one or more conditions and/or events which satisfies minimum threshold criteria for triggering a Queue Flow Control Procedure. For example, one or more separate threads or instances of a Queue Flow Control Procedure may be initiated in response to one or more events and/or operations related to dequeuing, draining, and/or removing one or more packets from a queue. In one or more embodiments, one or more separate threads or instances of a Queue Flow Control Procedure may be initiated for each (or selected) queue(s), QAM(s), and/or Bonding Group(s).

In some embodiments, one or more different threads or instances of a Queue Flow Control Procedure may be initiated upon demand (e.g., by a network operator, by a CMTS, by a network processor, by a traffic shaping manager, by a network node, by a cable modem, by a Bonding Group, etc.). According to various embodiments, one or more different threads or instances of Queue Flow Control Procedure may be triggered and/or implemented manually, automatically, statically, dynamically, concurrently, and/or some combination thereof.

For purposes of illustration, a specific example embodiment of a Queue Flow Control Procedure will be described by way of example with respect to FIG. 16B.

As illustrated in the example embodiment of FIG. 16B, it is assumed that the Queue Flow Control Procedure is implemented at a network processor which includes appropriate hardware and/or hardware and software for traffic shaping analysis. Different embodiments of the Queue Flow Control Procedure (not shown), may include one or more features or operations in addition to those illustrated in the specific example embodiment of FIG. 16B. In various embodiments of the Queue Flow Control Procedure, one or more features or operations illustrated in the specific example embodiment of FIG. 16B may vary. In various embodiments of the Queue Flow Control Procedure, features or operations illustrated in the specific example embodiment of FIG. 16B may be omitted. Additionally, in various embodiments of the Queue Flow Control Procedure, features or operations illustrated in the specific example embodiment of FIG. 16B may be performed in a different order than is shown.

At 1652, a packet dequeue event in a QAM queue is detected. In at least one embodiment, a packet dequeue event may include a packet being dequeued from a queue (e.g., Queue 1562 for BG(1), Queue 1568 for BG(2), etc.). For example, a packet dequeue event may include a packet removed from a queue for purposes of scheduling and/or transmission. In one or more embodiments, a packet dequeue event may be detected and/or determined by one or more network devices (e.g., a CMTS, a network processor, etc.). In at least one embodiment, a packet dequeue event may indicate that a queue now has additional capacity. For example, a queue that may have been identified as "full" (e.g., at operation 1610) may be identified after a dequeue event as "not full."

At 1654, a specific QAM queue associated with the dequeue event may be identified. According to various embodiments, a variety of different techniques may be used for identifying the specific QAM queue associated with the dequeue event, such as, for example, one or more of the following (or combinations thereof):

- Using information associated with the detection of the dequeue event.
- Using information stored in one or more data structures.
- Using one or more values from a network device (e.g., a CMTS, a traffic shaping manager device, memory, etc.).
- Using information associated with the received packet (e.g., data in the packet header, data in the packet payload, metadata associated with the packet, etc.).
- Etc.

At 1656, a specific Bonding Group BG(i) associated with the identified QAM queue may be identified. According to various embodiments, a variety of different techniques may be used for identifying the specific BG associated with the QAM queue, such as, for example, one or more of the following (or combinations thereof):

- Using information stored in one or more data structures (e.g., configuration information).
- Using one or more values from a network device (e.g., a CMTS, a traffic shaping manager device, memory, etc.).
- Using an IP address associated with the received packet (e.g., the destination IP address, etc.).
- Using information associated with the received packet (e.g., data in the packet header, data in the packet payload, metadata associated with the packet, etc.).
- Etc.

At 1658, a determination is made as to whether flow control is currently asserted for the identified Bonding Group. In at least one embodiment, determining whether flow control is currently asserted may involve, for example, using information and/or configuration data from one or more data structure(s) and/or memory location(s).

At 1660 it is assumed that flow control is currently asserted for the identified BG(i). In one or more embodiments, as illustrated at 1660, one or more operation(s) for deasserting flow control for the identified BG(i) may be initiated. For example, one or more operations may be initiated for enabling output from one or more schedulers in the first processing stage associated with the identified BG(i) may be initiated. According to various embodiments, one or more operations for enabling output may be initiated by transmitting, for example, information related to flow control deassertion from one or more components (e.g., Traffic Shaping Manager 1560) associated with the second stage of processing to one or more components (e.g. BG(1) Scheduler 1512) associated with the first stage of processing.

At 1662, a determination is made as to whether one or more packet(s) associated with the identified BG(i) are on hold. In at least one embodiment, one or more packet(s) may be on hold in the first stage of processing. For example, a packet may be on hold due to flow control asserted in the first stage of processing (e.g., at operation 1612). In at least one embodiment, determining whether one or more packet(s) is on hold may involve, for example, using information and/or traffic data from one or more data structure(s) and/or memory location(s). For example, a determination may be made as to whether one or more queue(s), buffer(s), etc. associated with the first stage of processing contains any packets (e.g., one or more packet(s) associated with the identified BG(i)).

At 1664 it is assumed that one or more packet(s) is on hold in the first stage of processing. As illustrated in the specific example embodiment of FIG. 16A, at 1664, one or more packet(s) identified as on hold may be enqueued in a queue in the second stage. In the specific example embodiment illustrated in FIG. 15, if it is assumed that the received packet is associated with BG(1), then one or more packet(s) may be enqueued in, for example, Queue 1562 for BG(1), Queue 1564 for BG(1), etc.

In at least one embodiment, one or more packet(s) is enqueued in the queue associated with the dequeue event. If it is assumed that the dequeue event is associated with, for example, Queue 1562 for BG(1), then one or more packet(s) may be enqueued in Queue 1562. Various techniques may be used for enqueing the received packet in the identified queue. For example, information relating to the packet may be stored in one or more hardware and/or hardware and software locations (e.g., memory location(s), buffer(s), data structure(s), etc.).

According to various embodiments, the various traffic shaping terms, expressions, variables and/or concepts disclosed herein may be described via the use of different types of phrases and/or text descriptions. For example, in at least one embodiment, various traffic shaping terms, expressions, variables and/or concepts disclosed herein may be described and/or referenced using one or more of the different example expressions and/or example text descriptions illustrated in Table 1 below.

TABLE 1

| Example Expression | Example of Text Description |
|---|---|
| Q(j) | First selected channel traffic usage information |
|  | First selected channel traffic usage value |
| BG(i) | First channel group |
| QAM(j) | Communication channel |
| R(i, j) | First channel group traffic usage information |
|  | First channel-group traffic usage value |
| E(j) | First channel traffic delta information |
|  | First channel traffic delta value |
| E(i, j) | First channel group delta information |
|  | First channel group delta value |
| BW allocated to BG (e.g., 1362) | First channel group traffic shaping rate data |
| BWQ(j) | Channel bandwidth capacity value |

It will be appreciated that, in at least some embodiments, other types of phrases and/or text descriptions (e.g., other than those explicitly recited in Table 1) may also be used to describe one or more of the various traffic shaping terms, expressions, variables and/or concepts disclosed herein.

Additional details relating to various aspects of cable network technology are described in U.S. Pat. No. 7,174,376, by Daruwalla, entitled "IP SUBNET SHARING TECHNIQUE IMPLEMENTED WITHOUT USING BRIDGING OR ROUTING PROTOCOLS", filed Jun. 28, 2002, the entirety of which is incorporated herein by reference for all purposes.

This application is related to U.S. patent application Ser. No. 12/404,219, titled "QOS ON BONDED CHANNELS OF A SHARED ACCESS CABLE NETWORK", by Pai et al., filed concurrently herewith, the entirety of which is incorporated herein by reference for all purposes.

Various techniques discussed in this document may provide practical solutions to scheduling Bonding Group traffic. As described herein, some embodiments may be based on shaping the bonding group bandwidth. However, it is anticipated that some techniques for traffic scheduling may require a compromise between underutilization and one or more min-rate guarantees. In some embodiments, this risk may be minimized by adopting a hybrid approach, where a smaller fraction of inactive min-rate bandwidth may be pre-allocated. Also, in some embodiments, the shaping of the Bonding Groups may be based on the assumption that the offered load on a Bonding Group may be stable. This may be a fair assumption for the Cable network deployment. A typical Bonding Group may be deployed with several hundred subscribers. The average traffic load may be assumed to be fairly stable for a large number. Also with the increasing usage of applications such as, for example, one or more of the following (and/or combinations thereof): video and/or large file downloads, a single modem may be likely to encounter large steady stream of data spanning several minutes to few hours. In at least one embodiment, this may result in the overall load on a Bonding Group being fairly stable and/or consistent.

Although illustrative embodiments and applications of the various embodiments described herein are shown and described herein, many variations and modifications are possible which remain within the concept, scope, and spirit of the disclosed embodiments, and these variations would become clear to those of ordinary skill in the art after perusal of this application. Moreover, in at least some embodiments, various procedural operations such as those described herein may be implemented in alternative order and/or may be omitted. Accordingly, the example embodiments described herein are to be considered as illustrative and not restrictive, and the various embodiments are not to be limited to the details given herein, but may be modified within the scope and equivalents of the appended claims.

It is claimed:

1. A system for managing traffic flow for transport over a plurality of communication channels on a shared access cable network, the system comprising:
    at least one processor;
    at least one interface operable to provide a communication link to at least one network device; and
    memory;
    the system being operable to shape a plurality of different traffic flows to be transported over the plurality of different communication channels of the shared access cable network; wherein the plurality of communication channels includes a first communication channel, a second communication channel, and a third communication channel; wherein the first communication channel and the second communication channel are associated with a first channel group; wherein the second communication channel and the third communication channel are associated with a second channel group; wherein the first channel group has associated therewith a first plurality of queues including a first queue and a second queue; wherein the second channel group has associated therewith a second plurality of queues including a third queue and a fourth queue; wherein each of the first, second, third, and fourth queues is capable of containing a respective number of packets stored for transmission via the channels in the associated channel group; and wherein the shaping of the plurality of different traffic flows includes:
        determining whether a first number of packets stored in the first queue has exceeded a first threshold number of packets, wherein the first queue is associated with the first channel group and associated with the first communication channel;
        determining whether a second number of packets stored in the second queue has exceeded a second threshold number of packets, wherein the second queue is associated with the first channel group and associated with the second communication channel;
        initiating at least one operation for suspending or disabling, during a first time interval, traffic flow associated with the first channel group in response to detecting that at least one of the queues associated with the first channel group has exceeded its associated threshold number of packets;
        determining whether a third number of packets stored in the third queue has exceeded third threshold number of packets, wherein the third queue is associated with the second channel group and associated with the second communication channel;
        determining whether a fourth number of packets stored in the fourth queue has exceeded fourth threshold number of packets, wherein the fourth queue is associated with the second channel group and associated with the third communication channel; and
        initiating at least one operation for suspending or disabling, during a second time interval, traffic flow associated with the second channel group in response to detecting that at least one of the queues associated with the second channel group has exceeded its associated threshold number of packets.

2. The system of claim 1, wherein the shaping of the plurality of different traffic flows includes:
    determining whether traffic flow associated with the first channel group is suspended or disabled;
    initiating at least one operation for enabling or resuming traffic flow associated with the first channel group in response to a determination that respective threshold number of packets associated with each of the first plurality of queues is satisfied;
    determining whether traffic flow associated with the second channel group is suspended or disabled; and
    initiating at least one operation for enabling or resuming traffic flow associated with the second channel group in response to a determination that respective threshold number of packets associated with each of the second plurality of queues is satisfied.

3. The system of claim 1:
    wherein the shared access cable network is configured as a Hybrid Fiber Coax (HFC) cable network that is compatible with a Data-Over-Cable Service Interface Specification (DOCSIS) communication protocol;
    wherein the system is implemented as a Cable Modem Termination System (CMTS) of the shared access cable network; and
    wherein the first channel group corresponds to a DOCSIS channel bonding group in accordance with the DOCSIS communication protocol.

4. A system for managing traffic flow for transport over a plurality of communication channels on a shared access cable network, the system comprising:
    at least one processor;
    at least one interface operable to provide a communication link to at least one network device; and
    memory;
    the system being operable to:
        receive a first packet, the first packet having associated therewith a first set of characteristics, the first set of characteristics comprising a first service flow identifier representing a first service flow associated with the first packet, the first service flow comprising a Media Access Control layer data stream for transport of packets between a cable network service provider and a first cable modem;

identify, using at least a portion of the first set of characteristics, a first channel group associated with the first service flow, the first channel group comprising a plurality of communication channels which have been allocated for use in transporting data traffic associated with the first service flow, wherein at least one of the plurality of communication channels is also included within a second channel group, wherein the first channel group has associated therewith a first plurality of queues, wherein each of the plurality of communication channels has associated therewith at least one respective queue of the first plurality of queues, wherein each of the first plurality of queues has associated therewith a respective available queue capacity value representing an amount of total memory which is available for use by a given queue of the first plurality of queues, wherein each of the first plurality of queues comprises a respective number of packets stored for transmission via the respective communication channel;

determine whether a respective number of packets stored in each of the queues associated with the first channel group and associated with the first communication channel has exceeded, during a first time interval, a threshold number of packets associated with its respective queue; and initiate at least one operation for suspending or disabling, during a second time interval, traffic flow associated with the first channel group in response to detecting that each of the queues associated with the first channel group has exceeded its associated threshold number of packets.

5. The system of claim 4:

wherein the at least one operation for suspending or disabling of traffic flow associated with the first channel group includes prohibiting at least one packet from being enqueued in any of the first plurality of queues during the second time interval.

6. The system of claim 4 being further operable to:

identify, using a first set of criteria, a first queue from the first plurality of queues, wherein the first set of criteria includes criteria for identifying and selecting, from the first plurality of queues, a specific queue having associated therewith a relatively largest available queue capacity value as of a given time T; and initiate at least one operation for enqueing the received packet in the first queue.

7. The system of claim 4:

wherein the shared access cable network is configured as a Hybrid Fiber Coax (HFC) cable network that is compatible with a Data-Over-Cable Service Interface Specification (DOCSIS) communication protocol;

wherein the system is implemented as a Cable Modem Termination System (CMTS) of the shared access cable network; and wherein the first channel group corresponds to a DOCSIS channel bonding group in accordance with the DOCSIS communication protocol.

8. A system for managing traffic flow for transport over a plurality of communication channels on a shared access cable network, the system comprising:

at least one processor;

at least one interface operable to provide a communication link to at least one network device; and memory;

the system being operable to:

detect a first packet dequeue event relating to a dequeuing of a first packet from a first queue associated with a first channel group, the first channel group comprising a plurality of communication channels allocated for use in transporting data traffic associated with a first service flow, the first service flow comprising a Media Access Control layer data stream for transport of packets between a cable network service provider and a first cable modem, wherein the first channel group has associated therewith a first plurality of queues including the first queue, wherein each of the plurality of communication channels has associated therewith at least one respective queue of the first plurality of queues, wherein each of the first plurality of queues comprises a respective number of packets stored for transmission via the respective communication channel, wherein at least one of the plurality of communication channels is also included within a second channel group;

identify, using information associated with the first queue, the first channel group which is associated with the first queue;

determine whether traffic flow control is asserted for the first channel group, wherein the assertion of traffic flow control for the first channel group is characterized by a suspension of traffic flow on the first plurality of communication channels of the first channel group; and perform at least one operation for deasserting traffic flow control at the first channel group in response to a determination that traffic flow control is asserted for the first channel group and in response to detecting the dequeuing of the first packet from the first queue, wherein the deassertion of traffic flow control for the first channel group is characterized by a resumption of traffic flow on the first plurality of communication channels of the first channel group.

9. The system of claim 8:

wherein the at least one operation for deasserting traffic flow control at the first channel group includes enabling at least one packet to be enqueued in at least one of the first plurality of queues.

10. The system of claim 8:

wherein the shared access cable network is configured as a Hybrid Fiber Coax (HFC) cable network that is compatible with a Data-Over-Cable Service Interface Specification (DOCSIS) communication protocol;

wherein the system is implemented as a Cable Modem Termination System (CMTS) of the shared access cable network; and wherein the first channel group corresponds to a DOCSIS channel bonding group in accordance with the DOCSIS communication protocol.

11. A method for managing traffic flow for transport over a plurality of communication channels on a shared access cable network, the method comprising:

receiving a first packet, the first packet having associated therewith a first set of characteristics, the first set of characteristics comprising a first service flow identifier representing a first service flow associated with the first packet, the first service flow comprising a Media Access Control layer data stream for transport of packets between a cable network service provider and a first cable modem;

identifying, using at least a portion of the first set of characteristics, a first channel group associated with the first service flow, the first channel group comprising a plurality of communication channels which have been allocated for use in transporting data traffic associated with the first service flow, wherein the first channel group has associated therewith a first plurality of queues, wherein each of the plurality of communication channels has associated therewith at least one respective queue of the first plurality of queues, wherein each of the first plurality of queues comprises a respective number of packets stored for transmission via the respective communication channel, wherein each of the first plurality of queues has associated therewith a respective available queue capacity value representing an amount of total memory which is available for use by a given queue of the first plurality of queues, wherein at least one of the plurality of communication channels is also included within a second channel group;

determining whether each of the queues associated with the first channel group and associated with the first communication channel has exceeded, during a first time interval, a threshold number of packets associated with its respective queue; and initiating at least one operation for suspending or disabling, during a second time interval, traffic flow associated with the first channel group in response to detecting that each of the queues associated with the first channel group has exceeded its associated threshold number of packets.

12. The method of claim 11:

wherein the at least one operation for suspending or disabling of traffic flow associated with the first channel group includes prohibiting at least one packet from being enqueued in any of the first plurality of queues during the second time interval.

13. The method of claim 11 further comprising:

identifying, using a first set of criteria, a first queue from the first plurality of queues, wherein the first set of criteria includes criteria for identifying and selecting, from the first plurality of queues, a specific queue having associated therewith a relatively largest available queue capacity value as of a given time T; and initiating at least one operation for enqueing the received packet in the first queue.

14. The method of claim 11:

wherein the shared access cable network is configured as a Hybrid Fiber Coax (HFC) cable network that is compatible with a Data-Over-Cable Service Interface Specification (DOCSIS) communication protocol;

wherein the method is implemented at a Cable Modem Termination System (CMTS) of the shared access cable network; and wherein the first channel group corresponds to a DOCSIS channel bonding group in accordance with the DOCSIS communication protocol.

15. A method for managing traffic flow for transport over a plurality of communication channels on a shared access cable network, the method comprising:

detecting a first packet dequeue event relating to a dequeuing of a first packet from a first queue associated with a first channel group, the first channel group comprising a plurality of communication channels allocated for use in transporting data traffic associated with a first service flow, the first service flow comprising a Media Access Control layer data stream for transport of packets between a cable network service provider and a first cable modem, wherein the first channel group has associated therewith a first plurality of queues including the first queue, wherein each of the plurality of communication channels has associated therewith at least one respective queue of the first plurality of queues, wherein each of the first plurality of queues comprises a respective number of packets stored for transmission via the respective communication channel, wherein at least one of the plurality of communication channels is also included within a second channel group;

identifying, using information associated with the first queue, the first channel group which is associated with the first queue;

determining whether traffic flow control is asserted for the first channel group, wherein the assertion of traffic flow control for the first channel group is characterized by a suspension of traffic flow on the first plurality of communication channels of the first channel group; and performing at least one operation for deasserting traffic flow control at the first channel group in response to a determination that traffic flow control is asserted for the first channel group and in response to detecting the dequeuing of the first packet from the first queue, wherein the deassertion of traffic flow control for the first channel group is characterized by a resumption of traffic flow on the first plurality of communication channels of the first channel group.

16. The method of claim 15:

wherein the at least one operation for deasserting traffic flow control at the first channel group includes enabling at least one packet to be enqueued in at least one of the first plurality of queues.

17. The method of claim 15:

wherein the shared access cable network is configured as a Hybrid Fiber Coax (HFC) cable network that is compatible with a Data-Over-Cable Service Interface Specification (DOCSIS) communication protocol;

wherein the method is implemented at a Cable Modem Termination System (CMTS) of the shared access cable network; and wherein the first channel group corresponds to a DOCSIS channel bonding group in accordance with the DOCSIS communication protocol.

* * * * *